US008850435B2

(12) United States Patent
Kanemasa

(10) Patent No.: US 8,850,435 B2
(45) Date of Patent: Sep. 30, 2014

(54) DETECTING BOTTLENECK CONDITION BASED ON FREQUENCY DISTRIBUTION OF SAMPLED COUNTS OF PROCESSING REQUESTS

(75) Inventor: Yasuhiko Kanemasa, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 957 days.

(21) Appl. No.: 12/970,095

(22) Filed: Dec. 16, 2010

(65) Prior Publication Data

US 2011/0154340 A1 Jun. 23, 2011

(30) Foreign Application Priority Data

Dec. 18, 2009 (JP) .................................. 2009-288012

(51) Int. Cl.
*G06F 11/34* (2006.01)
*G06F 11/22* (2006.01)
*G06F 9/46* (2006.01)
*G06F 15/173* (2006.01)
*H04L 29/08* (2006.01)

(52) U.S. Cl.
CPC ...... *G06F 11/3495* (2013.01); *G06F 2201/875* (2013.01); *G06F 2201/81* (2013.01); *H04L 67/10* (2013.01); *G06F 2201/88* (2013.01); *G06F 11/3419* (2013.01); *G06F 11/3447* (2013.01); *G06F 11/3409* (2013.01); *G06F 11/3452* (2013.01); *G06F 11/3433* (2013.01)
USPC ............. 718/100; 718/101; 709/224; 714/48; 714/47.1; 714/25

(58) Field of Classification Search
USPC ............ 718/100, 101; 709/224; 714/48, 47.1, 714/25
See application file for complete search history.

(56) References Cited

U.S. PATENT DOCUMENTS

| 7,171,668 | B2 | 1/2007 | Molloy et al. | |
|---|---|---|---|---|
| 7,219,034 | B2 * | 5/2007 | McGee et al. | 702/180 |
| 7,406,653 | B2 * | 7/2008 | Ide et al. | 714/799 |
| 2005/0289231 | A1 | 12/2005 | Harada et al. | |
| 2006/0101402 | A1 * | 5/2006 | Miller et al. | 717/124 |
| 2008/0016412 | A1 * | 1/2008 | White et al. | 714/48 |
| 2008/0151773 | A1 | 6/2008 | Kawaba | |
| 2008/0263663 | A1 * | 10/2008 | Ide et al. | 726/22 |
| 2009/0132626 | A1 * | 5/2009 | Ide | 708/443 |
| 2011/0078106 | A1 * | 3/2011 | Luchi et al. | 706/48 |
| 2014/0068623 | A1 * | 3/2014 | Kanemasa et al. | 718/103 |

FOREIGN PATENT DOCUMENTS

| JP | 2005-135426 | 5/2005 |
|---|---|---|
| JP | 2005-524886 | 8/2005 |
| JP | 2005-339437 | 12/2005 |
| JP | 2006-011683 | 1/2006 |
| JP | 2008-158889 | 7/2008 |

* cited by examiner

*Primary Examiner* — Camquy Truong
*Assistant Examiner* — Benjamin Wu
(74) *Attorney, Agent, or Firm* — Oblon, Spivak, McClelland, Maier & Neustadt, L.L.P.

(57) ABSTRACT

An operation management apparatus obtains a value Xi indicating the number of process requests being processed by an information processing apparatus during each sampling operation, from N samplings acquired during a specific time period from the information processing apparatus, wherein N is an integer satisfying a condition of $1 \leq N$, and i is an integer satisfying a condition of $1 \leq i \leq N$. The apparatus determines, for a plurality of information processing apparatuses, a ratio of the sum of values Xi, each value Xi having a difference, from a maximum value of the values Xi, falling within a specific range, to the total sum of the values Xi. The apparatus detects an information processing apparatus having the ratio equal to or higher than a specific value.

16 Claims, 43 Drawing Sheets

FIG. 6

```
       111a            111b      111c         111d               111e                   111f
111 ↘
1  ...
2  2009/09/07 01:58:19.987360 (132290-1) 194.185.39.24:51272 -> 194.23.6.226:10443 Request HTTP,     111g
      POST /cgi-bin/AXXPF3943? type=0016&  zid=AXXG13130&  sid=LigkVcFasr8A8__uid=1192
3  2009/09/07 01:58:20.057275 (132291-2891) 194.23.7.168:52245 -> 194.23.8.198:1521 Request DB,
      select name into :b0 from customer where (b_id=TO_NUMBER(:b1) and a_number=TO_NUMBER(:b2))
4  2009/09/07 01:58:20.120100 (131268-309) 194.23.7.168:52245 <- 194.23.8.198:1521 Response DB,16
5  2009/09/07 01:58:20.225221 (131268-309) 194.23.7.168:52245 -> 194.23.8.198:1521 Request DB,
      select TO_CHAR(last_update, 'YYYY/MM/DD HH24:MI:SS' ) into :b0
      from access_log where (b_id=TO_NUMBER(:b1) and a_number=TO_NUMBER(:b2))
6  2009/09/07 01:58:20.321154 (131268-310) 194.23.7.168:52245 -> 194.23.8.198:1521 Request DB,
7  2009/09/07 01:58:20.357440 (132292-1) 194.185.39.25:51272 -> 194.23.6.226:10443 Request HTTP,
      POST /cgi-bin/AXXPF3943?  type=0016&  zid=XXX&  sid=YYY8__uid=ZZZ
8  2009/09/07 01:58:20.411225 (132293-2891) 194.23.7.168:52245 -> 194.23.8.198:1521 Request IIOP,XXX/INF/H00
9  2009/09/07 01:58:20.498217 (131270-288) 194.23.7.168:52245 -> 194.23.8.198:1521 Request DB,select 1 into :b0 from DUAL
   2009/09/07 01:58:20.560519 (131268-310) 194.23.7.168:52245 <- 194.23.8.198:1521 Response DB,16
   ...
```

FIG. 7

```
111
...
10  2009/09/07 01:58:20.793477 (131268-311) 194.23.7.168:52245 -> 194.23.8.198:1521 Request DB,
    select b.name ,NVL(TO_CHAR(b.last_logon_time, 'YYYY/MM/DD HH24:MI:SS'), ' ') into :b0,:b1
    from account_a ,customer_b where (((b.b_id=a.b_id and b.a_number=a.a_number)
    and b.b_id=TO_NUMBER(:b2)) and b.a_number=TO_NUMBER(:b3))
11  2009/09/07 01:58:20.801116 (131270-288) 194.23.7.168:52245 <- 194.23.8.198:1521 Response DB,16
12  2009/09/07 01:58:20.887172 (131270-289) 194.23.7.168:52245 -> 194.23.8.198:1521 Request DB,DATA
13  2009/09/07 01:58:20.991166 (131268-311) 194.23.7.168:52245 <- 194.23.8.198:1521 Response DB,16
14  2009/09/07 01:58:21.121019 (131268-312) 194.23.7.168:52245 -> 194.23.8.198:1521 Request DB,
    update access_log set last_update=TO_DATE(:b0, 'YYYY/MM/DD HH24:MI:SS')
    where (b_id=TO_NUMBER(:b1) and a_number=TO_NUMBER(:b2))
15  2009/09/07 01:58:21.210316 (131268-289) 194.23.7.168:52245 <- 194.23.8.198:1521 Response DB,8
16  2009/09/07 01:58:21.220433 (131268-312) 194.23.7.168:52245 <- 194.23.8.198:1521 Response DB,6
17  2009/09/07 01:58:21.299258 (132291-28991) 194.185.39.24:51272 <- 194.23.6.226:39931 Response IIOP,0
18  2009/09/07 01:58:21.330431 (132290-1) 194.185.39.24:51272 <- 194.23.6.226:10443 Response HTTP,200
19  2009/09/07 01:58:21.412452 (132293-28991) 194.185.39.25:51272 <- 194.23.6.226:39931 Response IIOP,0
20  2009/09/07 01:58:21.533387 (132292-1) 194.185.39.25:51272 <- 194.23.6.226:10443 Response HTTP,200
...
```

RETENTION JOB REQUEST COUNT TABLE

| SERVER NAME | ... | 1:58:20 | 1:58:21 | 1:58:22 | 1:58:23 | 1:58:24 | 1:58:25 | 1:58:26 | 1:58:27 | 1:58:28 | ... |
|---|---|---|---|---|---|---|---|---|---|---|---|
| | | | | | RETENTION JOB REQUEST COUNT | | | | | | |
| WEB SERVER | ... | 23 | 25 | 28 | 26 | 22 | 29 | 30 | 24 | 25 | ... |
| APP SERVER | ... | 15 | 15 | 15 | 15 | 14 | 15 | 15 | 15 | 15 | ... |
| DB SERVER | ... | 6 | 7 | 6 | 6 | 5 | 6 | 7 | 6 | 8 | ... |

| No. | TIME | WEB SERVER | APP SERVER | DB SERVER |
|---|---|---|---|---|
| | COUNTER TABLE | | | MODEL-3 |
| 1 | 01:58:19.987 | 1 | 0 | 0 |
| 2 | 01:58:20.057 | 1 | 1 | 0 |
| 3 | 01:58:20.120 | 1 | 1 | 1 |
| 4 | 01:58:20.225 | 1 | 1 | 1 |
| 5 | 01:58:20.321 | 1 | 1 | 1 |
| 6 | 01:58:20.560 | 1 | 1 | 1 |
| 7 | 01:58:20.793 | 1 | 1 | 1 |
| 8 | 01:58:20.991 | 1 | 1 | 1 |
| 9 | 01:58:21.121 | 1 | 1 | 1 |
| 10 | 01:58:21.220 | 1 | 1 | 0 |
| 11 | 01:58:21.412 | 1 | 0 | 0 |
| 12 | 01:58:21.533 | 0 | 0 | 0 |
| ... | ... | ... | ... | ... |

120a, 124a, 124b, 124c ...

SAME AS EVALUATION RESULTS AT 01:58:20.000

SAME AS EVALUATION RESULTS AT 01:58:21.000

FIG. 32

| | FOURIER ANALYSIS RESULT TABLE | | | WEB SERVER |
|---|---|---|---|---|
| MODEL ID | PERIOD COMPONENT | | | |
| | 16 | 8 | 5.333 | 4 |
| MODEL-1 | -7.159 + 2.205i | 4.243 - 6.657i | -2.384 - 9.174i | -1 + 2i |
| MODEL-2 | 8.217 - 1.064i | -2.414 + 5.657i | 2.244 + 7.701i | 1 - 2i |
| MODEL-3 | 2.396 + 0.973i | 1.293 - 1.121i | -2.172 - 0.650i | -5 + 5i |
| MODEL-4 | 0.009 + 2.631i | -0.707 - 0.293i | -2.631 - 0.676i | -1 - i |
| MODEL-5 | 24.202 - 8.651i | -20.778 + 16.364i | -2.447 + 23.920i | 5 - 3i |
| MODEL-6 | 5.204 - 1.859i | -3.000 - 0.414i | 2.492 + 1.528i | 2 + 2i |
| MODEL-7 | 3.416 + 2.486i | -4.243 - 2.586i | -3.425 + 4.803i | 2 + 4i |

FIG. 34

| MODEL ID | SYNTHETIC AMPLITUDE TABLE (COMPONENT OF PERIOD 8) | | | | | WEB SERVER |
|---|---|---|---|---|---|---|
| | SYNTHETIC AMPLITUDE | | | | | |
| | MODEL-2 | MODEL-3 | MODEL-4 | MODEL-5 | MODEL-6 | MODEL-7 |
| MODEL-1 | 2.084 | 9.547 | 7.797 | 19.174 | 7.179 | 9.243 |
| MODEL-2 | – | 4.672 | 6.206 | 31.981 | 7.537 | 7.331 |
| MODEL-3 | – | – | 1.531 | 24.739 | 2.296 | 4.737 |
| MODEL-4 | – | – | – | 26.831 | 3.774 | 5.726 |
| MODEL-5 | – | – | – | – | 28.632 | 28.564 |
| MODEL-6 | – | – | – | – | – | 7.839 |

FIG. 41
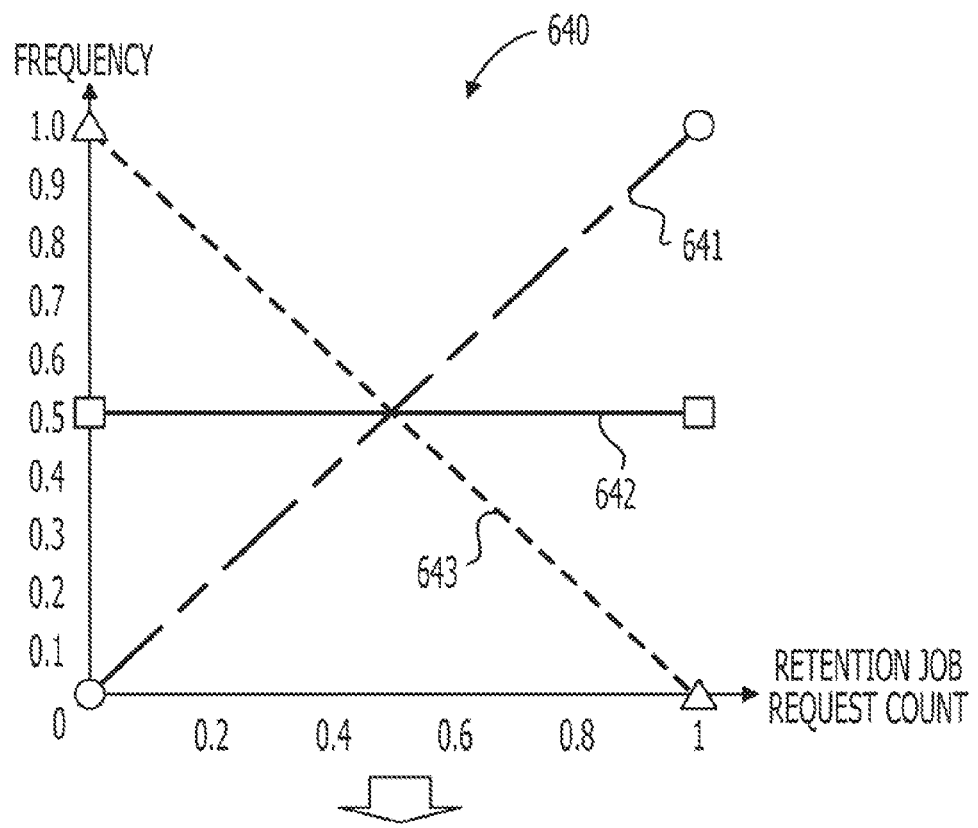
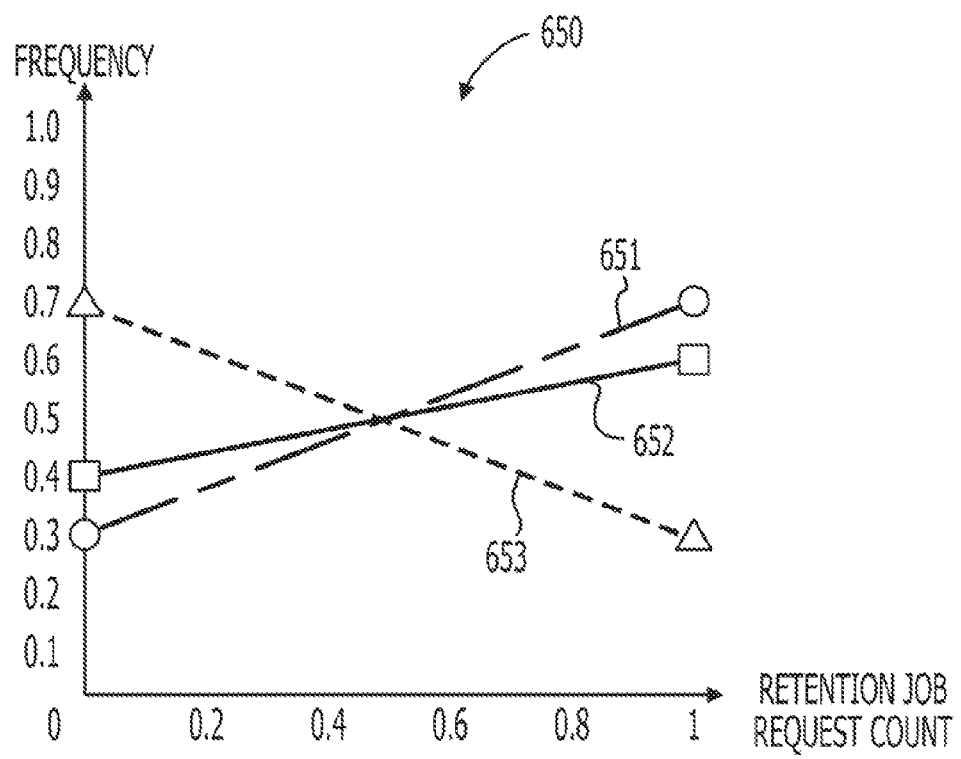

DETECTING BOTTLENECK CONDITION BASED ON FREQUENCY DISTRIBUTION OF SAMPLED COUNTS OF PROCESSING REQUESTS

CROSS-REFERENCE TO RELATED APPLICATIONS

This application is based upon and claims the benefit of priority of the prior Japanese Patent Application No. 2009-288012, filed on Dec. 18, 2009, the entire contents of which are incorporated herein by reference.

FIELD

The embodiments discussed herein are related to a field for managing an operation of an information processing system.

BACKGROUND

In a known information processing system (also referred to as a multi-tier system), a process is distributed in a tier fashion among a plurality of computers. A three-tier system as a multi-tier system is known which includes a web server providing a interface for system use, an application (APP) server executing a process on the system, and a database (DB) server managing data. Each server executes a process in response to a process request from a user, and thus responds to the process request. With each computer performing a distributed portion of the process, reliability and response characteristics of the system are increased.

The information processing system performs a stable operation through an operation management. The multi-tier system is typically used in an important transaction system. High performance response characteristics are typically desirable in the process of the system. If the response characteristics of the system are degraded, it is desirable to learn a tier correctly at which a cause for a process delay occurs.

To identify a delay location over a computer, a specific agent may be performed on the computer, and a usage status of a hardware resource and a software resource may be acquired. In one available technique, a main cause of delay at any resource on the computer is analyzed based on the usage status.

In the multi-tier system, a usage status of a resource and an extension rate of a process time in a computer as a management target may be acquired based on acquired information of the computer. For example, in one available technique, a lack of resources and an extension of the process time help determine a tier of the computer suffering from a process delay.

In one contemplated method, a delay location in a multi-tier system is determined by estimating a process time and a response time in a computer responsive to a process request in accordance with a communication packet flowing over a network.

It is important to identify a tier (hereinafter also referred to as a computer) serving as a bottleneck as a process delay in the multi-tier system. If process delays take place at a plurality of tiers, a delay of a tier as a bottleneck may adversely affect a process of another tier. In such a case, the identification of the tier serving as the bottleneck and the removal of the cause for the bottleneck are efficient in view of increasing performance of the entire system.

The usage status and the process time of each computer may be acquired. If a known technique is applied to analyze the acquired data, a bottleneck may not be appropriately detected. For example, the number of processes executable in parallel may be limited by the setting of an application software program. In such a case, the computer may be free from the lack of resources and the process delay. With any of these techniques of related art, the computer has a difficult in detecting the bottleneck as an anomaly. The cause for the bottleneck may be overlooked.

SUMMARY

An operation management apparatus obtains a value Xi indicating the number of process requests being processed by an information processing apparatus during each sampling operation, from N samplings acquired during a specific time period from the information processing apparatus, wherein N is an integer satisfying a condition of $1 \leq N$, and i is an integer satisfying a condition of $1 \leq i \leq N$. The apparatus determines, for a plurality of information processing apparatuses, a ratio of the sum of values Xi, each value Xi having a difference, from a maximum value of the values Xi, falling within a specific range, to the total sum of the values Xi. The apparatus detects an information processing apparatus having the ratio equal to or higher than a specific value.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed

BRIEF DESCRIPTION OF THE DRAWINGS

FIG. 6 illustrates a restored message;

FIG. 7 illustrates a restored message;

FIG. 10 illustrates a data structure of a retention job request count table of the second embodiment;

FIG. 27 illustrates a modification of the counter table of the third embodiment;

FIG. 32 illustrates a data structure of a Fourier analysis result table of the fourth embodiment;

FIG. 34 is a second chart illustrating the synthetic amplitude table of the fourth embodiment;

FIG. 41 illustrates a change in a frequency distribution responsive to a sampling period modification;

DESCRIPTION OF EMBODIMENTS

The embodiments are described below with reference to the drawings.

First Embodiment

Figure 1:
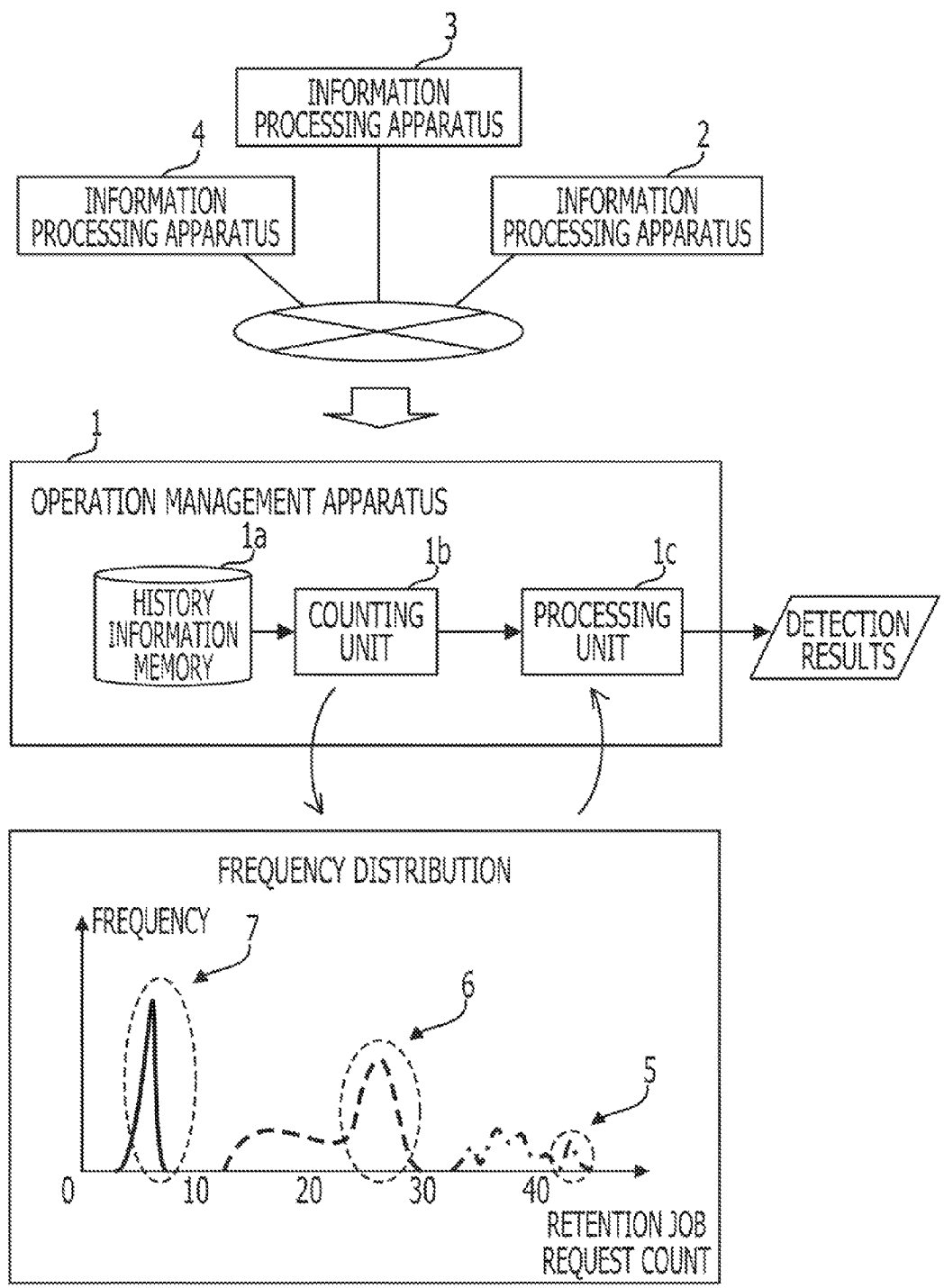
FIG. 1 illustrates an operation management apparatus of a first embodiment.

FIG. 1 illustrates an operation management apparatus 1 of a first embodiment. The operation management apparatus 1 may communicate with information processing apparatuses 2, 3, and 4. An information processing system includes the operation management apparatus 1 and the information processing apparatuses 2, 3, and 4.

The information processing apparatuses 2, 3, and 4 operate in cooperation with each other to perform a process on the system. The information processing apparatuses 2, 3, and 4 are included in a multi-tier system, for example. A web three-tier system may be contemplated as the multi-tier system for example.

The operation management apparatus 1 manages operation of the information processing apparatuses 2, 3, and 4. The operation management apparatus 1 includes a history information memory 1$a$, a counting unit 1$b$, and a processing unit 1$c$.

The history information memory 1$a$ stores history information indicating a history of process requests having occurred in the information processing apparatuses 2, 3, and 4. The history information is communication information that the information processing apparatuses 2, 3, and 4 have exchanged with each other and that the operation management apparatus 1 has collected. The communication information includes a process request between the information processing apparatuses 2, 3, and 4 and a message indicating a response responsive to the process request. The history information may be a log of a process acquired on the information processing apparatuses 2, 3, and 4, for example. As the communication information, the log includes an indication that a process request has been received, and a message indicating a response responsive to the process request, or includes information indicating contents similar to these pieces of information.

The counting unit 1$b$ acquires a value $X_i$ (i is an integer satisfying a condition of $1 \le i \le N$) indicating the number of process requests currently being processed by an information processing apparatus during a sampling operation, from N samplings (N is an integer satisfying a condition $1 \le N$) acquired by the information processing apparatus during a specific time period. More specifically, the counting unit 1$b$ counts the number of process requests being processed by the information processing apparatuses 2, 3, and 4 in the sampling operation every specific period in response to the history information stored on the history information memory 1$a$.

The "retention of a process request" is now discussed. The state of the "retention of the process request" indicates that a process responsive to the process request is currently being in progress. If the process request is input from an information processing apparatus at a higher tier, the process request from a requesting source remains at "retention" at the information processing apparatus at the higher tier until the information processing apparatus at the higher tier receives a response responsive to the process request. The counting unit 1$b$ counts the retention job request count every specific period based on a message included in the history information and a time stamp attached to the message.

The processing unit 1$c$ performs on a plurality of information processing apparatuses a process to determine a ratio of the sum of $X_i$, each $X_i$ having a difference from a maximum value of $X_i$ within a specific range, to the total sum of $X_i$ and then detects an information processing apparatus that provides the ratio equal to or higher than a specific value. More specifically, the processing unit 1$c$ calculates, as a concentration of each of the information processing apparatuses 2, 3, and 4, a ratio of the number of samplings as retention job request counts, each count being within a specific range to a maximum value of the counts, to the total sum of samplings as counting targets of each of the information processing apparatuses 2, 3, and 4. The processing unit 1$c$ detects an information processing apparatus having a concentration equal to or higher than a specific value.

The concentration is an indicator indicating a rate of events falling within a specific range with respect to a maximum value of the retention job request counts to all the events of a distribution of the information processing apparatus.

Information determining the specific range may be preset as a condition like, for example, "within a range of Z % of an identified maximum value (Z is a real number greater than 1 but smaller than 100)".

The processing unit $1c$ acquires a frequency distribution 5 of the retention job request counts of the information processing apparatus 2. The processing unit $1c$ acquires a frequency distribution 6 of the retention job request counts of the information processing apparatus 3. The processing unit $1c$ acquires a frequency distribution 7 of the retention job request counts of the information processing apparatus 4. The frequency refers to a value serving a retention job request count at sampling time.

In the discussion, it is assumed that "Z=10" and a predetermined value of concentration of "0.8" for detecting the information processing apparatus are set, for example. The processing unit $1c$ determines a maximum value of the retention job request counts of each of the information processing apparatuses 2, 3, and 4. In the frequency distribution 5, the processing unit $1c$ identifies a maximum value of "43". The concentration within a range of "43×0.1=4.3" of a maximum value of 43, e.g., within a range of from 38.7 to 43, is determined. The processing unit $1c$ calculates "0.2" as the concentration within this range of the frequency distribution 5, for example. In this case, the concentration 0.2 is smaller than a specific value of concentration "0.8". The processing unit $1c$ does not detect the information processing apparatus 2.

Similarly, the processing unit $1c$ calculates "0.5" as the concentration for the frequency distribution 6. The concentration 0.5 is also smaller than the specific value of concentration "0.8". The processing unit $1c$ does not detect the information processing apparatus 3.

Similarly, the processing unit $1c$ calculates "0.9" as the concentration for the frequency distribution 7. The concentration 0.9 is larger than the specific value of concentration "0.8". The processing unit $1c$ detects the information processing apparatus 4.

As information determining the specific range for the concentration, a condition "within a constant value "Y" of the identified maximum value" may be preset in the processing unit $1c$ besides a parameter specifying the ratio ("Z %").

The counting unit $1b$ in the operation management apparatus 1 acquires $X_i$ ($1 \le i \le N$) indicating the number of process requests being processed by the information processing apparatus during each sampling operation, from N samplings acquired within a specific time period from the information processing apparatus. The processing unit $1c$ performs on a plurality of information processing apparatuses the sum of $X_i$, each $X_i$ having a difference falling within a specific range from a maximum value of $X_i$ to the total sum of $X_i$, and detects an information processing apparatus having a ratio equal to or higher than a specific value.

At the maximum value of the retention job request count, the information processing apparatus thus detected is considered saturated with the retention job request count in view of a count permissible every specific time period. In this case, the information processing apparatus 4 is saturated with the retention job request count and receives no further process request. A process request to be supplied to the information processing apparatus 4 is then retained on the information processing apparatus 3. In other words, the effect of the saturated state of the information processing apparatus 4 reaches the information processing apparatus 3, and causes a process delay on the information processing apparatus 3. The information processing apparatus 4 is thus considered as a bottleneck candidate in the information processing system. The processing unit $1c$ may notify the system user of the detected information processing apparatus as a bottleneck candidate. In this way, the user may start early a solving operation of the bottleneck.

The saturation state is considered attributed to a limitation on the retention job request count (the number of processes executable in parallel) in the operation of an application software program (hereinafter simply referred to as an application). If the operational limitation on the application limits the retention job request count, no anomalies such as an increase in the process time and the lack of resources are not noticed on the information processing apparatus 4. A simple related art method of acquiring the process time and the resource status faces difficulty in detecting a bottleneck candidate.

The operation management apparatus 1 detects a bottleneck candidate based on the concentration of the retention job request counts of each of the information processing apparatuses 2, 3, and 4. A bottleneck candidate caused by the operational limitation of the application is thus appropriately detected.

In the embodiments described in detail below, the operation management apparatus 1 is applied to a web three-tier system.

Second Embodiment

A second embodiment is described in detail with reference to the drawings.

Figure 2:
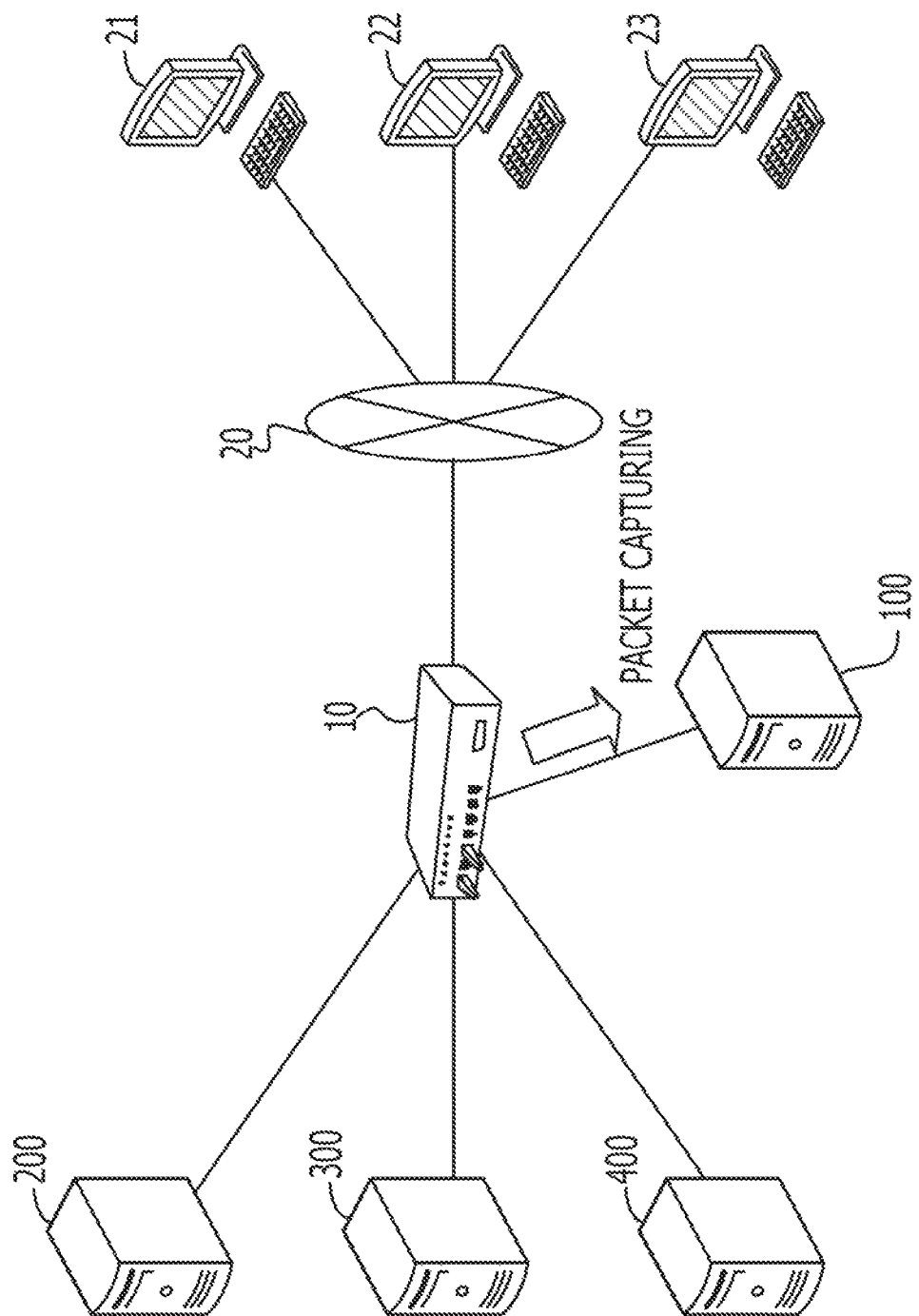
FIG. 2 generally illustrates a transaction system of a second embodiment.

FIG. 2 generally illustrates a transaction system of the second embodiment. The transaction system includes operation management server 100, web server 200, APP server 300, and DB server 400. The operation management server 100, the web server 200, the APP server 300, and the DB server 400 are interconnected to each other via a switch device 10. The switch device 10 is connected to terminal devices 21, 22, and 23 via a network 20.

The terminal devices 21, 22, and 23 may access the web server 200 via the switch device 10, and the network 20. Users of the terminal devices 21, 22, and 23 may use the transaction system by operating on the terminal devices 21, 22, and 23 a graphic user interface (GUI) provided by the web server 200. The network 20 may be an intranet, for example.

The network 20 may be the Internet. In such a case, the switch device 10 may function as a firewall. A network segment to which the web server 200 belongs is handled as a demilitarized zone (DMZ).

The operation management server 100 manages operation of the web server 200, the APP server 300, and the DB server 400. The operation management server 100 may acquire, from the switch device 10, information for such an operation management. More specifically, the switch device 10 has a port mirroring function, and transmits to the operation management server 100 a communication packet which is exchanged among the web server 200, the APP server 300, and the DB server 400. The operation management server 100 receives and stores the communication packet transmitted from the switch device 10 (packet capturing). If the function of the operation management server 100 is mere packet capturing, a repeater hub may be substituted for the switch device 10.

The web server 200 receives a process request (message) for the transaction system from a web browser executed on the terminal devices 21, 22, and 23. The message exchange is performed between the web server 200 and each of the terminal devices 21, 22, and 23 through hypertext transfer protocol (HTTP). Another protocol may also be used.

The process request transmitted from the terminal devices 21, 22, and 23 to the web server 200 is hereinafter referred to as an HTTP request. A response to the HTTP request is referred to as an HTTP response. The request and response are examples of the process request.

In response to the HTTP request received from each of the terminal devices 21, 22, and 23, the web server 200 generates thereon the HTTP response related to static content, and transmits the HTTP response to each of the terminal devices 21, 22, and 23. Regarding dynamic content, the web server 200 generates a process request (message) of a process that the web server 200 requests the APP server 300 to perform, and then transmits the process request to the APP server 300.

The message exchange is performed between the web server 200 and the APP server 300 through Internet inter-object request broker (ORB) protocol (IIOP), for example. Another protocol may also be used.

A process request transmitted from the web server 200 to the APP server 300 may be hereinafter referred to as an IIOP request. A response to the IIOP request is referred to as an IIOP response.

Upon receiving the IIOP response responsive to the IIOP request, the web server 200 generates an HTTP response based on the content of the IIOP response, and then transmits the HTTP response to the terminal devices 21, 22, and 23.

In response to the IIOP request received from the web server 200, the APP server 300 generates a query of a process that the APP server 300 is to request the DB server 400 to perform, and then transmits the query to the DB server 400.

The query generated by the APP server 300 is written using SQL sentence. The query the APP server 300 transmits to the DB server 400 is hereinafter referred to as a DB request. A response to the DB request is referred to as a DB response.

Upon receiving the DB response to the DB request, the APP server 300 generates the IIOP response based on the content of the DB response and then transmits the IIOP response to the web server 200.

The DB server 400 executes the SQL sentence included in the DB request received from the APP server 300, thereby performing a process such as referencing or updating a database, for example. The DB server 400 generates a DB response based on the process results, and then transmits the DB response to the APP server 300.

In the transaction system, the web server 200, the APP server 300, and the DB server 400 are respectively arranged at the web tier, the APP tier, and the DB tier with one server at one tier. Alternatively, a plurality of apparatuses may be arranged at each tier.

In the discussion that follows, the phrase "each server" refers to one of the web server 200, the APP server 300, and the DB server 400. The web server 200 is a server at a tier higher than the tiers of the APP server 300, and the DB server 400. The APP server 300 is a server at a tier higher than the tier of the DB server 400. The information defining the tier relationship is pre-stored on the operation management server 100.

Figure 3:
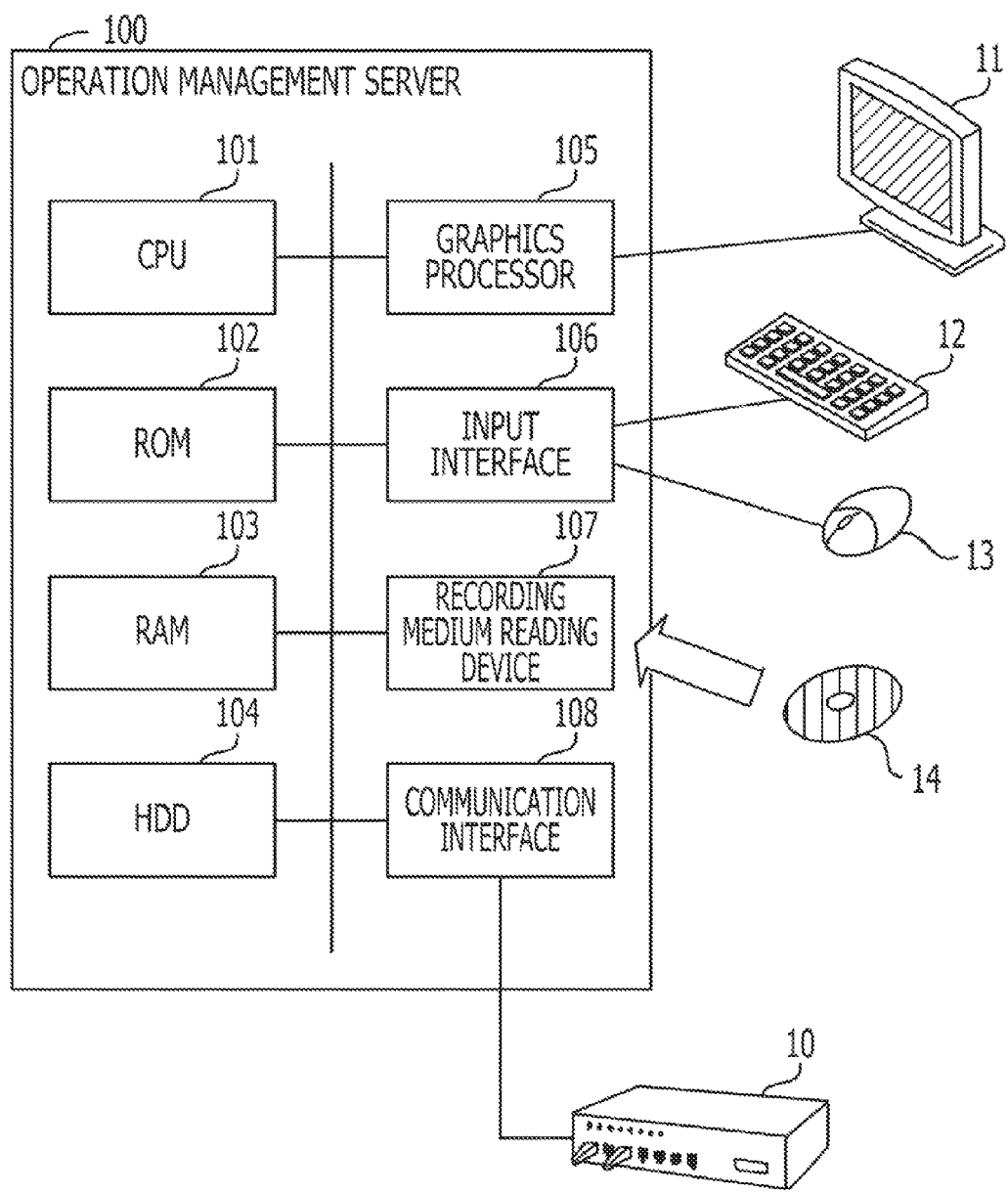
FIG. 3 illustrates a hardware structure of an operation management server of the second embodiment.

FIG. 3 illustrates a hardware structure of an operation management server 100 of the second embodiment. The operation management server 100 includes central processing unit (CPU) 101, read-only memory (ROM) 102, random-access memory (RAM) 103, hard disk drive (HDD) 104, graphics processor 105, input interface 106, recording medium reading device 107, and communication interface 108.

The CPU 101 generally controls the operation management server 100.

The ROM 102 stores a program of a basic input/output system (BIOS) on the operation management server 100.

The RAM 103 temporarily stores at least part of a program of an operating system (OS) and an application program to be executed by the CPU 101. The RAM 103 also stores a variety of data used by the CPU 101 in processing.

The HDD 104 stores the OS program and the application program. The HDD 104 stores a variety of data used by the CPU 101 in processing. Another storage device such as a solid state device (SSD) may be used in place of or together with the HDD 104, for example.

The graphics processor 105 is connected to a monitor 11. The graphics processor 105 displays a image on a screen of the monitor 11 in response to an instruction from the CPU 101.

The input interface 106 connects to a keyboard 12 and a mouse 13. The input interface 106 sends a signal from one of the keyboard 12 and the mouse 13 to the CPU 101.

The recording medium reading device 107 reads data stored on a computer-readable non-transitory storage medium 14. A function of the operation management server 100 is performed by a computer that executes a program describing a process content of the function. Such a program may be recorded on the computer-readable non-transitory storage medium 14 for distribution. The program may be stored on a program delivery server (not illustrated) connected to one of the switch device 10 and the network 20. The operation management server 100 may download a program from the program delivery server via one of the switch device 10 and the network 20.

One of a magnetic recording device, an optical disc, a magneto-optical recording medium, a semiconductor memory may be employed for the computer-readable non-transitory storage medium 14. The magnetic recording devices include HDD, a flexible disc (FD), and a magnetic tape. The optical discs include a compact disc (CD), a CD-R (recordable), a CD-RW (rewritable), digital versatile disc (DVD), and DVD-R/RW/RAM. The magnetic recording medium includes a magneto-optical disc (MO). The semiconductor memory includes a flash memory such as a universal serial bus (USB) memory, for example.

The communication interface 108 is connected to the switch device 10 via a twisted pair (TP) cable or an optical cable. The communication interface 108 performs a data communication with another information processing apparatus via the switch device 10. The communication interface 108 receives via the switch device 10 a communication packet exchanged among the servers.

The web server 200, the APP server 300, the DB server 400 and the terminal devices 21, 22, and 23 may be substantially identical in hardware structure to the operation management server 100.

Figure 4:
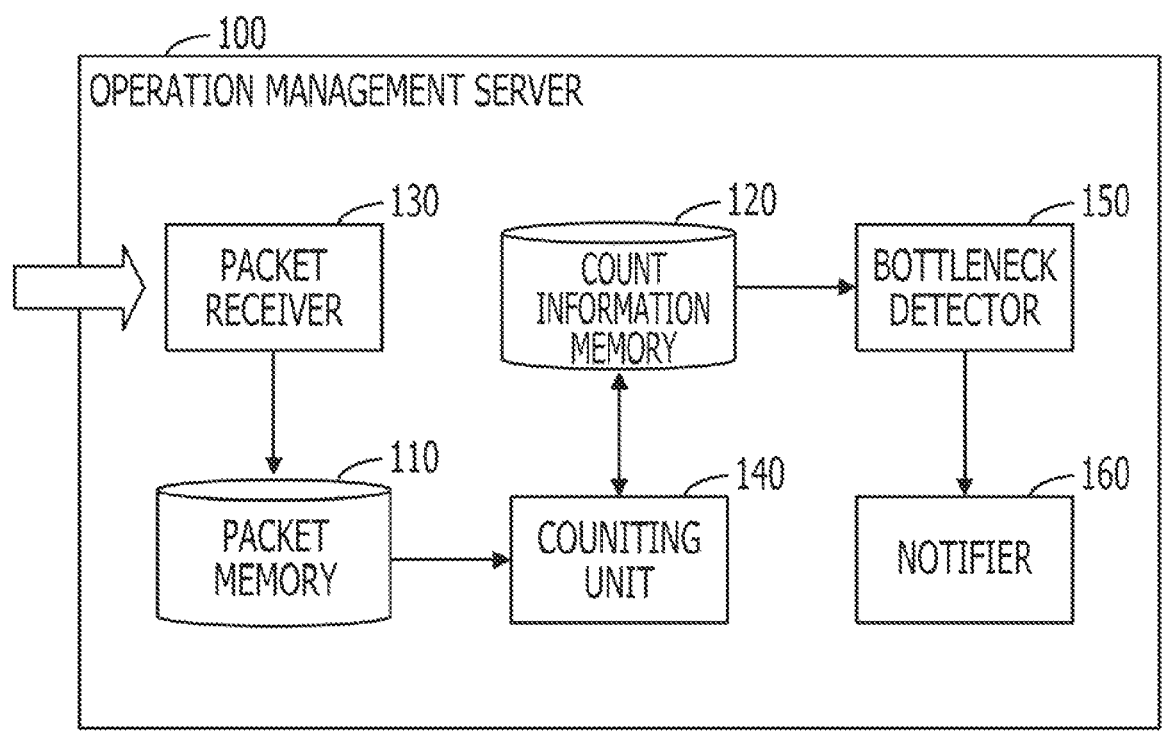
FIG. 4 illustrates a functional structure of the operation management server of the second embodiment.

FIG. 4 illustrates a functional structure of the operation management server 100 of the second embodiment. The operation management server 100 includes packet memory 110, count information memory 120, packet receiver 130, counting unit 140, bottleneck detector 150, and notifier 160. These functions may be performed by the CPU 101 that executes a specific program. These functions may be partly or wholly performed using a dedicated hardware structure.

The packet memory 110 stores packet information of a captured packet.

The count information memory 120 stores information indicating a retention job request count at each server (hereinafter referred to as referred to as "count information").

The packet receiver 130 receives via the switch device 10 a communication packet that is exchanged via the switch device 10. The packet receiver 130 stores on the packet memory 110 the received communication packet as the packet information.

The counting unit 140 restores a message exchanged among the servers based on the packet information stored on the packet memory 110. The counting unit 140 counts the retention job request count at each server based on the restored message, and generates the count information. The counting unit 140 stores the generated count information on the count information memory 120.

Based on the count information stored on the count information memory 120, the bottleneck detector 150 analyzes a frequency distribution of the retention job request counts at each server, and detects as a bottleneck candidate a server having the frequency distribution satisfying conditions described below.

(Condition 1) The concentration of events in the specific range from the maximum value of the retention job request counts is equal to or higher than a threshold value.

(Condition 2) From among the retention job request counts having peaks in the frequency distribution, the peak for a maximum process request does not agree with a normal distribution.

As for a distribution of a server, the concentration is an indicator representing a rate of the number of events falling within a specific range from a maximum value of the retention job request counts to the total number of the events included in the distribution. An evaluation method of the concentration is described later.

The bottleneck detector 150 identifies a server eligible for a bottleneck from the detected bottleneck candidates, and then outputs identification results to the notifier 160.

The notifier 160 notifies the user of the transaction system of information indicating the server acquired from the bottleneck detector 150.

A data structure is described below. The flow of message exchanged in the transaction system is specifically discussed. An example of the data structure of each message is then described.

Figure 5:
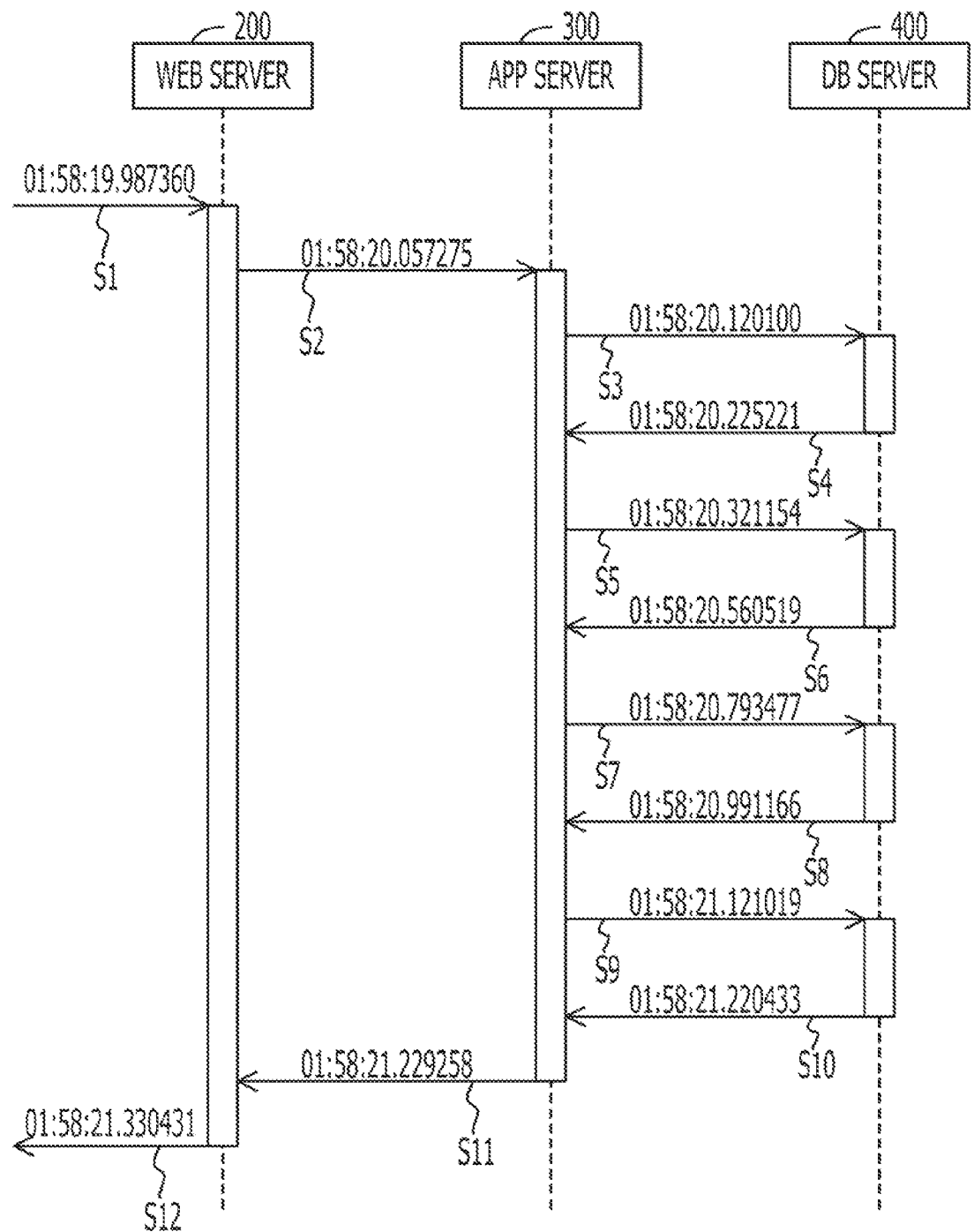
FIG. 5 illustrates a communication sequence of the transaction system.

FIG. 5 illustrates a specific sequence of the communication flow of the transaction system. The process of FIG. 5 is described below in accordance with operation numbers. Each operation in FIG. 5 is tagged with a time stamp (in a format of hour:minute:second.microsecond) at which a communication packet for a message is captured.

(Operation S1) The web server 200 receives an HTTP request from the terminal device 21 (time "01:58:19.987360").

(Operation S2) The APP server 300 receives an IIOP request from the web server 200 (time "01:58:20.057275").

(Operation S3) The DB server 400 receives a DB request from the APP server 300 (time "01:58:20.120100").

(Operation S4) The APP server 300 receives a DB response from the DB server 400 (time "01:58:20.225221").

(Operations S5-S10) The DB server 400 receives DB requests from the APP server 300. In response to the DB requests, the APP server 300 receives DB responses from the DB server 400.

(Operation S11) The web server 200 receives an IIOP response from the APP server 300 (time "01:58:21.229258").

(Operation 12) The web server 200 transmits an HTTP response to the terminal device 21 (time "01:58:21.330431").

Messages are exchanged among the servers in this way.

A similar message flow takes place in response to an HTTP request received from each of the terminal devices 22, and 23.

The operation management server 100 may capture a communication packet exchanged among the apparatuses, and restore a message corresponding to the communication packet. For example, the technique described in Japanese Laid-open Patent Publication No. 2006-011683 may be used as a message restoration method.

FIGS. 6 and 7 illustrate a restored message 111. The restored message 111 includes the content of a message at each operation illustrated in FIG. 5. The counting unit 140 acquires the restored message 111 based on the packet information stored on the packet memory 110. Messages other than messages related to process requests and responses between tiers are not illustrated in the restored messages 111.

Each line of the restored message 111 includes a date field 111a, a time field 111b, a session number field 111c, a transmission source field 111d, a transmission destination field 111e, a command type field 111f, and a message field 111g.

The date field 111a indicates the date on which the message is captured.

The time field 111b indicates the time at which the message is captured.

The session number field 111c indicates a session number managing a resource used in the transmission and reception of the message in the transaction system.

The transmission source field 111d indicates an Internet protocol (IP) address and a port number of a computer as a transmission source of the message.

The transmission destination field 111e indicates an IP address and a port number of a computer as a transmission destination of the message.

The command type field 111f indicates a request/response attribute of a command and a type of the protocol (for HTTP, IIOP, and DB query).

The message field 111g indicates a message content such as a request indicated at the command type field 111f.

The restored message 111 is described by referring to a line number attached thereto.

The HTTP request in operation 1 corresponds to the first line.

As the date of capture of the communication packet corresponding to the line, "2009/09/07" is acquired at the date field 111a, for example.

As the time of the packet capture, "01:58:19.987360" is acquired at the time field 111b, for example.

As the session number, "132290-1" is acquired at the session number field 111c, for example. Unique information of a request/response combination is further acquired at the session number field 111c. This is because a request and a response to the request are exchanged using the same session. For example, the message at the eighteenth line is identified as the HTTP response in response to the HTTP request at the first line.

As the IP address and the port number of the terminal device 21 having transmitted the HTTP request, "194.185.39.24:51272" is acquired at the transmission source field 111d, for example.

As the IP address and the port number of the web server 200 as the transmission destination of the HTTP request, "194.23.6.226:10443" is acquired at the transmission destination field 111e, for example.

As information indicating that the first line is related to the message related to the HTTP request, "Request HTTP" is acquired at the command type field 111f. As the content of the HTTP request, "POST/cgi-bin/ . . . " is acquired at the message field 111g, for example.

What message is transmitted to which server is detected by referencing the restored message 111.

The correspondence relationship between another IP address and apparatus in the restored message 111 is described below.

"194.23.7.168" indicates the IP address of the APP server 300. "194.23.8.198" indicates the IP address of the DB server 400. "194.185.39.25" indicates the IP address of the terminal device 22.

The exchange of the HTTP request/the HTTP response between the web server 200 and the terminal device 22 is identified by the transmission source field 111d, the transmission destination field 111e, and the command type included at each line. More specifically, the exchange is identified by the sixth and twentieth lines of the restored message 111.

The exchange of the IIOP request/the IIOP response between the web server 200 and the APP server 300 is identified by the second, seventh, seventeenth, and nineteenth lines of the restored message 111.

The exchange of the DB request/the DB response between the APP server 300 and the DB server 400 is identified by the third through fifth lines, and eighth through sixteenth lines of the restored message 111.

The time stamp obtained at the timing of the capture of the communication packet by the packet receiver 130 is acquired as information at the date field 111a and the time field 111b. The information at the date field 111a and the time field 111b is not limited to the time stamp. For example, if the communication packet includes the time of the generation of the packet, and the time of the transmission of the packet, the information at the date field 111a and the time field 111b may be the time of the generation of the packet, and the time of the transmission of the packet. In such a case, time synchronization is precisely maintained on the servers in an embodiment.

Figure 8:
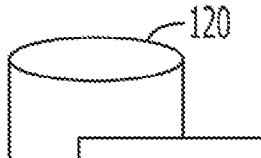
FIG. 8 illustrates a data structure of a message management table of the second embodiment.

FIG. 8 illustrates a data structure of a message management table 121 of the second embodiment. The message management table 121 is generated by the counting unit 140 and then stored on the count information memory 120. The message management table is data the counting unit 140 uses to perform a counting process efficiently.

The message management table 121 includes a column of item numbers, a column of times, a column of session numbers, a column of protocols, and a column of requests/responses. These pieces of information arranged horizontally across the columns at the same row are mapped to each other and related to a single message.

A number identifying a record is listed in the column of item numbers. The time of the capture of the communication packet corresponding to a message is listed in the column of times. A session number identifying a session used to transmit the message is listed in the column of session numbers. Information indicating the protocol of the message is listed in the column of protocols. Information identifying whether the message is a request or a response is listed in the column of request/response.

The message management table 121 includes information of item number "1", time "01:58:10.987", session number "132290", protocol "HTTP", and request/response "Request".

This record corresponds to the first line of the restored message 111. The time is expressed in milliseconds. Optionally, the time may be expressed in more accurate time unit (in microseconds, for example). The session number in the session number field 111c includes a minimum amount of information identifying at least a combination of request/response. In the discussion that follows, the session number refers to information listed in the column of the session number of the message management table 121.

Figure 9:
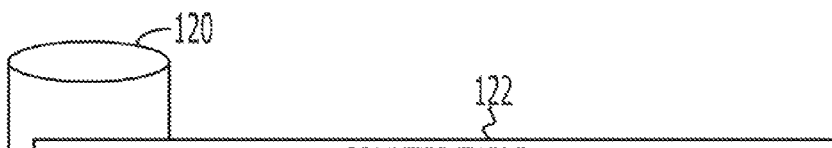
FIG. 9 illustrates a data structure of a counter table of the second embodiment.

FIG. 9 illustrates a data structure of a counter table of the second embodiment 122. The counter table 122 is generated by the counting unit 140 in accordance with the message management table 121, and then stored the count information memory 120. The counter table 122 indicates a retention job request count of each server counted at the timing of the capture of the communication packet corresponding to each message.

The counter table 122 includes a column of item numbers, a column of times, a column of a web server, a column of an APP server, a column of a DB server. These pieces of information arranged horizontally across the columns at the same row are mapped to each other and related the retention job request counts of the servers at a given timing.

A number identifying a record is listed in the column of item numbers. The column of times corresponds to the column of times in the message management table 121. The time set here corresponds to the sampling time in the first embodiment. The column of the web server lists the retention job request count of the web server at the time. The column of the APP server lists the retention job request count of the APP server at the time. The column of the DB server lists the retention job request count of the DB server at the time.

The counting unit 140 generates the counter table 122 by referencing the message management table 121 in the procedures described below.

(Procedure 1) The counting unit 140 extracts a combination of a request and a response to the request from the message management table 121. The combination of the corresponding request and response is identified by the session number. A process request that is difficult to extract as a combination of request/response (for example, a request is present with no corresponding response, or a response is present with no corresponding request) is discarded.

(Procedure 2) The counting unit 140 arranges all the messages in the chronological order.

(Procedure 3) The counting unit 140 references the records of the message management table 121 in the chronological order, and increments the retention job request count of the server by one if a request to the server is captured. Upon capturing a response to the request, the counting unit 140 decrements the retention job request count by one.

The procedure 1 is performed in order to substantially prevent the absence of one of the request and the response from continually increasing the retention job request count. One of the causes for the absence of one of the request and the response may be that a response is not returned because of a process anomaly taking place in the server. Even if a response is returned, the packet may be missing in the capturing phase of the packet, and may not be detected by the operation management server 100.

The counter table 122 includes information of item number "1", time "01:58:19.987", web server 200 "1", APP server "0", and DB server "0", for example. The counting unit 140 generates this record by referencing the message management table 121. More specifically, the message management table 121 indicates that the communication packet of the HTTP request is captured at time "01:58:19.987". This indicates that the HTTP response has been transmitted to the web server 200. In the counter table 122, the counting unit 140 then increments the retention job request count by one as a new retention job request count generated in response to the HTTP request at time "01:58:19.987" on the web server 200. The retention job request count is "0" at each server on the counter table 122 prior to time "01:58:19.987". The retention job request count on the web server 200 is "0+1=1" at time "01:58:19.987".

If a response is made in response to the request, the counting unit 140 decrements the retention job request count by one. For example, the message management table 121 indicates that an HTTP response (session number "132290") was transmitted at time "01:58:21.330" in response to an HTTP request (session number "132290") at time "01:58:19.987". In the counter table 122, the counting unit 140 decrements the retention job request count by one in response to the HTTP response at time "01:58:21.330" on the web server 200. The retention job request count on the web server 200 was "2" at time "01:58:21.299" immediately prior to time "01:58:21.330". The retention job request count on the web server 200 is "2−1=1" at time "01:58:21.330".

Similarly, the counting unit 140 acquires the retention job request count at each time (capturing time) at which each of the APP server 300 and the DB server 400 receives the communication packet.

With a specific sampling period, the counting unit 140 extracts the retention job request counts acquired at a plurality of sampling times. The sampling period may be 1 second, for example. The counting unit 140 thus extracts the retention job request count at each server at times "01:58:20.000", "01:58:21.000", .... The counting unit 140 acquires the retention job request count recorded on each server at time "01:58:19.987" immediately prior to time "01:58:20.000", as the retention job request count on each server at time "01:58:20.000". Further, the counting unit 140 acquires the retention job request count recorded on each server at time "01:58:19.991" immediately prior to time "01:58:21.000", as the retention job request count on each server at time "01:58:21.000".

The counting unit 140 acquires the retention job request count on each server with the sampling period (every 1 second, for example).

FIG. 10 illustrates a data structure of a retention job request count table 123 of the second embodiment. The retention job request count table 123 is generated by the counting unit 140 and then stored on the count information memory 120. The retention job request count table 123 includes a column of server names and columns of retention job request counts. These pieces of information arranged horizontally across the columns at the same row are mapped to each other and indicate the retention job request counts on one server at each time.

A server name is set in the column of server names. Retention job request counts at times are set in the columns of retention job request counts.

The retention job request count table 123 includes information of server name "web server", retention job request count "23" at time "1:58:20" and retention job request count "25" at time "1:58:21", ..., for example. These values are acquired as the retention job request counts at the corresponding times from the counter table 122.

Small values are listed in the counter table 122 so that a change in the retention job request count is noticeable. In an actual operation, however, larger values may be listed in the counter table 122. To be more specific, data of larger values than in the counter table 122 is used in the retention job request count table 123.

The counter table 122 and the retention job request count table 123 serve as raw data for a frequency distribution and correspond to the count information.

The reason why the counting unit 140 extracts the retention job request count from the counter table 122 with the specific sampling period is that an amount data to be processed is reduced to reduce a calculation cost. Optionally, the counter table 122 may be used as is as the retention job request count table 123.

Figure 11:
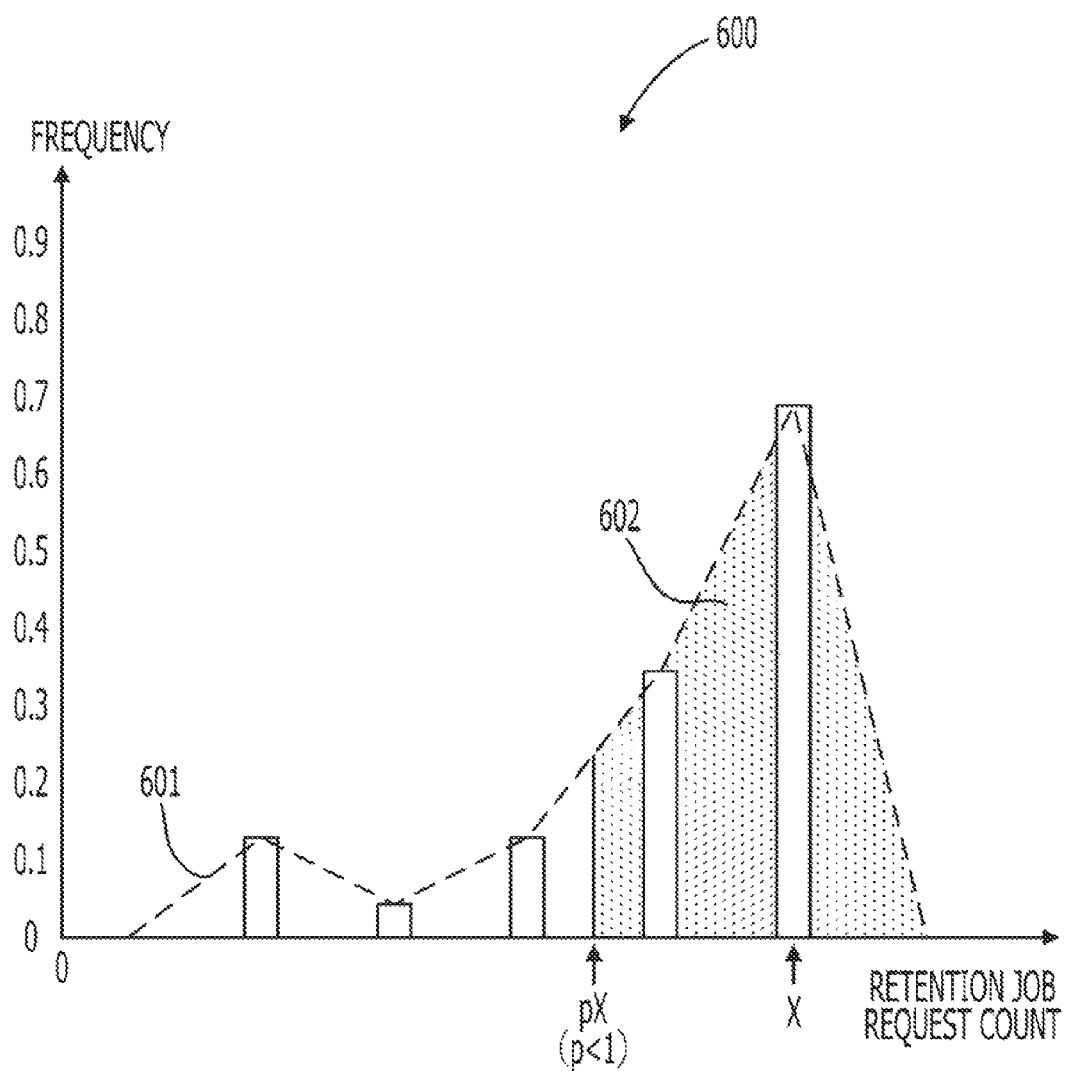
FIG. 11 defines the definition of a concentration.

FIG. 11 defines the concentration. The bottleneck detector 150 determines a frequency distribution 600 of the retention job request counts in accordance with the retention job request count table 123 stored on the count information memory 120. The frequency distribution 600 includes a distribution function 601 indicating a series of frequencies of the values of the retention job request counts.

The bottleneck detector 150 calculates the concentration of the distribution in the vicinity of the maximum value in accordance with the following methods MA1 and MA2. As previously discussed, the concentration is the indicator representing how the frequency of occurrences of the retention job request counts is concentrated immediately prior to the maximum value of the frequency of the retention job request counts.

(Method MA1) The bottleneck detector 150 acquires a maximum value X of the retention job request counts in the frequency distribution. The bottleneck detector 150 calculates pX by multiplying the maximum value X by a rate p ($p<1$) in order to determine a range from the maximum value to calculate the concentration. The rate P is determined depending on an application used in the transaction system. For example, 0.9 is preset for the rate p. The bottleneck detector 150 then determines, as a concentration, a ratio E2/E1 where E1 represents the total number of events included in the whole frequency distribution and E2 represents the number of events of the retention job request counts equal to or higher than pX and equal to or lower than X.

(Method MA2) The method MA2 is identical to the method MA1 to until pX is calculated. The bottleneck detector 150 calculates an area S1 enclosed by the distribution function 601 and the horizontal axis. The bottleneck detector 150 further calculates an area S2 of an area 602 enclosed by the distribution function 601, the horizontal line, and a vertical line represented by the retention job request count=pX. The ratio of the areas, S2/S1, is set to be the concentration.

The method MA1 is now considered. If the maximum value X is small, the concentration is determined based on the number of events alone corresponding to the maximum value X depending on the values of the maximum value X and the rate p. The concentration may not be properly evaluated. For example, with the maximum value X=6 and the rate p=0.9, the target range of evaluation of the concentration covers the retention job request count within a range equal to or higher than 5.4 and equal to or lower than 6. The value E2 becomes equal to the number of events corresponding to the maximum value X (=6). The concentration accounting for the retention job request counts smaller than the maximum value X is not precisely evaluated.

In one embodiment, the ratio S2/S1 in the method MA2 may be used in order to evaluate the concentration precisely even if the maximum value X is a small value of the retention job request count. In the evaluation method of the method MA2, a minimum value (5.4, for example) and a maximum value (6, for example) of the evaluation target range of the concentration are reflected in the calculation results of the concentration. In the discussion that follows, it is assumed that the method MA2 is used as the calculation method of the concentration.

Optionally, if the maximum value X is a large value (10 or larger, for example), the method MA1 may be used, and if the maximum value X is a small value (smaller than 10), the method MA2 may be used. With this arrangement, calculation load may be reduced while the evaluation accuracy of the concentration is maintained.

Figure 12:
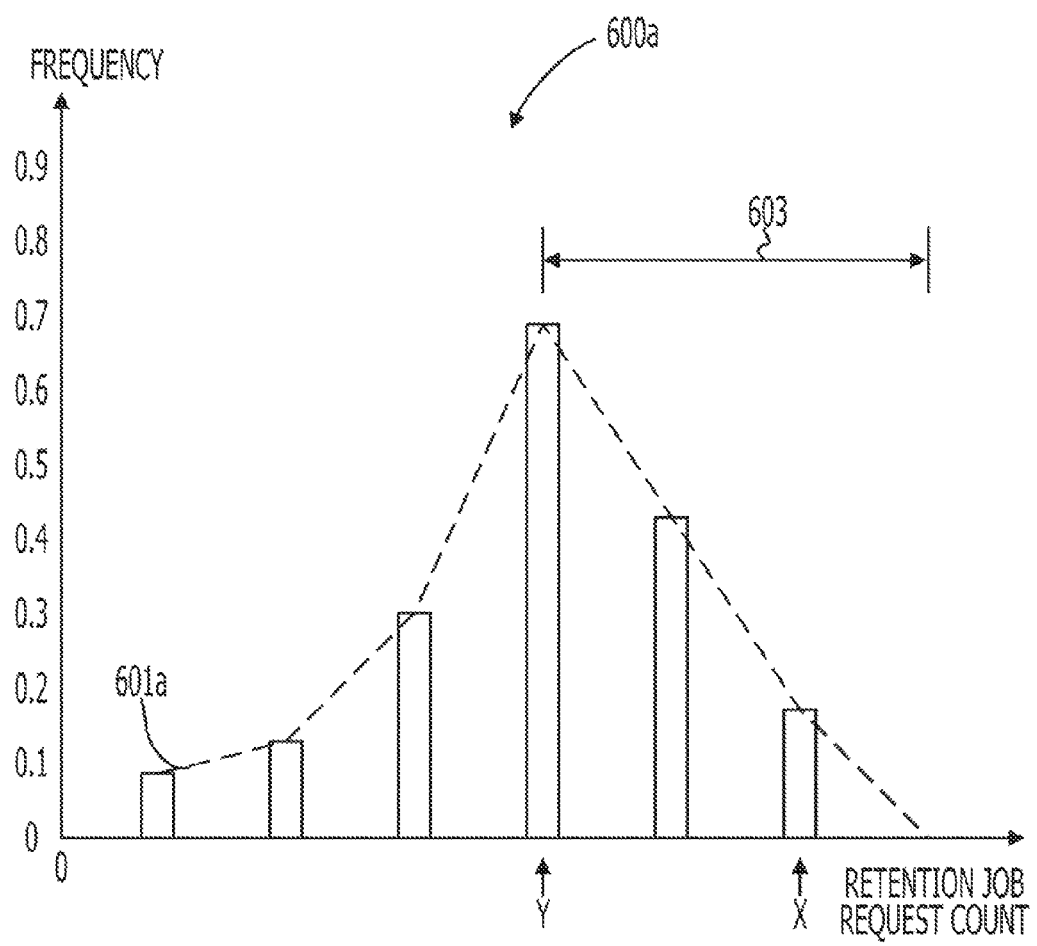
FIG. 12 illustrates a specific determination method of determining whether a frequency distribution is a normal distribution or not.

FIG. 12 specifically illustrates a determination method of determining whether the frequency distribution is a normal distribution or not. The bottleneck detector 150 may acquire a frequency distribution 600*a* of the retention job request counts based on the retention job request count table 123 stored on the count information memory 120. In the frequency distribution 600*a*, a distribution function 601*a* indicates a series of frequencies of the values of the retention job request counts. The frequency distribution 600*a* may include a plurality of peaks. In such a case, a peak corresponding to the largest value of the retention job request counts is set to be the frequency distribution from among the plurality of peaks of the distribution function 601*a*, for example.

The bottleneck detector 150 determines whether the distribution indicated by the distribution function 601*a* is a normal distribution or not, through one of the following methods MB1 and MB2.

(Method MB1) The distribution function 601*a* is fitted with a normal distribution function. One of the fitting methods may be a non-linear least squares fitting, for example. Chi-square ($\chi^2$) testing is performed on a distribution function obtained through the fitting method and the distribution function 601*a*. More specifically, whether the frequency distribution is a normal distribution is determined based on chi-square values of spectrum residues for the two functions, degrees of freedom of a chi-square distribution, and a chi-square distribution of degrees of freedom. Information for the chi-square testing (such as the chi-square distribution of the degrees of freedom and the level of significance of the testing) is predetermined.

(Method MB2) It is determined whether the distribution function 601*a* monotonically decreases within a range 603 extending from the largest value Y of the frequencies of occurrence of the retention job request counts to the maximum value X of the retention job request count. If the distribution function 601*a* monotonically decreases, the frequency distribution is determined as a normal distribution. If the distribution function 601*a* does not decrease monotonically, the frequency distribution is not determined as a normal distribution. If Y=X, the distribution function 601*a* does not decrease monotonically, and the frequency distribution is not a normal distribution.

In comparison of the method MB2 with the method MB1, the calculation load of the method MB2 is smaller. A precise determination of the normal distribution is not necessary. In one embodiment, the method MB2 is used in order to reduce the workload of the determination.

The process of the operation management server 100 thus constructed is described in detail.

Figure 13:
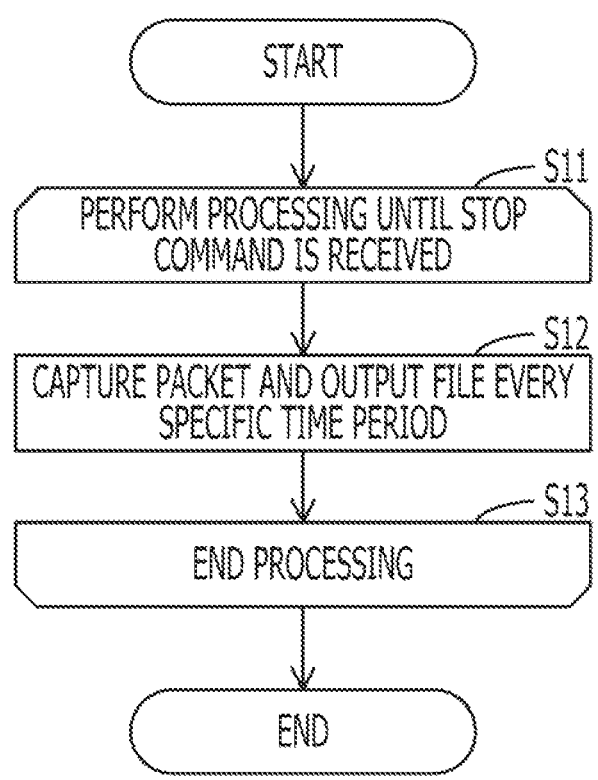
FIG. 13 illustrates a packet capture process of the second embodiment.

FIG. 13 illustrates a packet capture process of the second embodiment. The process is described below with reference to operation numbers of FIG. 13.

(Operation S11) The packet receiver 130 starts waiting for a communication packet from the switch device 10. The packet receiver 130 performs the startup operation at a timing of a specific startup input (start command) received on one of the keyboard 12 and the mouse 13 operated by the user. The packet receiver 130 repeats the operations described below until a specific stop input (stop command) received on one of the keyboard 12 and the mouse 13 operated by the user is received.

(Operation S12) The packet receiver 130 captures the received communication packet and stores the communication packet on the packet memory 110. The packet receiver 130 outputs a group of captured communication packets as a plurality of files split every specific time period.

(Operation S13) The packet receiver 130 stops the packet capturing process in response to a stop command.

The packet receiver 130 thus outputs the communication packet group as the plurality of files that have been accumulated for a constant period of time. A time period throughout which one file is produced by accumulating the communication packet group is referred to as a bottleneck analysis period. The counting unit 140 performs a counting process by file unit output with the bottleneck analysis period.

If the bottleneck analysis period is too long, an amount of packet data increases, and a calculation amount of the counting process performed at a later stage increases. An excessive workload is imposed on the operation management server 100. A bottleneck occurring during a short time period may be overlooked. On the other hand, if the bottleneck analysis period is too short, the amount of packet data is small, and results may be greatly affected by a particular small amount of process. In one embodiment, the bottleneck analysis period is determined appropriately taking into consideration the system hardware and the process of the application. For example, the bottleneck analysis period may be 10 to 60 seconds in the web three-tier system such as the transaction system of the embodiment.

If the packet information is output in a plurality of files, the packet capture process and bottleneck detection process may be performed concurrently in parallel. More specifically, since the bottleneck detection does not need to stop the packet capture process, the missing of a communication packet that could happen during a suspension of the packet capture process is substantially prevented. Each time a new file is output from the packet receiver 130 to the packet memory 110, the counting unit 140 performs the counting process on the output file.

A monitoring process of monitoring the generation of a bottleneck is described. The bottleneck detection process is included in the monitoring process.

Figure 14:
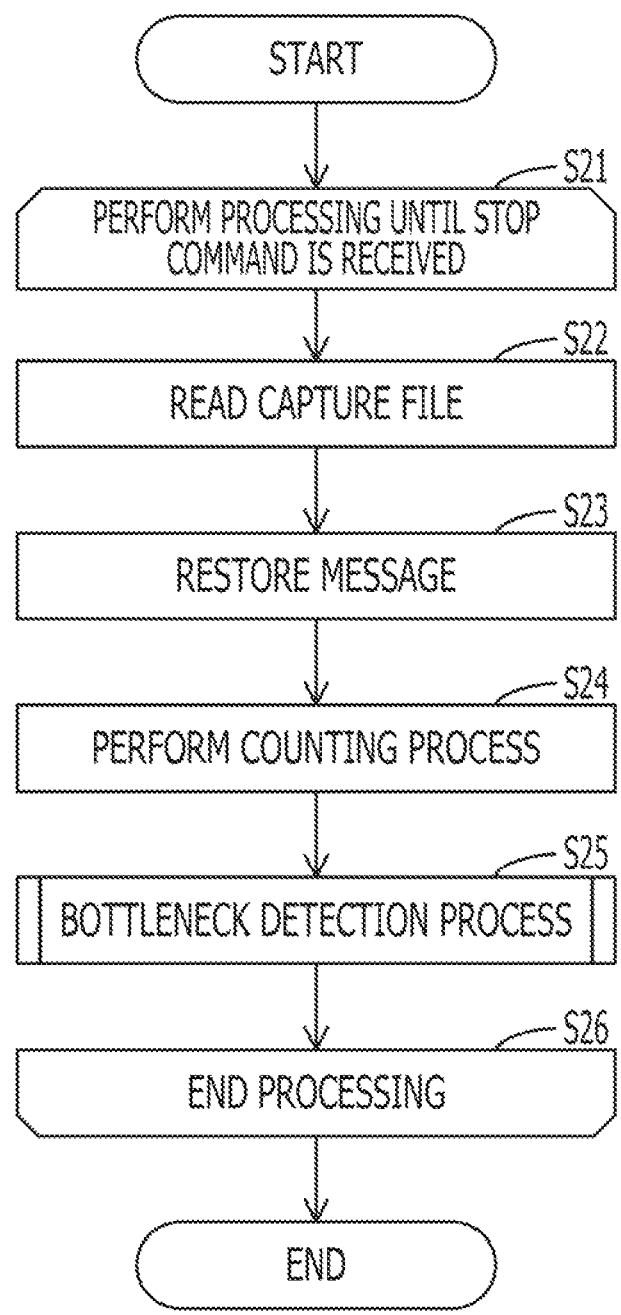
FIG. 14 illustrates a monitoring process of the second embodiment.

FIG. 14 illustrates the monitoring process of the second embodiment. The monitoring process is described below with reference to operation numbers of FIG. 14.

(Operation S21) The counting unit 140 starts monitoring whether the packet receiver 130 outputs a file to the packet memory 110. The counting unit 140 performs the startup operation at a timing of a specific startup input (start command) received on one of the keyboard 12 and the mouse 13 operated by the user. The counting unit 140 repeats the operations described below until a specific stop input (stop command) received on one of the keyboard 12 and the mouse 13 operated by the user is received. The start command and the stop command may be received as the same commands as or different commands from those received by the packet receiver 130 in the operation S11.

(Operation S22) The counting unit 140 reads a new file if the new file is output to the packet memory 110.

(Operation S23) The counting unit 140 restores a message exchanged among the servers in accordance with the read file.

(Operation S24) The counting unit 140 generates a message management table 121 in accordance with the restored message, and then stores the message management table 121 onto the count information memory 120. The counting unit 140 generates a counter table 122 in accordance with the message management table, and then stores the counter table 122 on the count information memory 120. The counting unit 140 generates a retention job request count table 123 in accordance with the counter table and then stores the retention job request count table 123 on the count information memory 120.

(Operation S25) The bottleneck detector 150 determines a frequency distribution of the retention job request counts on each server in accordance with the retention job request count table 123. The bottleneck detector 150 determines whether the distribution determined on each server satisfies a specific condition, and detects a server satisfying the specific condition as a bottleneck candidate. The bottleneck detector 150 identifies a server eligible for a bottleneck from among the bottleneck candidates, and outputs the identification results to the notifier 160. The notifier 160 notifies the user of the transaction system of information indicating the server acquired from the bottleneck detector 150.

(Operation S26) Upon receiving a stop command, the counting unit 140 stops monitoring the file output. The monitoring process of the generation of the bottleneck is thus complete.

If a new file is output to the packet memory 110 in response to the packet capturing of the packet receiver 130, the counting unit 140 performs the counting process. The bottleneck detector 150 performs the bottleneck detection process, based on the retention job request count table 123 output from the counting unit 140 to the count information memory 120.

The bottleneck detection process in operation S25 is described in detail below.

Figure 15:
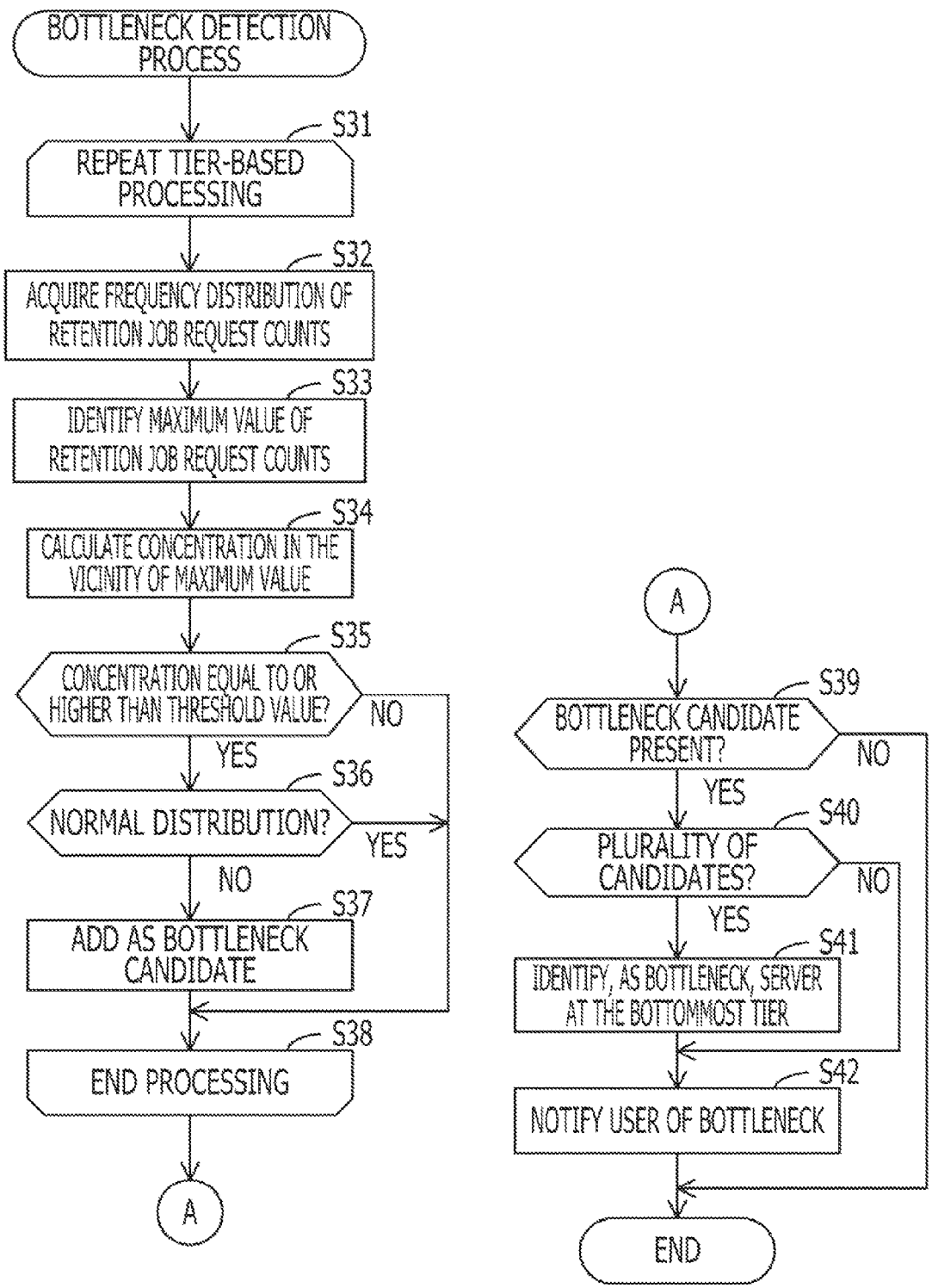
FIG. 15 illustrates a bottleneck detection process of the second embodiment.

FIG. 15 illustrates the bottleneck detection process of the second embodiment. The bottleneck detection process is described below with reference to operation numbers of FIG. 15.

(Operation S31) The bottleneck detector 150 repeats processing to operation S38 on a per tier basis of the transaction system. According to the embodiment, one server is arranged at one tier, and the processing to operation S38 may be performed on a per server basis.

(Operation S32) The bottleneck detector 150 acquires a frequency distribution of the retention job request counts of a server as a process target in accordance with the retention job request count table 123 stored on the count information memory 120.

(Operation S33) The bottleneck detector 150 identifies a maximum value of the retention job request counts in the acquired frequency distribution.

(Operation S34) The bottleneck detector 150 calculates the concentration in the vicinity of the maximum value of the retention job request counts in the frequency distribution.

(Operation S35) The bottleneck detector 150 determines whether the concentration is equal to or higher than a threshold value. If the concentration is equal to or higher than the threshold value, processing proceeds to operation S36. If the concentration is lower than the threshold value, processing proceeds to operation S38.

(Operation S36) The bottleneck detector 150 determines whether the frequency distribution is a normal distribution. If the frequency distribution is not a normal distribution, processing proceeds to operation S37. If the frequency distribution is a normal operation, processing proceeds to operation S38.

(Operation S37) The bottleneck detector 150 adds the server as a bottleneck candidate.

(Operation S38) The bottleneck detector 150 proceeds to operation S39 if all the tiers (servers) are processed. If an unprocessed tier (server) remains, processing returns to operation S31.

(Operation S39) The bottleneck detector 150 determines whether a bottleneck candidate has been detected in operations S31-S38. If a bottleneck candidate has been detected in operations S31-S38, processing proceeds to operation S40. If no bottleneck candidate is detected, processing is complete.

(Operation S40) The bottleneck detector 150 determines whether a plurality of bottleneck candidates has been detected. If a plurality of bottleneck candidates has been detected, processing proceeds to operation S41. If no plurality of bottleneck candidates has been detected, e.g., if a single bottleneck candidate has been detected, processing proceeds to operation S42.

(Operation S41) The bottleneck detector 150 identifies as a bottleneck a server at the bottommost tier from among the plurality of bottleneck candidates. If the APP server 300 and the DB server 400 are detected as bottleneck candidates, the DB server 400 is identified as a bottleneck. The bottleneck detector 150 outputs to the notifier 160 information indicating the server as the identified bottleneck.

(Operation S42) The notifier 160 notifies the user of the invention indicating the server as the bottleneck acquired from the bottleneck detector 150.

The bottleneck detector 150 detects the bottleneck server in this way.

The bottleneck detector 150 detects a bottleneck candidate based on the frequency distribution of the retention job request counts. In comparison with the related art method, a bottleneck candidate may be detected appropriately even if a process delay takes place in servers at a plurality of tiers. A problem described below is solved, for example.

A related art method for measuring a process time or the like has difficulty in detecting a bottleneck occurring at a lower tier with respect to an upper tier. If the number of process requests transmitted from the upper tier to the lower tier increases greatly beyond the number of process requests processable by the lower tier, a response time at the lower tier may continuously increase. The retention job request count at the lower tier is typically limited by the operation setting of the application. If the number of process requests to the lower tier is appropriately controlled at the upper tier, the transmission of the process requests larger in number than a specific number to the lower tier is controlled. In such a case, an increase in the process time at the lower tier is controlled to some degree, for example. On the other hand, waiting time to transmit a process request from the upper tier to the lower tier increases. A process delay thus takes place at the upper tier.

The related art method has difficulty in determining whether a delay caused at each tier is caused by an increase in the process time of an apparatus at the tier or an increase in the process waiting time at another tier. In the related art method, it may be erroneously determined that a bottleneck is present at a tier having an increase in the process waiting time (the upper tier in the above example).

In contrast, the bottleneck detector 150 evaluates the concentration of the frequency distribution of the retention job request counts. The bottleneck candidate is appropriately detected taking into consideration the limit to the retention job request count of the application.

If a plurality of servers is arranged at each tier, which tier serves as a bottleneck may be detected. For example, if a plurality of web servers is arranged at a web tier, the counting unit 140 determines the total sum of the retention job request counts of the web servers (tier-based retention job request count) as the retention job request count at the web tier. The columns of the retention job request count table 123 listing the retention job request counts thus list the tier-based retention job request counts at the web tier, the APP tier, and the DB tier in place of the values at the web server, the APP server, and the DB server. The bottleneck detector 150 identifies a tier serving as a bottleneck by executing the bottleneck detection process in accordance with the tier-based retention job request count table acquired on a per tier basis.

Optionally, whether to detect the bottleneck on a per tier basis or on a server basis may be selected by the user. For example, the operation management server 100 displays a GUI for this selection on the monitor 11. The operation management server 100 then receives an operational input received on one of the keyboard 12 and the mouse 13 operated by the user.

The bottleneck detection process is performed in response to three patterns of bottleneck occurrence discussed below.

In a first pattern bottleneck occurrence, a bottleneck occurs in a single server.

In a second pattern bottleneck occurrence, a bottleneck occurs in a server at a lower tier, and the occurrence of the bottleneck affects a server at an upper tier.

In a third pattern bottleneck occurrence, a bottleneck occurs in a server at the bottommost tier, and the occurrence of the bottleneck affects the servers at all the upper tiers.

The first pattern is discussed first.

Figure 16:
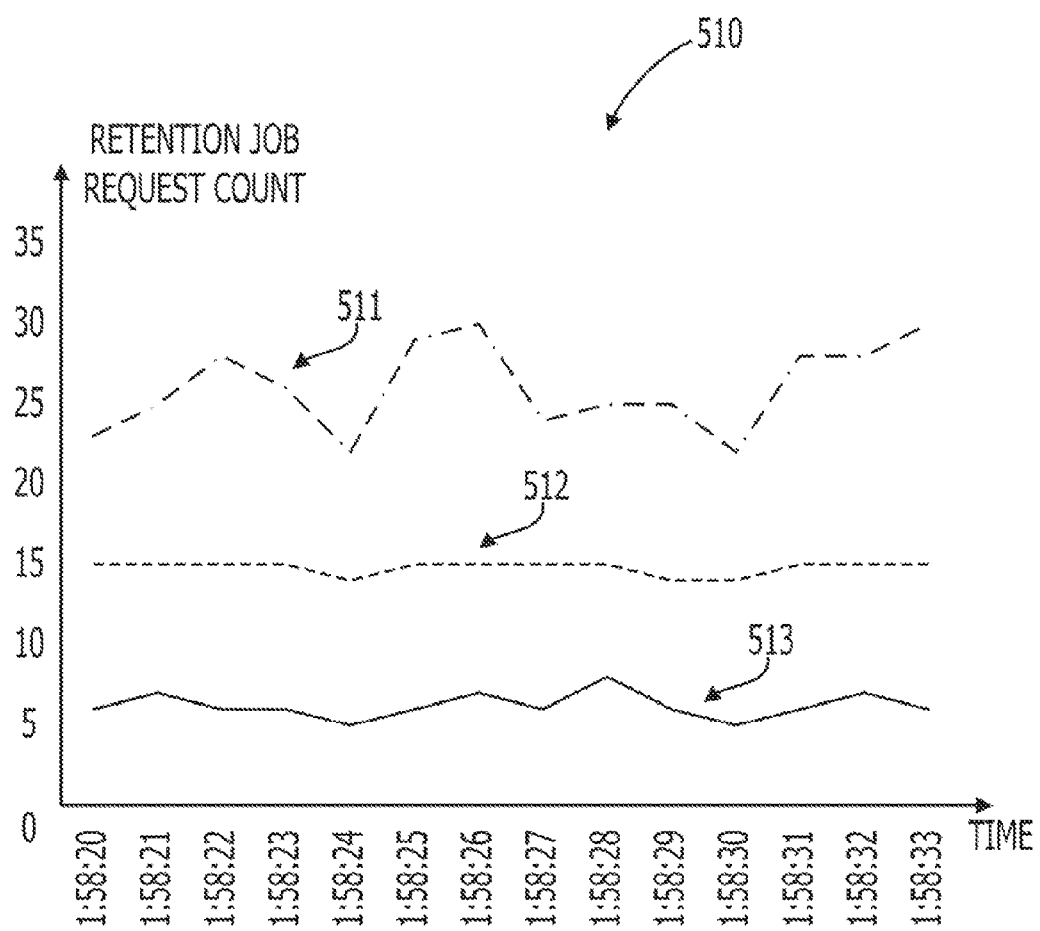
FIG. 16 illustrates a time-series transition of the retention job request count responsive to a first pattern.

FIG. 16 illustrates a time-series transition of the retention job request count in the first pattern bottleneck occurrence. The time-series transition 510 includes time series 511, 512, and 513. The time series 511 indicates a time-series transition of the retention job request count on the web server 200. The time series 512 indicates a time-series transition of the retention job request count of the APP server 300. The time series 513 indicates a time-series transition of the retention job request count of the DB server 400.

The time-series transition 510 illustrates that a bottleneck is present in the APP server 300 because the degree of process concurrency of the APP server 300 is limited to "15". A typical cause of the occurrence of the bottleneck is that the maximum number of threads is set to be too low on the APP server 300 based on the inputting of an erroneous usage prediction of the transaction system. In the discussion here, it is assumed that no limit is set on the degree of process concurrency on both the web server 200 and the DB server 400 or that a sufficient margin is allowed in the permissible amount of process concurrency of the retention job request count on both the web server 200 and the DB server 400.

As denoted by the time series 512, the retention job request count on the APP server 300 remains at a value "15" or lower. Since a percentage of the process requests to the APP server 300 may be transmitted to the DB server 400, the retention job request count on the DB server 400 remains typically at a particular value. In this case, no limit is imposed on the retention job request count on the DB server 400 (or a sufficient margin is allowed in the permissible value of the retention job request count on the DB server 400). The time series 513 varies with time within a certain band with respect to the highest frequency of occurrence of the retention job request count thereof.

Figure 17:
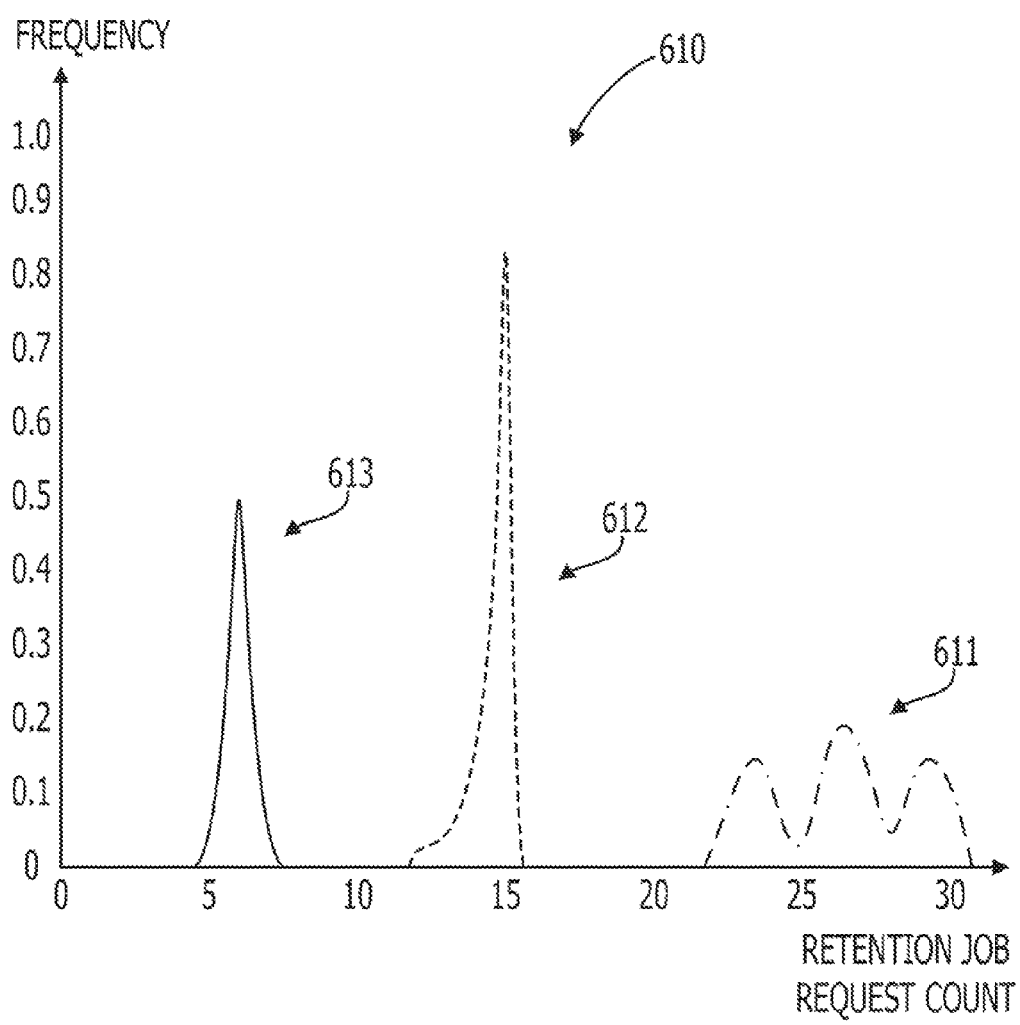
FIG. 17 illustrates a frequency distribution of the retention job request count responsive to the first pattern.

FIG. 17 illustrates frequency distribution 610 of the retention job request count in the first pattern bottleneck occurrence. The frequency distribution 610 includes distributions 611, 612, and 613. The distribution 611 indicates the frequency distribution of the retention job request count of the web server 200. The distribution 611 corresponds to the time series 511. The distribution 612 indicates the frequency distribution of the retention job request count of the APP server 300. The distribution 612 corresponds to the time series 512. The distribution 613 indicates the frequency distribution of the DB server 400. The distribution 613 corresponds to the time series 513.

The retention job request count does not reach the limit thereof on each of the web server 200 and the DB server 400. The distributions 611 and 612 become close to a normal distribution (or a combination of normal distributions). As denoted by the time series 512, the retention job request count remains about at "15" on the APP server 300. The time series 512 has a peak with a retention job request count of "15" as a maximum value, and then falls to a small value from "15". In the distribution 612, a frequency of a retention job request count equal to or higher than "16" is "0".

The bottleneck detector 150 analyzes the distributions 611, 612, and 613 in the procedure of the bottleneck detection process illustrated in FIG. 15, and detects a bottleneck candidate.

More specifically, the bottleneck detector 150 selects a server as an analysis target, and acquires a distribution corresponding to the server. The bottleneck detector 150 calculates the concentration in the vicinity of the maximum value of the retention job request counts included in the acquired distribution. The bottleneck detector 150 then determines whether the concentration is equal to or higher than a specific threshold value and whether the distribution is a normal distribution. If the concentration is equal to or higher than the threshold value and if the distribution agrees with a normal distribution, the server corresponding to the distribution is set to be a bottleneck candidate. A next server is selected and the process is repeated on the selected server.

For example, the web server 200 is not eligible for a bottleneck candidate because the concentration is lower than the specific threshold value on the distribution 611. The APP server 300 is eligible for a bottleneck candidate because the concentration is equal to or higher than the specific threshold value on the distribution 612 and the distribution is not a normal distribution. The DB server 400 is not eligible for a bottleneck candidate because the concentration is equal to or higher than the specific threshold value on the distribution 613 but the distribution agrees with a normal distribution.

The bottleneck detector 150 thus detects appropriately a server that has become a bottleneck with a limit imposed on the retention job request count.

In the first pattern, the bottleneck occurs on the APP server 300, but is not continuous. On the long-term average, the bottleneck is a load falling within a range processed within a permissible response time in the whole transaction system. In contrast, if the terminal devices 21, 22, and 23 continually transmit a lot of requests over a long period of time, the requests are retained on the upper web server 200. This is the second pattern.

The second pattern is described below.

Figure 18:
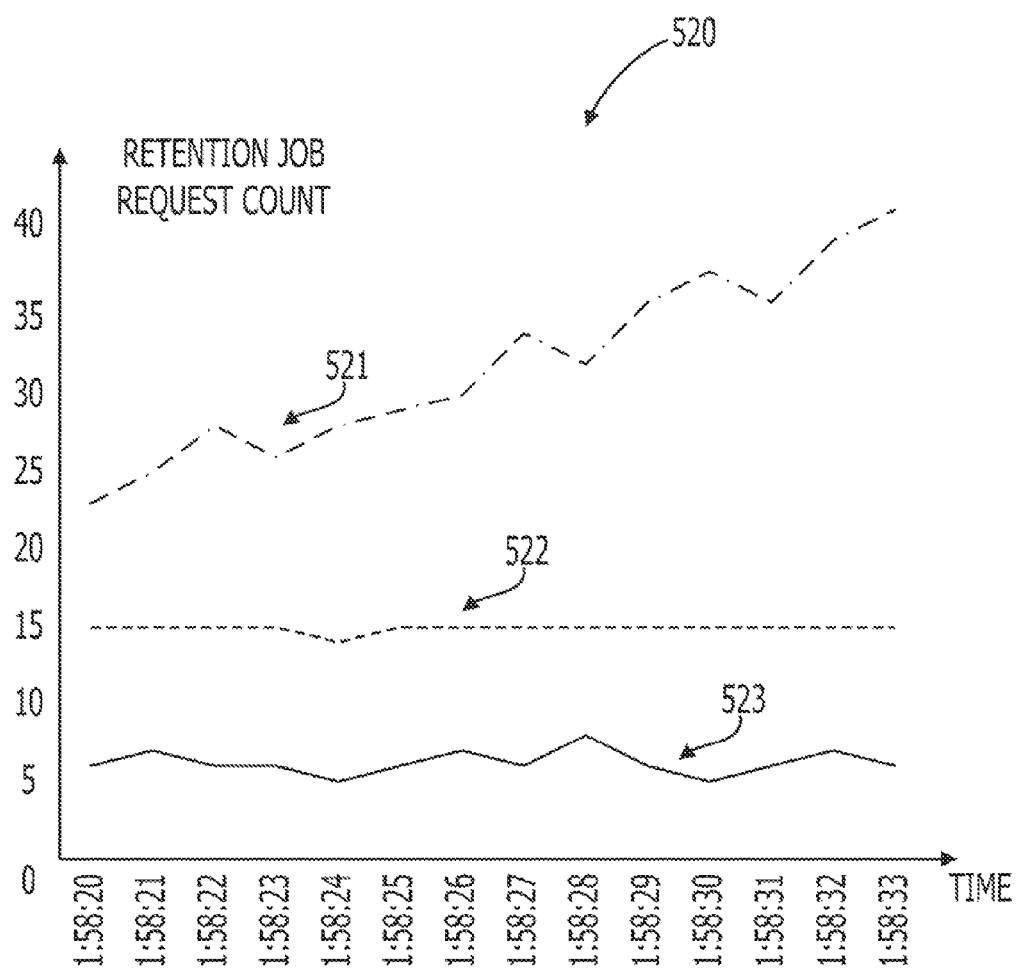
FIG. 18 illustrates a time-series transition of the retention job request count responsive to a second pattern.

FIG. 18 illustrates a time-series transition 520 of the retention job request count in the second pattern bottleneck occurrence. The time-series transition 520 includes time series 521, 522, and 523. The time series 521 indicates a time-series transition of the retention job request count on the web server 200. The time series 522 indicates a time-series transition of the retention job request count on the APP server 300. The time series 523 indicates a time-series transition of the retention job request count on the DB server 400.

The time-series transition 520 illustrates that a bottleneck is present in the APP server 300 because the degree of process concurrency of the APP server 300 is limited to "15". In the discussion here, it is assumed that no limit is set on the degree of process concurrency on both the web server 200 and the DB server 400 or that a sufficient margin is allowed in the permissible amount of process concurrency on both the web server 200 and the DB server 400.

As denoted by the time series 522, the retention job request count on the APP server 300 remains at a value of about "15" or lower. Since a percentage of the process requests of the APP server 300 is transmitted to the DB server 400, the retention job request count on the DB server 400 remains typically at a particular value. In this case, no limit is imposed on the retention job request count on the DB server 400 (or a sufficient margin is allowed in the permissible value of the retention job request count on the DB server 400). The time series 523 varies with time within a certain band with respect to the highest frequency of occurrence of the retention job request count thereof.

The web server 200 continually receives the HTTP responses from the terminal devices 21, 22, and 23. The number of IIOP requests the web server 200 requests the APP server 300 to process is above on average the permissible amount ("15") processable by the APP server 300. Even if more IIOP requests are sent to the APP server 300, the web server 200 remains unable to receive an IIOP response to the IIOP request from the APP server 300. The web server 200 then continues to transmit the IIOP request to the APP server 300 at specific intervals until an IIOP response has been received from the APP server 300. The web server 200 thus accumulates the data that is not transmitted together with the HTTP response to the terminal devices 21, 22, and 23. As a result, the retention job request count continuously increases on the web server 200 with time.

Figure 19:
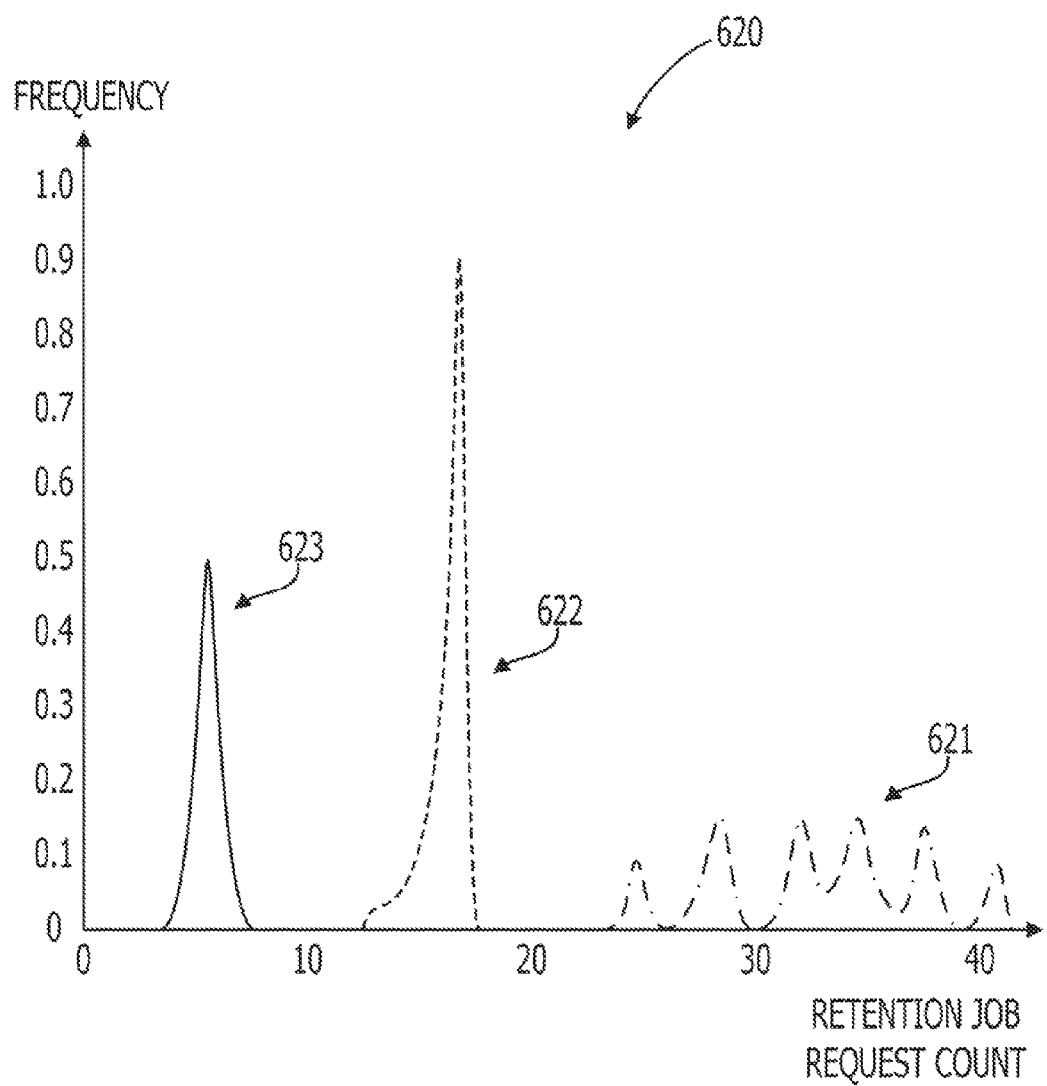
FIG. 19 illustrates a frequency distribution of the retention job request count responsive to the second pattern.

FIG. 19 illustrates a frequency distribution 620 of the retention job request count in the second pattern bottleneck occurrence. The time-series distribution 620 includes distributions 621, 622, and 623. The distribution 621 indicates the frequency distribution of the retention job request count of the web server 200. The distribution 621 corresponds to the time series 521. The distribution 622 indicates the frequency distribution of the retention job request count of the APP server 300. The distribution 622 corresponds to the time series 522. The distribution 623 indicates the frequency distribution of the retention job request count of the DB server 400. The distribution 623 corresponds to the time series 523.

The retention job request count does not reach the limit thereof on each of the web server 200 and the DB server 400, and the distributions 621 and 623 are close to a normal distribution (or a combination of normal distributions). The retention job request count remains at about "15" on the APP server 300 as denoted by the time series 522. The distribution 622 has a peak of the distribution with a retention job request count of "15" as a maximum value, and then falls from "15" to a small value. The frequency above a retention job request count of "16" or higher is "0" on the distribution 622.

The retention job request count continuously increases with time on the web server 200 as denoted by the time series 521. A retention job request count higher in value than a retention job request count illustrated on the distribution 611 is measured on the distribution 621.

The bottleneck detector 150 analyzes the distributions 621, 622, and 623 in accordance with the procedure of the bottleneck detection process of FIG. 15, and detects a bottleneck candidate.

The web server 200 is not a bottleneck candidate because the concentration is lower than the specific threshold value on the distribution 621. The APP server 300 becomes a bottleneck candidate because the concentration is equal to or higher than the specific threshold value on the distribution 622 with the distribution 622 being not a normal distribution. The DB server 400 is not a bottleneck candidate because the concentration is equal to or higher than the specific threshold value on the distribution 623 with the distribution 623 being a normal distribution.

The bottleneck detector 150 appropriately detects a server as a bottleneck even if a bottleneck server affects an upper server with the retention job request count substantially increased on the upper server.

The third pattern is described below. In the third pattern, a limit is imposed on the value of the retention job request count of each of the APP server 300 and the DB server 400.

Figure 20:
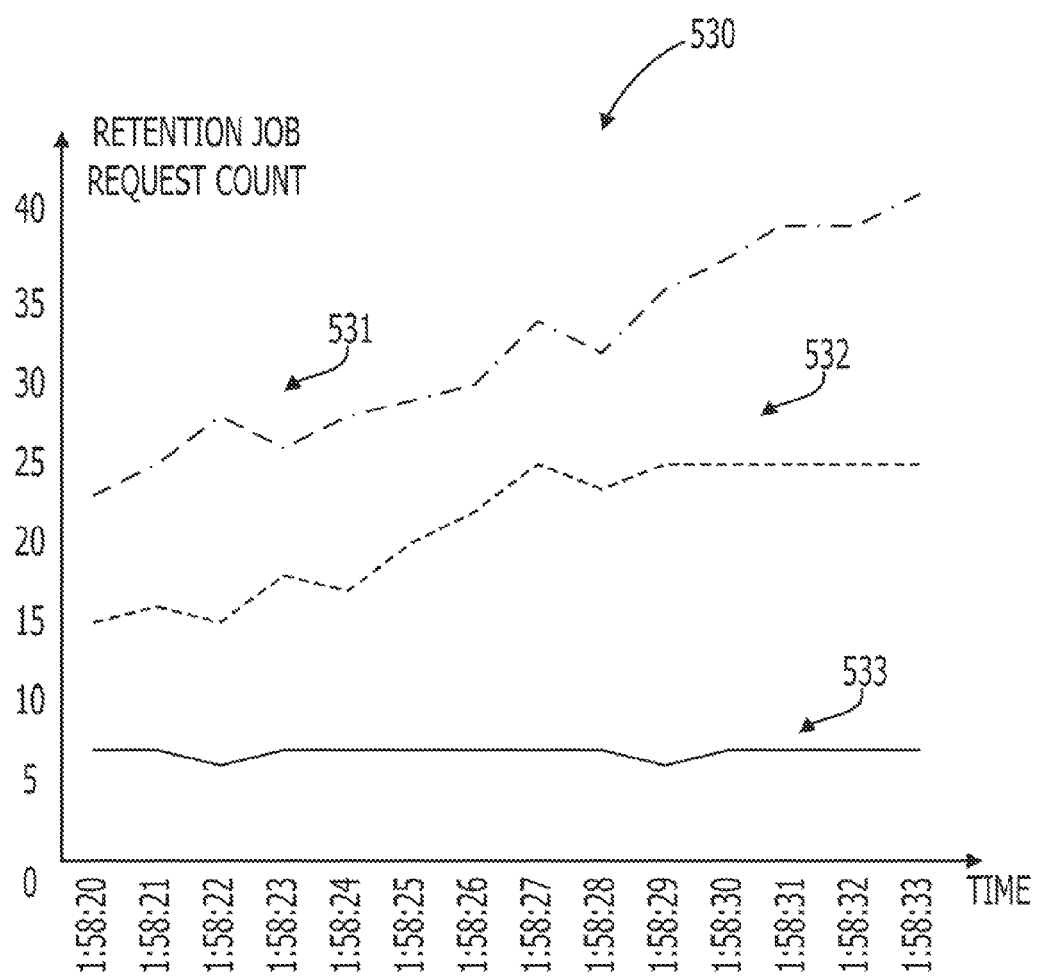
FIG. 20 illustrates a time-series transition of the retention job request count responsive to a third pattern.

FIG. 20 illustrates a time-series transition 530 of the retention job request count in accordance with the third pattern. The time-series transition 530 includes time series 531, 532, and 544. The time series 531 indicates a time-series transition of the retention job request count of the web server 200. The time series 532 indicates a time-series transition of the retention job request count of the APP server 300. The time series 533 indicates a time-series transition of the DB server 400.

In the time-series transition 530, the process concurrency of the APP server 300 is limited to "25", and the process concurrency of the DB server 400 is limited to "6". No limit is imposed on the process concurrency of the web server 200, or a sufficient margin is allowed in the permissible amount of the retention job request count on the web server 200.

As denoted by the time series 533, the retention job request count generally remains at a value of about "6" or smaller. The web server 200 continually receives requests from the terminal devices 21, 22, and 23 as denoted by the time series 531. The APP server 300 has then difficulty in responding to the requests received from the web server 200 and the retention job request count increases (within a time period from time "1:58:20 to time "1:58:27"). After the time period, the retention job request count generally remains at a value of about "25" or smaller on the APP server 300 as denoted by the time series 532.

Figure 21:
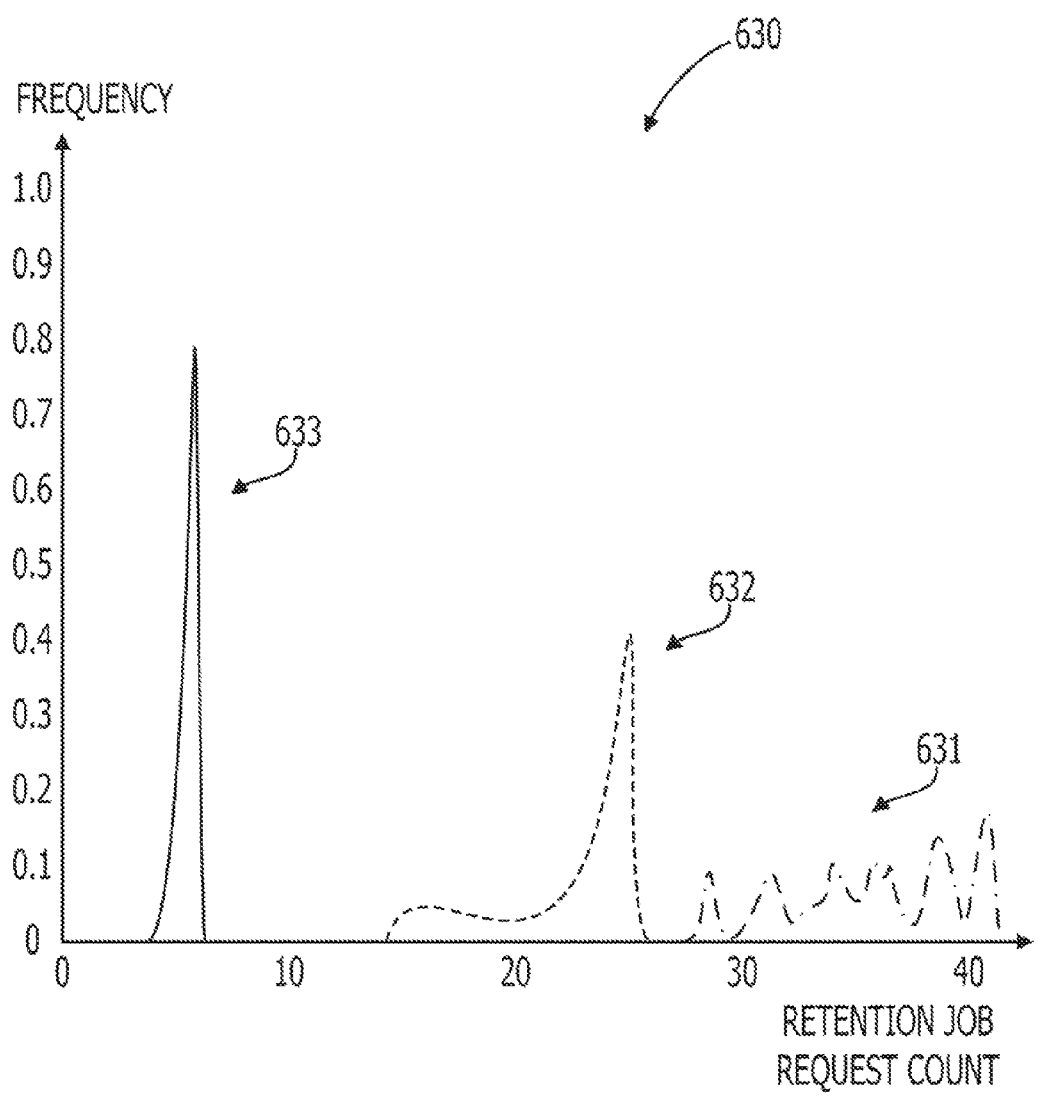
FIG. 21 illustrates a frequency distribution of the retention job request count responsive to the third pattern.

FIG. 21 illustrates a time-series transition 630 of the frequency distribution of the retention job request count in accordance with the third pattern. The time-series transition 630 includes distributions 631, 632, and 633. The distribution 631 indicates the frequency distribution of the retention job request count of the web server 200. The distribution 631 corresponds to the time series 531. The distribution 632 indicates the frequency distribution of the retention job request count of the APP server 300. The distribution 632 corresponds to the time series 532. The distribution 633 indicates the frequency distribution of the retention job request count of the DB server 400. The distribution 633 corresponds to the time series 533.

The retention job request count does not reach a limit with the distribution 631 being close to a normal distribution (or a combination of normal distributions) on the web server 200. The retention job request count continuously increases with time as denoted by the time series 531.

The retention job request count generally remains at a value of about "6" as denoted by the time series 533. The distribution 633 has a peak with a maximum value of retention job request count of "6" and then falls from "6" to a smaller value. A frequency of a retention job request count of "7" or higher is "0" in the distribution 633.

The retention job request count generally remains at a value of about "25" on the APP server 300 as denoted by the time series 532. The distribution 632 has a peak with a maximum value of retention job request count of "25" and then falls from "25" to a smaller value. A frequency of a retention job request count of "26" or higher is "0" in the distribution 632.

The bottleneck detector 150 analyzes the distributions 631, 632, and 633 and detects a bottleneck in accordance with the procedure of the bottleneck detection process of FIG. 15.

The web server 200 is not a bottleneck candidate because the concentration is lower than the specific threshold value on the distribution 631. The APP server 300 becomes a bottleneck candidate because the concentration is equal to or higher than the specific threshold value on the distribution 632 with the distribution 632 being not a normal distribution. The DB server 400 becomes a bottleneck candidate because the concentration is equal to or higher than the specific threshold value on the distribution 633 with the distribution 633 being not a normal distribution.

The bottleneck detector 150 detects the APP server 300 and the DB server 400 as bottleneck candidates. In such a case, the bottleneck detector 150 detects as a bottleneck at a server at a lower tier, for example.

If a plurality of bottleneck candidates is present, an increase in the retention job request count at an upper tier is considered to be a secondary event caused by an increase in the retention job request count at a lower tier. A bottleneck is appropriately identified even if bottleneck candidates are found in servers at a plurality of tiers.

Third Embodiment

A third embodiment of described below. The following discussion focuses on a difference between the second embodiment and the third embodiment, and the discussion of similarities therebetween is omitted here.

According to the third embodiment, a bottleneck candidate is detected in the transaction system every process unit. The structure of the third embodiment is described in detail below.

The entire structure of the transaction system of the third embodiment remains unchanged from the entire structure of the transaction system of the second embodiment except that the operation management server 100 is replaced with a operation management server 100a.

The hardware structure of each apparatus included the transaction system of the third embodiment remains unchanged from the hardware structure of the operation management server 100 of the second embodiment discussed with reference to FIG. 3, and the discussion thereof is omitted here.

Figure 22:
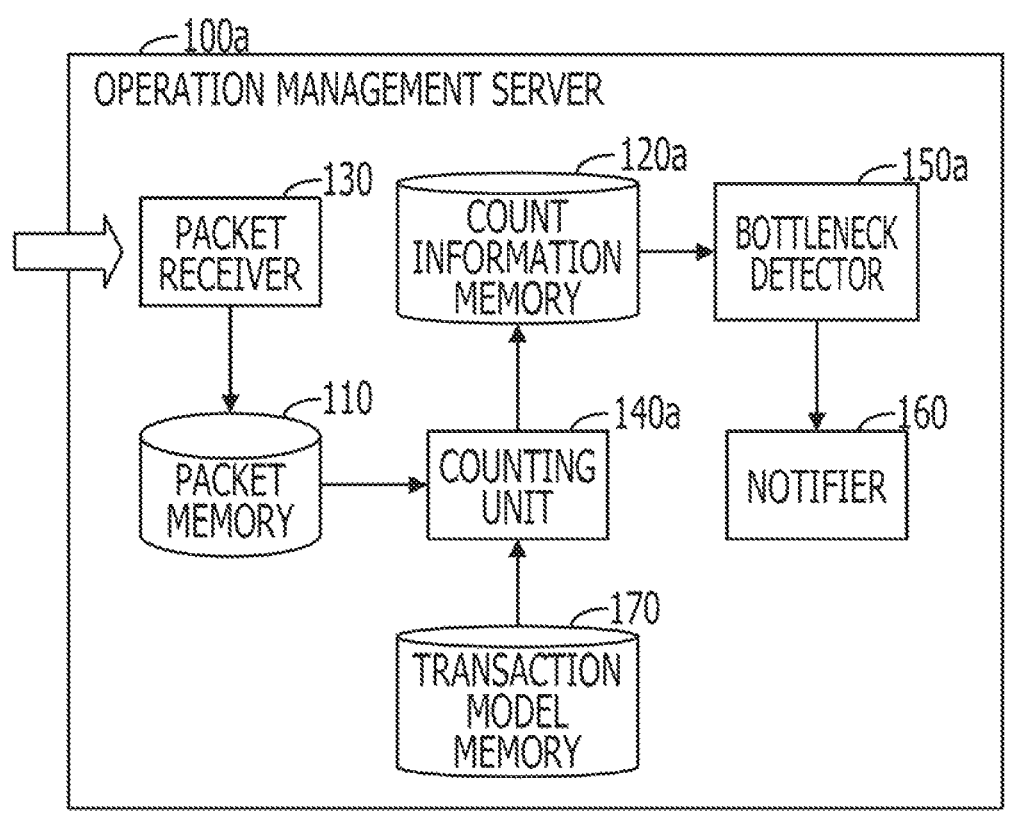
FIG. 22 illustrates a functional structure of an operation management server of a third embodiment.

FIG. 22 illustrates a functional structure of the operation management server 100a of the third embodiment. The operation management server 100a includes packet memory 110, count information memory 120a, packet receiver 130, counting unit 140a, bottleneck detector 150a, notifier 160, and transaction model memory 170. The functions of these elements are performed by the CPU 101 that executes a specific program. These functions may be partly or wholly performed using a dedicated hardware structure.

The packet memory 110, the packet receiver 130, and the notifier 160 are substantially identical in structure to the counterparts in the operation management server 100 of the second embodiment discussed with reference to FIG. 4, and the discussion thereof is omitted here.

The count information memory 120a stores count information. The count information is acquired on a per server basis in accordance with the second embodiment. The count information is acquired by process unit in accordance with the third embodiment. The process unit refers to a unit of process executed in the transaction system. For example, one process unit may be defined as a series of operations performed on each server from when the server receives an HTTP request from one of the terminal devices 21, 22, and 23 to when the server gives an HTTP response to the HTTP request. In the discussion that follows, the process unit is referred to as a transaction model.

The counting unit 140a restores a message exchanged between the servers in accordance with the packet information stored on the packet memory 110. The counting unit 140a references transaction model definition information stored on the transaction model memory 170, thereby mapping the restored message to a transaction model. In response to the message of each transaction model, the counting unit 140a counts the retention job request count of each server on a per transaction model basis, and generates the count information.

The counting unit 140a stores the generated count information onto the count information memory 120a.

In response to the count information stored on the count information memory 120a, the bottleneck detector 150a analyzes the frequency distribution of the retention job request count of each server on a per transaction model basis and detects as a bottleneck candidate a server having the frequency distribution satisfying specific conditions. The specific conditions remain unchanged from the conditions 1 and 2 used by the bottleneck detector 150.

The bottleneck detector 150a identifies from among the detected bottleneck candidates a server eligible for a bottleneck, and outputs the identification results to the notifier 160.

The transaction model memory 170 stores the transaction model definition information defining a plurality of transaction models that may be executed by the transaction system.

Figure 23:
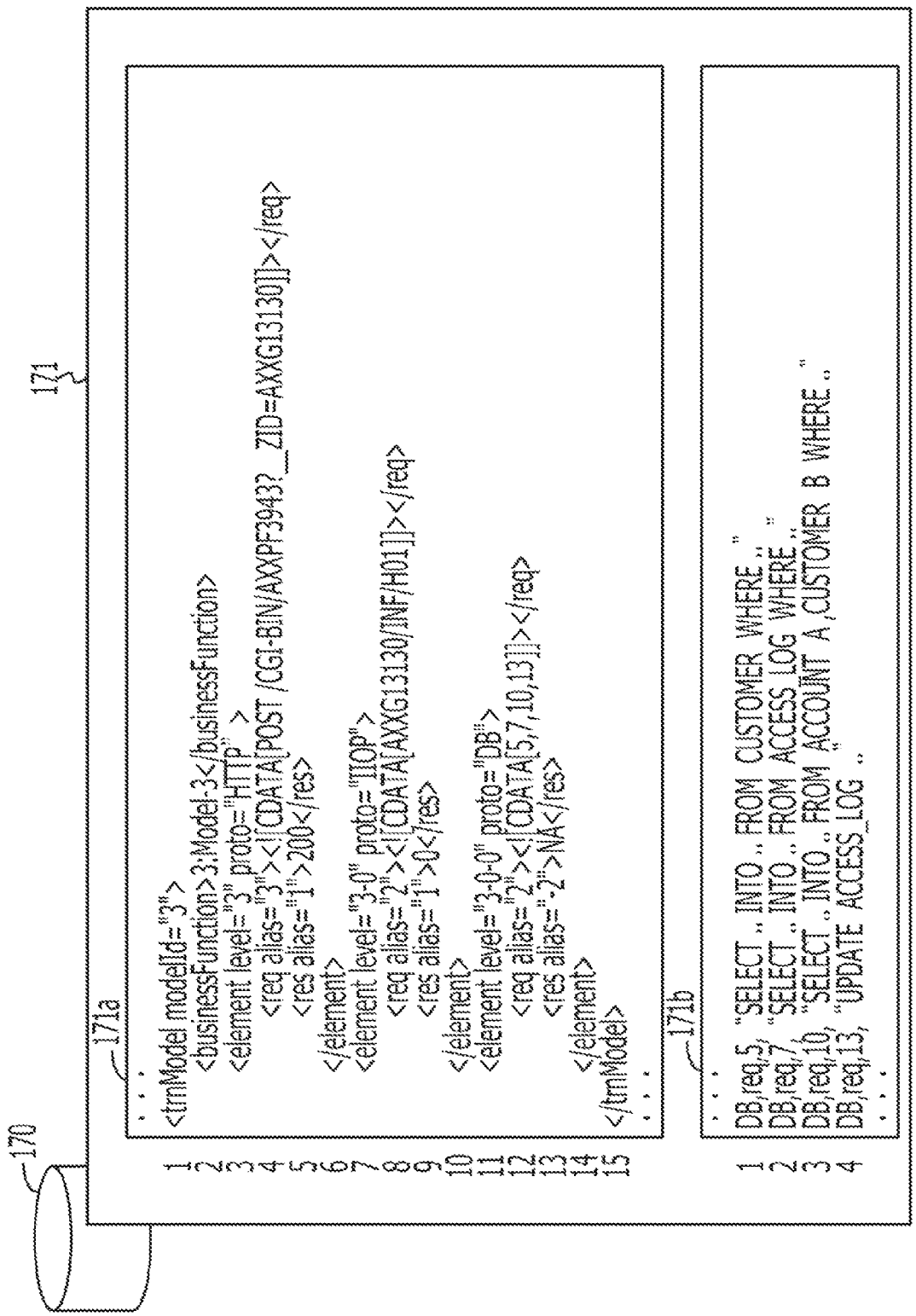
FIG. 23 illustrates a transaction model definition file group of the third embodiment.

FIG. 23 illustrates a transaction model definition file group 171 of the third embodiment. The transaction model definition file group 171 is stored on the transaction model memory 170. The transaction model definition file group 171 is a group of information defining a transaction model. The transaction model definition file group 171 includes a message pattern definition file 171a and an elias definition file 171b.

The message pattern definition file 171a includes information that maps the content of a message to a transaction model. The content of the message pattern definition file 171a is written using extensible markup language (XML), for example. The message pattern definition file 171a is described below with reference to line numbers attached thereto for convenience of explanation.

The message pattern definition file 171a includes definition information related to a transaction model of "Model-3" as a model ID, for example. The message pattern definition file 171a illustrates that the messages discussed below are acquired in the transaction model of "Model-3".

(1) The web server 200 receives an HTTP request including uniform resource locator (URL) called "POST/CGI-BIN/AXXPF3943?_ZID=AXXG13130" in POST method of HTTP. The web server 200 then transmits to a request source an HTTP response with status code "200" included therein in response to the HTTP request. The content of this process corresponds to lines 3-6.

(2) The APP server 300 receives from the web server 200 an IIOP request including an acquisition request of an object "AXXG13130/INF\H01". The APP server 300 transmits to the web server 200 an IIOP response with status code "0" included therein in response to the IIOP request. The content of this process corresponds to lines 7-10.

(3) The DB server 400 receives, from the APP server 300, DB requests, in order, including SQL sentences indicated by identification numbers "5, 7, 10, 13" of alias's as query. The content of this process corresponds to lines 11-14.

The counting unit 140a acquires the description content of an SQL sentence specified by an identification number of an alias by referencing the elias definition file 171b.

The alias definition file 171b defines an alias responsive to a character string used in the message pattern definition file 171a. For example, "[5, 7, 10, 13]" on line 12 in the message pattern definition file 171a may be read as the contents represented by the SQL sentences listed on lines 1-4 in the elias definition file 171b, respectively.

It is sufficient if a minimum determination character string (such as URL or part of SQL sentence) used in the mapping of the transaction model to the message is defined in the message pattern definition file 171a and the elias definition file 171b.

Figure 24:
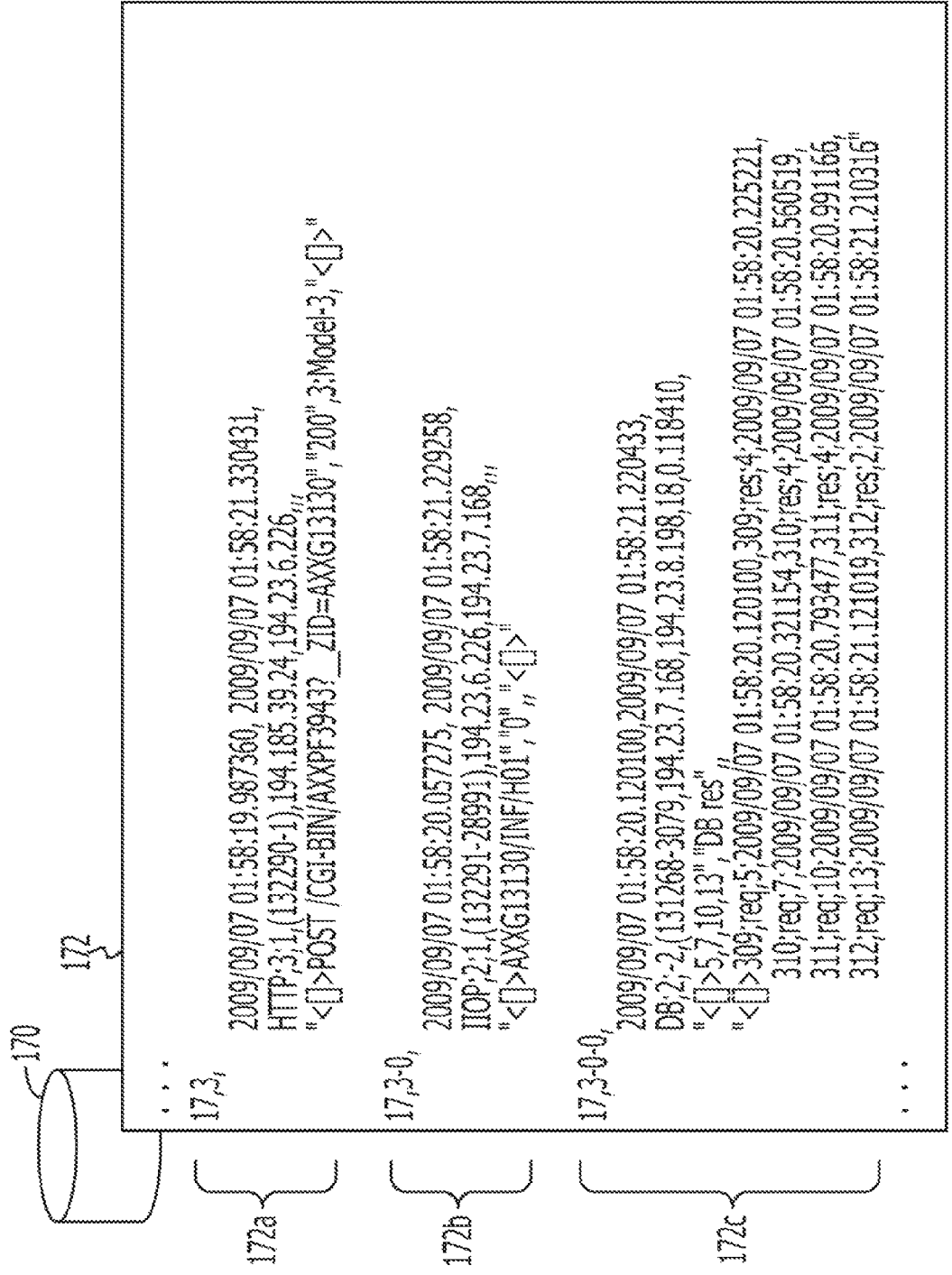
FIG. 24 illustrates transaction message analysis data of the third embodiment.

FIG. 24 illustrates transaction message analysis data 172 of the third embodiment. The counting unit 140a generates the transaction message analysis data 172 based on the restored message 111, and the transaction model definition file group 171, and then stores the generated transaction message analysis data 172 onto the transaction model memory 170. The transaction message analysis data 172 maps the message 111, restored from the packet information on the packet memory 110 by the counting unit 140a, to the transaction model.

The transaction message analysis data 172 includes matching result fields 172a, 172b, and 172c. The messages included in the restored message 111 are matched against the determination character string included in the transaction model definition file group 171, and a hit message is extracted and set in the matching result fields 172a, 172b, and 172c.

For example, an extraction result of a combination of an HTTP request and an HTTP response is set in the matching result field 172a. An extraction result of a combination of an IIOP request and an IIOP response is set in the matching result field 172b. An extraction result of a combination of a DB request and a DB response is set in the matching result field 172c.

The counting unit 140a determines whether the process defined by the transaction model is performed, depending on whether the determination character string included in the transaction model definition file group 171 is included in the restored message 111 in a specific order.

The counting unit 140a generates a message management table on a per transaction model basis based on the transaction message analysis data 172, and stores the generated message management table on the count information memory 120a.

Figure 25:
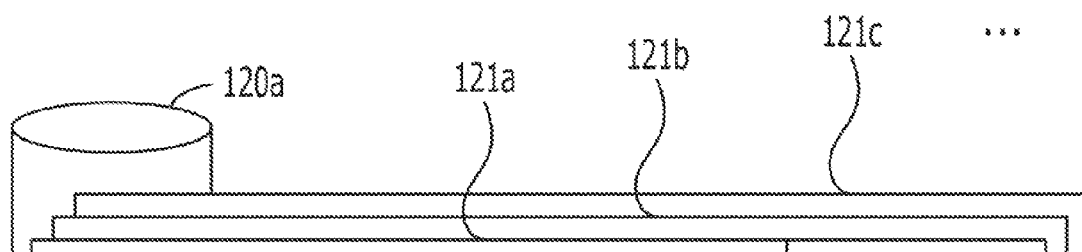
FIG. 25 illustrates a data structure of a message management table of the third embodiment.

FIG. 25 illustrates a data structure of message management tables 121a, 121b, 121c, . . . of the third embodiment. The counting unit 140a generates the message management tables 121a, 121b, 121c, . . . based on the transaction message analysis data 172, and then stores the message management tables 121a, 121b, 121c, . . . onto the count information memory 120a. The message management tables 121a, 121b, 121c, . . . are used for the counting unit 140a to perform the counting process efficiently. The message management tables 121a, 121b, 121c, . . . are generated respectively in map with the transaction models. The message management table 120a is mapped to model ID "Model-3".

Each of the message management tables 121a, 121b, 121c, . . . is substantially identical in structure to the message management table 121 of the second embodiment illustrated in FIG. 8.

Figure 26:
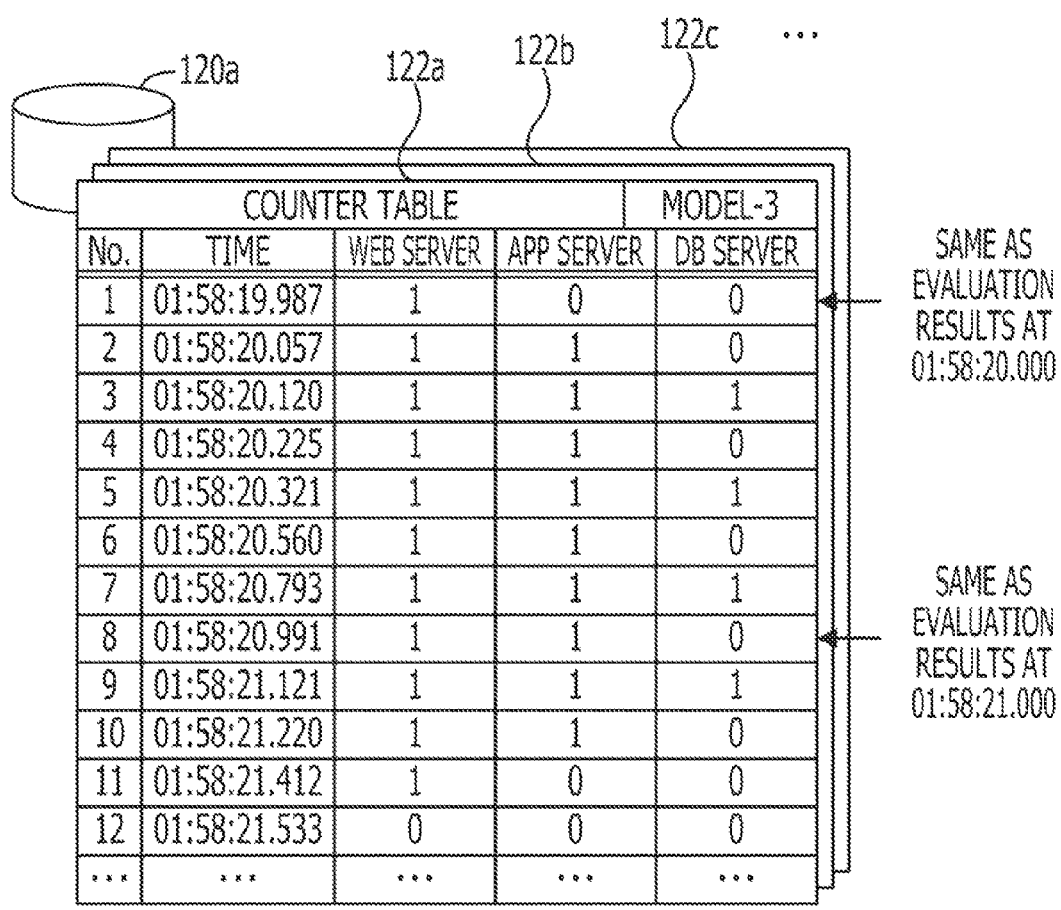
FIG. 26 illustrates a data structure of a counter table of the third embodiment.

FIG. 26 illustrates a data structure of counter tables 122a, 122b, 122c, . . . . The counting unit 140a generates the counter tables 122a, 122b, 122c, . . . in accordance with the message management tables 121a, 121b, 121c, . . . and stores the generated counter tables 122a, 122b, 122c, . . . onto the count information memory 120a. The counter tables 122a, 122b, 122c, . . . are generated respectively in map with the transaction models. For example, the counter table 122a is mapped to the model ID "Model-3".

Each of the counter tables 122a, 122b, 122c, . . . is substantially identical in structure to the counter table 122 of the second embodiment illustrated in FIG. 9. The generation procedure of the counter tables 122a, 122b, 122c, . . . is identical to the procedures 1-3 discussed with reference to FIG. 9.

FIG. 27 illustrates a modification of the counter table 124a, 124b, 124c, . . . of the third embodiment. The counting unit 140a generates counter tables 124a, 124b, 124c, . . . in accordance with the message management tables 121a, 121b, 121c, . . . and then stores the generated counter tables 124a, 124b, 124c, . . . onto the count information memory 120a. The counter tables 124a, 124b, 124c, . . . are generated respectively in map with the transaction models. For example, the counter table 124a is mapped to the model ID "Model-3".

Each of the counter tables 124a, 124b, 124c, . . . is substantially identical in structure to the counter table 122 of the second embodiment illustrated in FIG. 9. The generation procedure of the counter tables 124a, 124b, 124c, . . . is different from the procedure 3 of FIG. 9 as described below.

After an exchange of request/response between an upper tier server and a lower tier server, the counting unit 140a extracts a message flow exchanged between the same servers through a plurality of requests/responses using the same session number. In the transaction message analysis data 172 of FIG. 24, a message flow (having a session number "131268") in the matching result field 172c may be extracted. In response to the exchange of the message flow, the counting unit 140a increments by one the retention job request count at a transmission timing of the first request of the message flow, and then decrements by one the retention job request count at a transmission timing of the last response of the message flow. In other words, during one message flow, the process request responsive to the message flow is continuously retained at the lower tier server.

As illustrated in the counter table 124a, the counting unit 140a acquires "1", "1", and "1" as the retention job request counts of the web server 200, the APP server 300, and the DB server 400, respectively, at time "01:58:21.000".

The results described above are compared with the counter table 122a. In the counter table 122a, the counting unit 140a acquires "1", "1", and "0" as the retention job request counts of the web server 200, the APP server 300, and the DB server 400, respectively, at time "01:58:21.000.

A resource (such as a connection to the DB server 400 or a DB cursor used on the DB server 400) may be continuously occupied during a series of consecutive message transmissions and receptions. In such a case, counting the retention job request count related to the resource may be difficult in the counting of the counter table 122a. More specifically, the retention job request count accounting for the process involving the occupation of the resource may be missing depending on a sampling timing. A retention job request count obtained may be closer to the real one if it is assumed that the process request is retained on the server during the resource occupation.

If the series of messages exchanged at the same session is detected through the method described above, the retention job request count is prevented from being missing at the timing of the sampling.

Figure 28:
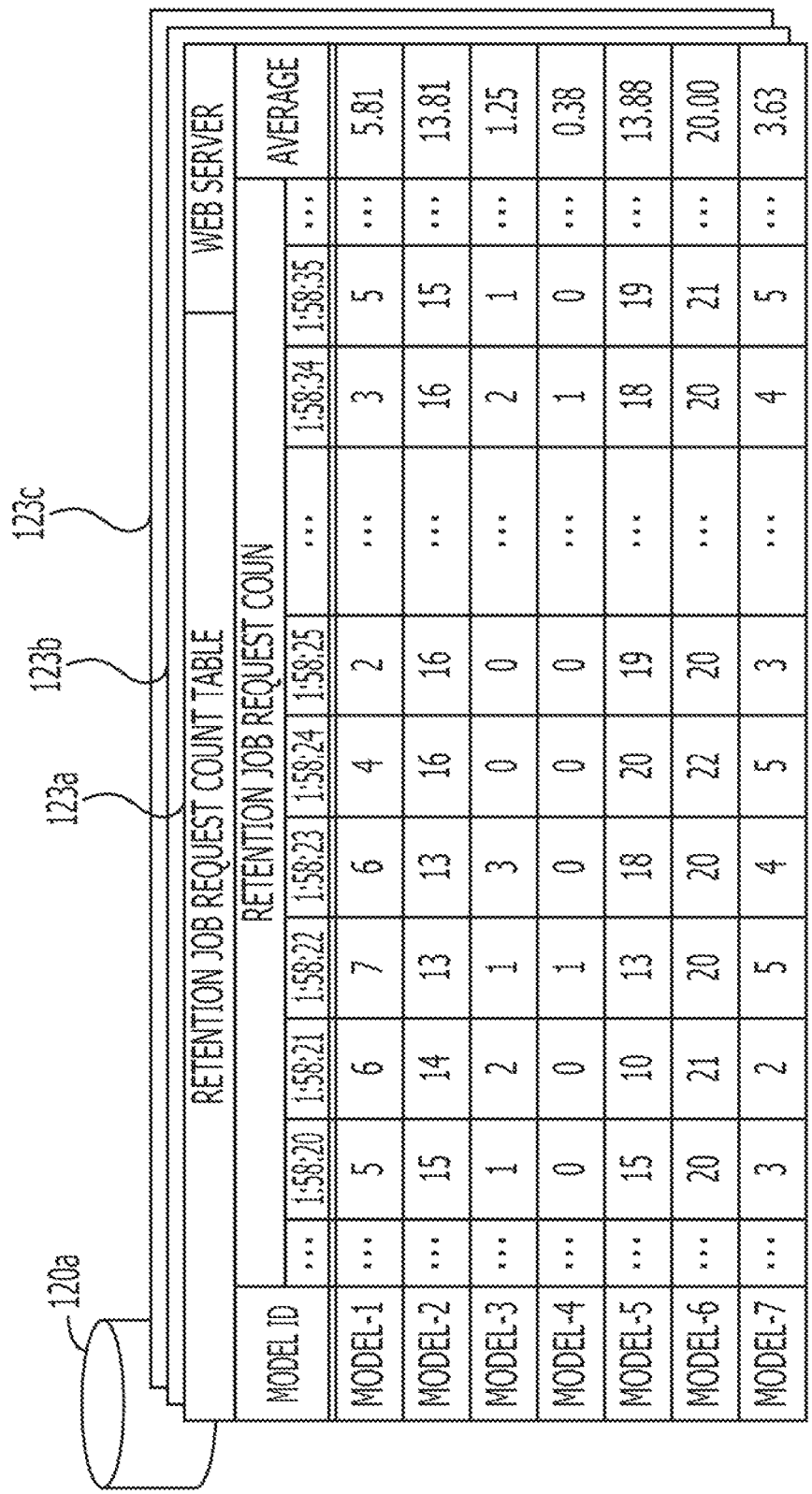
FIG. 28 illustrates a data structure of a retention job request count table of the third embodiment.

FIG. 28 illustrates a data structure of retention job request count tables 123a, 123b, and 123c of the third embodiment. The counting unit 140a generates the retention job request count tables 123a, 123b, and 123c in accordance with the counter tables 122a, 122b, 122c, . . . and then stores the generated retention job request count tables 123a, 123b, and 123c onto the count information memory 120a. The retention job request count table 123a corresponds to the web server 200. The retention job request count table 123b corresponds to the APP server 300. The retention job request count table 123c corresponds to the DB server 400. The structure of the retention job request count table 123a is described below. The retention job request count tables 123b and 123c have substantially the same structure.

The retention job request count table 123a includes a column of model ID, a column of retention job request counts, and a column of an average of the retention job request counts. These pieces of information arranged horizontally across the columns at the same row are mapped to each other and indicate the retention job request counts of one transaction model at each time.

A model ID is set in the column of model ID. The retention job request count is set in the column of retention job request counts at each time. The average value of the retention job request counts over a bottleneck analysis period is set in the column of average of retention job request counts.

The retention job request count table 123a includes a model ID "Model-1", a retention job request count "5" at time "1:58:20", a retention job request count "6" at time "1:58:21", . . . , an average "5.8". The values of the retention job request counts included in this record are obtained from the count values (the retention job request counts) on the web server 200 at the specified times listed in the counter tables 122a, 122b, 122c, . . . for "Model-1".

The process of the operation management server 100a thus constructed is described below. The packet capture process of the operation management server 100a is substantially identical to the packet capture process of the second embodiment described with reference to FIG. 13, and the discussion thereof is omitted here. The monitoring process of the operation management server 100a is substantially identical to the monitoring process of the second embodiment discussed with reference to FIG. 14, and the discussion thereof is omitted here.

Figure 29:
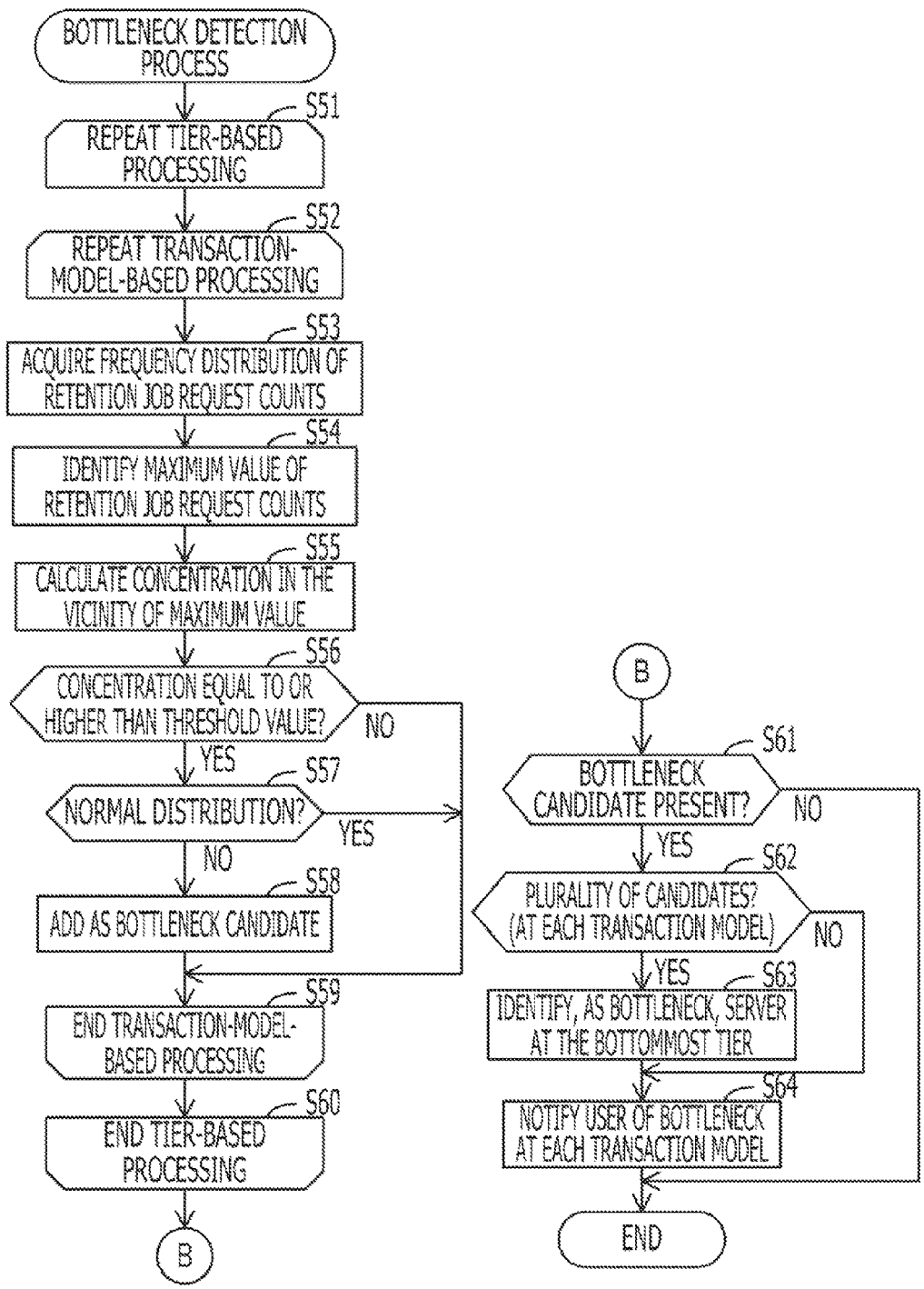
FIG. 29 illustrates a bottleneck detection process of the third embodiment.

FIG. 29 illustrates a bottleneck detection process of the third embodiment. The bottleneck detection process is described below with reference to operation numbers illustrated in FIG. 29.

(Operation S51) The bottleneck detector 150a repeats processing to operation S60 on a per tier basis of the transaction system. According to the present embodiment, one server is arranged at each tier, and the bottleneck detection process may be performed on a per server basis.

(Operation S52) The bottleneck detector 150a repeats processing to operation S59 on a per transaction model basis.

(Operation S53) The bottleneck detector 150a acquires the frequency distribution of the retention job request counts of a target server with respect to a target transaction model based on the retention job request count tables 123a, 123b, and 123c stored on the count information memory 120a.

(Operation S54) The bottleneck detector 150a identifies a maximum value of the retention job request counts in the acquired frequency distribution.

(Operation S55) The bottleneck detector 150a calculates the concentration in the vicinity of the maximum value of the retention job request counts in the frequency distribution.

(Operation S56) The bottleneck detector 150a determines whether the concentration is equal to or higher than the threshold value. If the concentration is equal to or higher than the threshold value, processing proceeds to operation S57. If the concentration is lower than the threshold value, processing proceeds to operation S59.

(Operation S57) The bottleneck detector 150a determines whether the frequency distribution is a normal distribution. If the frequency distribution is not a normal distribution, processing proceeds to operation S58. If the frequency distribution is a normal distribution, processing proceeds to operation S59.

(Operation S58) The bottleneck detector 150a adds the target server as a bottleneck candidate of the target transaction model.

(Operation S59) The bottleneck detector 150a proceeds to operation S60 if all the transaction models are processed. If an unprocessed transaction model remains, the bottleneck detector 150a returns to operation S52.

(Operation S60) The bottleneck detector 150a proceeds to operation S61 all the tiers (servers) are processed. If an unprocessed tier (server) remains, the bottleneck detector 150a returns to operation S51.

(Operation S61) The bottleneck detector 150a determines whether a bottleneck candidate has been detected in operations S51-S60. If a bottleneck candidate has been detected, processing proceeds to operation S62. If no bottleneck candidate has been detected, the process ends.

(Operation S62) The bottleneck detector 150a determines whether a plurality of bottleneck candidates have been detected on a per the transaction model basis. If any of the transaction models has a plurality of bottleneck candidates, processing proceeds to operation S63. If none of the transaction models has a plurality of bottleneck candidates, processing proceeds to operation S64.

(Operation S63) The bottleneck detector 150a identifies as a bottleneck the server at the bottommost tier from among the plurality of bottleneck candidates on the transaction model. For example, if the APP server 300 and the DB server 400 are detected as bottleneck candidates with respect to the transaction model "Model-3", the bottleneck detector 150a identifies the DB server 400 as the bottleneck candidate of the transaction model "Model-3". The bottleneck detector 150a outputs to the notifier 160 information indicating the server as the identified bottleneck with the transaction model mapped to the information.

(Operation S64) On a per transaction model basis, the notifier 160 notifies the user of the information indicating the server of the bottleneck acquired from the bottleneck detector 150a.

The bottleneck detector 150a thus detects the bottleneck server on a per transaction model basis. In substantially the same manner as with the second embodiment, the bottleneck detector 150a detects which tier is a bottleneck if a plurality of servers is arranged at each tier. For example, if a plurality of web servers is arranged at the web tier, the counting unit 140a may determine the total sum of retention job request counts of the servers as the retention job request count at the web tier. The values at the columns indicating the retention job request counts in the retention job request count tables 123a, 123b, and 123c are acquired as the values on a per tier basis of the web tier, the APP tier, and the DB tier rather than as the values on a server basis of the web server, the APP server, and the DB server. The bottleneck detector 150a performs the bottleneck detection process in accordance with the retention job request count tables acquired on a per tier basis, thereby identifying a tier serving as a bottleneck.

On a per transaction model basis, the notifier 160 notifies of the bottleneck detected by the bottleneck detector 150a.

A limit may be imposed on the retention job request count on a per transaction model basis, for example. In such a case, the notifier 160 may notify the user of the identification information of the server detected as the bottleneck with the transaction model mapped to the identification information. For example, the bottleneck detector 150a may detect the APP server 300 as a bottleneck with respect to "Model-1", and "Model-5", and the DB server 400 as a bottleneck with respect to "Model-3". The notifier 160 may notify the user of the APP server 300 as bottleneck detection results of "Model-1". The notifier 160 may notify the user of the APP server 300 as bottleneck detection results of "Model-5". The notifier 160 may notify of the DB server 400 as bottleneck detection results of "Model-3".

A limit may be imposed on the retention job request count in view of a total of a plurality of transaction models, for example. The notifier 160 may notify the user of a transaction model having a larger average value with a priority. For example, if the total sum of retention job request counts of "Model-1" through "Model-7" is limited, the notifier 160 may notify the user of a larger average of the retention job request counts with a priority. More specifically, the average value of the retention job request counts of "Model-6" is the largest in the retention job request count table 123*a*. If a bottleneck is to be detected on the web server 200 with respect to the transaction models, the notifier 160 notifies the user that attention is particularly paid to "Model-6".

The bottleneck detection process is thus performed with the detection targets narrower than the detection targets with which the bottleneck detection process performed by the operation management server 100 of the second embodiment is performed. More specifically, the problem identification is more easily performed. As a result, the user may perform a problem solving operation efficiently.

Fourth Embodiment

A fourth embodiment is described below. The discussion that follows focuses on a difference between the fourth embodiment and the second and third embodiments, and the discussion of similarities therebetween is omitted here.

The fourth embodiment allows to be detected a bottleneck generated in response to a combination of requests to a plurality of transaction models. For example, a program may be shared by a plurality of transaction models on the APP server 300. The program may be a bottleneck if the program is not designed to respond appropriately to the plurality of requests. For example, queries issued by a plurality of transaction models to the DB server 400 may be problematic, becoming a bottleneck. If a bottleneck is detected with a plurality of transaction models mapped thereto, the plurality of transaction models that are considered to have a common or closely related problem are identified at a time. The structure of the fourth embodiment is described in detail below.

The entire structure of a transaction system of a fourth embodiment is substantially identical to the entire structure of the transaction system of the second embodiment illustrated in FIG. 2, and the discussion thereof is omitted here. According to the fourth embodiment, an operation management server 100*b* is substituted for the operation management server 100.

The hardware structure of each apparatus in the transaction system of the fourth embodiment is substantially identical to the hardware structure of the operation management server 100 of the second embodiment illustrated in FIG. 3, and the discussion thereof is omitted here.

Figure 30:
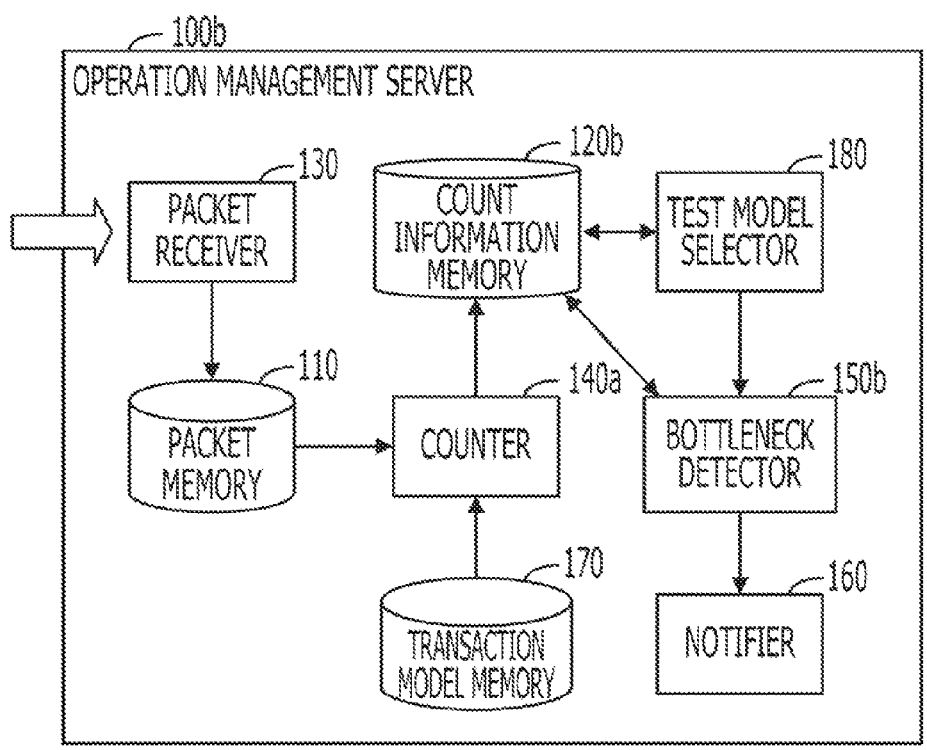
FIG. 30 illustrates a functional structure of an operation management server of a fourth embodiment.

FIG. 30 illustrates a functional structure of the operation management server 100*b* of the fourth embodiment. The operation management server 100*b* includes packet memory 110, count information memory 120*b*, packet receiver 130, counting unit 140*a*, bottleneck detector 150*b*, notifier 160, transaction model memory 170, and test model selector 180. The functions of these elements may be performed by the CPU 101 that executes a specific program. These functions may be partly or wholly performed using a dedicated hardware structure.

The packet memory 110, the packet receiver 130, and the notifier 160 are substantially identical in structure to the counterparts designated with the same reference numerals in the operation management server 100 of the second embodiment discussed with reference to FIG. 4, and the discussion thereof is omitted here. The counting unit 140*a* and the transaction model memory 170 are substantially identical in structure to the counterparts designated with the same reference numerals in the operation management server 100*a* of the third embodiment illustrated in FIG. 22, and the discussion thereof is omitted here.

The count information memory 120*b* stores count information on a per transaction model basis. The count information on a per transaction model basis is substantially identical to the information stored on the count information memory 120*a* of the third embodiment. The count information memory 120*b* stores information related to a plurality of transaction models.

The bottleneck detector 150*b* acquires a combination of transaction models selected by the test model selector 180. The bottleneck detector 150*b* references the count information stored on the count information memory 120*b*, and performs the bottleneck detection process in accordance with the acquired combination of transaction models. More specifically, the bottleneck detector 150*b* analyzes the frequency distribution of the retention job request counts on each server with respect to the combination of transaction models, and detects as a bottleneck candidate a server having the frequency distribution satisfying a specific condition. The specific conditions remain unchanged from the conditions 1 and 2 used by the bottleneck detector 150 of the second embodiment. The retention job request count on a per a transaction model combination may be determined by summing retention job request counts of the transaction models in the combination.

The bottleneck detector 150*b* identifies from among the detected bottleneck candidates a server eligible for a bottleneck, and outputs the identification results to the notifier 160.

The test model selector 180 selects a combination of transaction models on which the bottleneck detector 150*b* performs the bottleneck detection process, in accordance with the count information stored on the count information memory 120*b*.

If a plurality of transaction models is present, a large number of combinations of transaction models may be produced. Performing the bottleneck detection process on all the combinations is not appropriate from the standpoint of process workload. In one embodiment, the test model selector 180 beforehand narrows the combinations of the process targets of the bottleneck detector 150*b* in order to lighten the process workload.

Optionally, all the transaction model combinations may be set as the process targets of the bottleneck detector 150*b* without using the function of the test model selector 180.

The test model selector 180 beforehand acquires knowledge information about commonality, such as the use of the same program, among the transaction model combinations. The knowledge information is then output to the bottleneck detector 150*b* as a target handled in the bottleneck detection process.

A relationship of the transaction models may be extracted from the time-series transition of obtained retention job request counts without setting the knowledge information on the test model selector 180. More specifically, in a pre-process of the bottleneck detector 150*b*, the test model selector 180 Fourier-analyzes the time-series transition of the transaction models of the retention job request count tables 123*a*, 123*b*, and 123*c* stored on the count information memory 120*b*. The test model selector 180 extracts a relationship of the transaction models in accordance with period components (frequencies) of each transaction model as the results of Fourier analysis. The test model selector 180 thus narrows the transaction model combinations as the process targets of the bottleneck detector 150*b*.

The test model selector 180 generates data to select the transaction model combination through Fourier analysis. The data generated by the test model selector 180 is described below.

Figure 31:
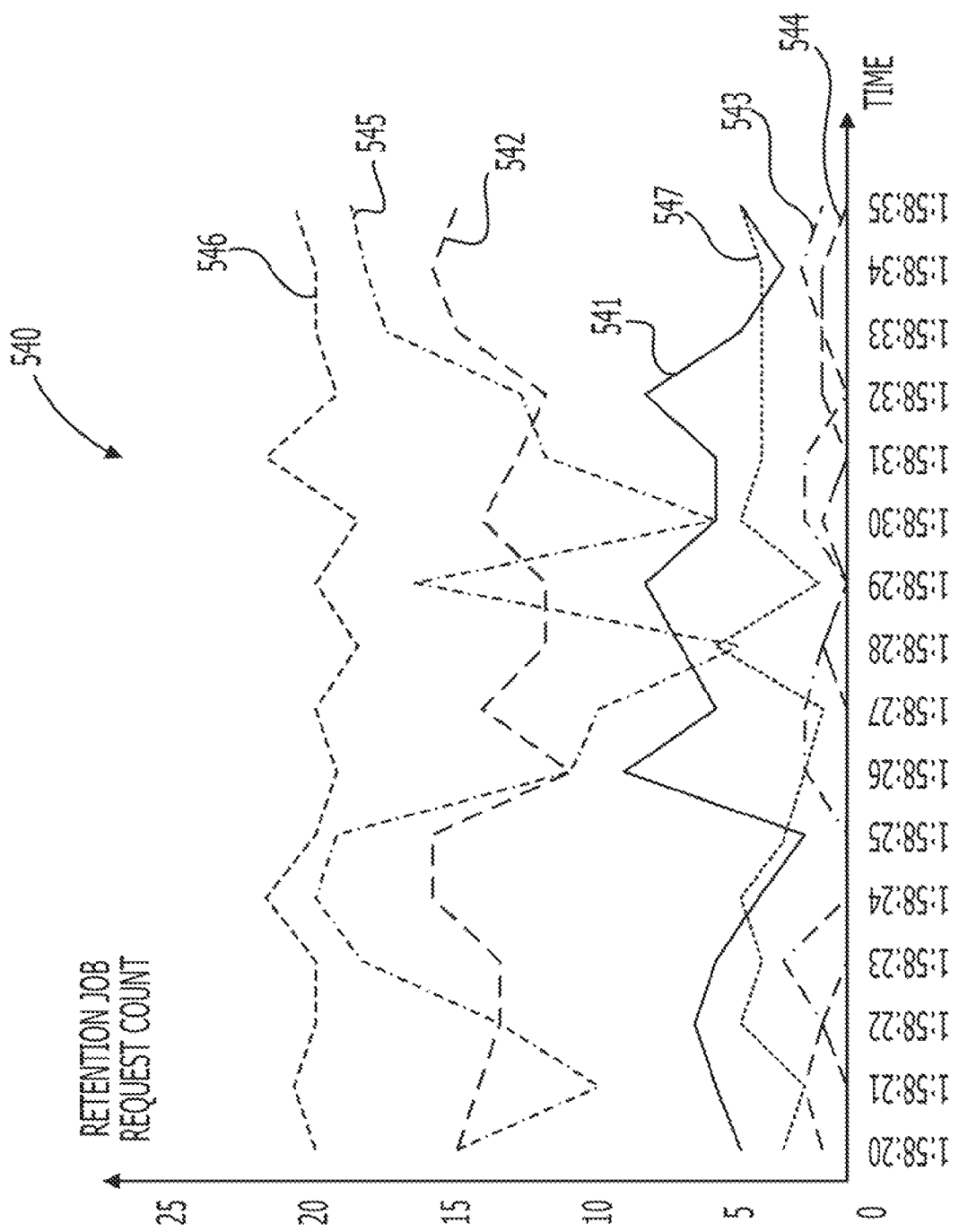
FIG. 31 illustrates a time-series transition of the retention job request count on a per transaction model basis.

FIG. 31 illustrates a time-series transition 540 of the retention job request counts on a per transaction model basis. The time-series transition 540 includes time series of the retention job request counts of the web server 200 on a per transaction model basis. The time-series transition 540 includes time series 541, 542, 543, 544, 545, 546, and 547. The time series 541 corresponds to a transaction model "Model-1". The time series 542 corresponds to a transaction model "Model-2". The time series 543 corresponds to a transaction model "Model-3". The time series 544 corresponds to a transaction model "Model-4". The time series 545 corresponds to a transaction model "Model-5". The time series 546 corresponds to a transaction model "Model-6". The time series 547 corresponds to a transaction model "Model-7".

The test model selector 180 Fourier-analyzes the time series 541, 542, 543, 544, 545, 546, and 547 of the time-series transition 540, thereby extracting a plurality of period components included in each time series.

FIG. 32 illustrates a data structure of Fourier analysis result tables 125a, 125b, and 125c of the fourth embodiment. The Fourier analysis result tables 125a, 125b, and 125c are generated by the test model selector 180 and then stored on the count information memory 120b. The Fourier analysis result table 125a corresponds to the web server 200. The Fourier analysis result table 125b corresponds to the APP server 300. The Fourier analysis result table 125c corresponds to the DB server 400. The Fourier analysis result table 125a, substantially identical in structure to the Fourier analysis result tables 125b and 125c, is described below.

The Fourier analysis result table 125a includes a column of model ID, and columns of period components. These pieces of information arranged horizontally across the columns at the same row are mapped to each other and indicate period components of one model.

A model ID of the transaction model is set in the column of model ID. Period components are set in the columns of period components.

The Fourier analysis result table 125a includes components for periods 16, 8, 5.33, 3, and 4 determined through Fourier analysis. More frequency components may be determined if the process uses more frequency components.

More specifically, the Fourier analysis result table 125a includes a model ID "Model-1", a component "−7.159+2.205i" for period 16, a component "4.243−6.657i" for period 8, . . . .

The test model selector 180 determines a total amplitude of each combination of transaction models in accordance with the period components of each transaction model determined in the Fourier analysis result table 125a. For example, if a combination of two transaction models is a target of the bottleneck detection process, the synthetic amplitude of the same period components is determined. More specifically, the synthetic amplitude of period 16 of "Model-1" and "Model-2" is determined. The synthetic amplitude of period 8 of "Model-1" and "Model-2" is determined. In this way, the synthetic amplitude of the same period components is determined for all the combinations of transaction models.

Figure 33:
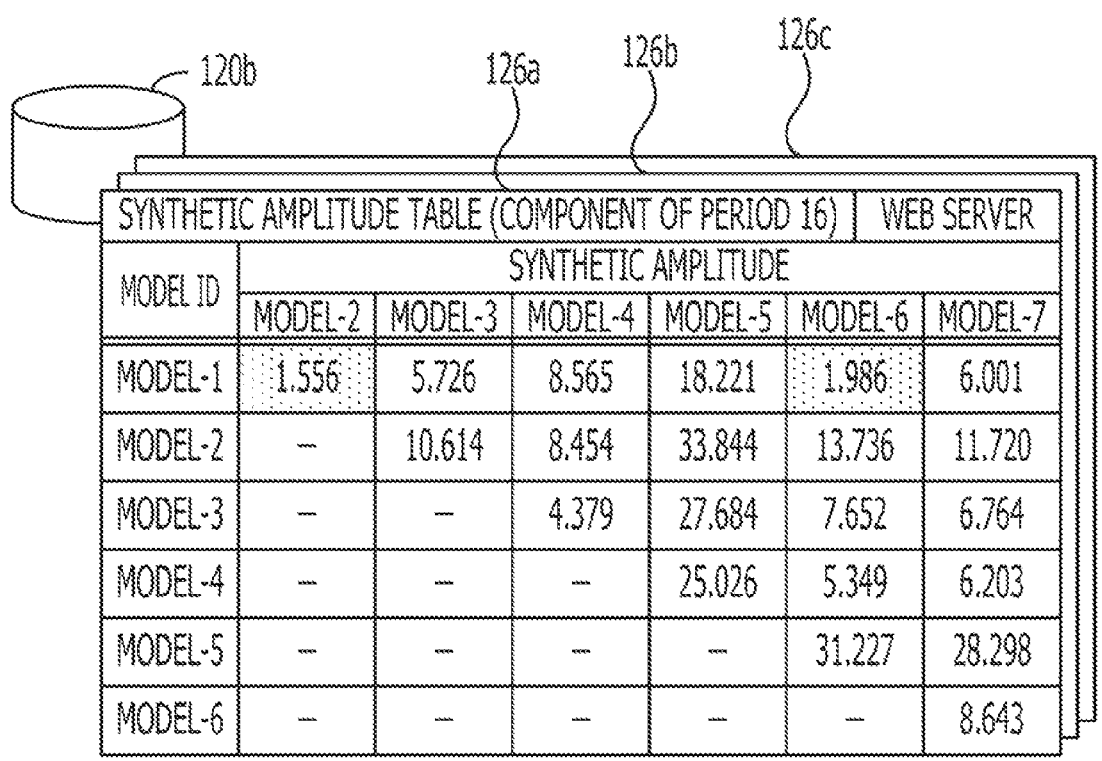
FIG. 33 is a first chart illustrating a synthetic amplitude table of the fourth embodiment.

FIG. 33 is a first chart illustrating synthetic amplitude tables 126a, 162b, and 126c of the fourth embodiment. The synthetic amplitude tables 126a, 162b, and 126c illustrate calculation results of the synthetic amplitude of period 16 for each combination of two transaction models. The synthetic amplitude table 126a corresponds to the web server 200. The synthetic amplitude table 126b corresponds to the APP server 300. The synthetic amplitude table 126c corresponds to the DB server 400. The synthetic amplitude table 126a, similar in structure to the synthetic amplitude tables 126b and 162c, is described below.

The synthetic amplitude table 126a includes a column of model ID, and columns of synthetic amplitudes. These pieces of information arranged horizontally across the columns at the same row are mapped to each other and indicate synthetic amplitudes of one transaction model combination.

A model ID is set in the column of model ID of the transaction model. Synthetic amplitudes of period 16 of corresponding transaction models are set in the columns of synthetic amplitude.

The synthetic amplitude table 126a includes a synthetic amplitude "1.556" of the component of period 16 for a combination of model IDs "Model-1" and "Model-2". The amplitude synthesis is determined by synthesizing period components "(−7.159+8.217)+(2.205−1.064)i=1.508+1.414i" based on the Fourier analysis result table 125a.

The same is true of the other amplitude syntheses.

FIG. 34 is a second chart illustrating synthetic amplitude tables 127a, 127b, and 127c of the fourth embodiment. The synthetic amplitude tables 127a, 127b, and 127c list calculation results of the synthetic amplitudes of period 8 for each of the combinations of two transaction models. The synthetic amplitude table 127a corresponds to the web server 200. The synthetic amplitude table 127b corresponds to the APP server 300. The synthetic amplitude table 127c corresponds to the DB server 400.

Each of the synthetic amplitude tables 127a, 127b, and 127c is substantially identical in structure to the synthetic amplitude table 126a, and the discussion thereof is omitted here.

The test model selector 180 identifies from each of the synthetic amplitude tables a combination having a synthetic amplitude lower than a specific threshold value. The specific threshold value may be set beforehand on the test model selector 180, or may be determined based on measurement results of the retention job request counts. The specific threshold value may further determined by summing the retention job request counts of the largest model IDs of the combination number, each model ID having the largest average of the retention job request counts, from among a plurality of transaction models (for example, summing the retention job request counts of two largest model IDs if two transaction models are combined), and then multiplying the resulting sum by a specific threshold rate.

A combination identified as having a synthetic amplitude lower than the specific threshold value is selected as a target of the bottleneck detection process. For example, if the threshold value is "3" in the synthetic amplitude table 126a through the synthetic amplitude table 127c, a combination of "Model-1" and "Model-2" having a synthetic amplitude of period 16 and a synthetic amplitude of period 8, each smaller than 3, is selected.

The test model selector 180 Fourier-analyzes the time-series transition on a per transaction model basis, and compares the synthetic amplitudes on a per transaction model combination basis. The reason why such a comparison is performed is that the time-series transition of the retention job request count substantially remaining constant is detected if the bottleneck detector 150b detects a bottleneck. If the time-series transition substantially remains constant, the amplitude of each Fourier-analyzed period component is considered to become small. The period component determined on a per transaction model basis is synthesized, and if a period component having a small amplitude results, a bottleneck may occur in the combination of transaction models.

A combination of transaction models having the retention job request counts likely to be concentrated at and around a constant value may be selected at low costs.

The combination of two transaction models has been discussed. If a combination of three or more transaction models is selected, the selection may be based on the sum of the same period components of the transaction models.

The bottleneck detection process is performed based on the synthetic amplitude of the components of period 16 and period 8 in the above discussion. The synthetic amplitude of more periods may be used.

The process of the operation management server 100b thus constructed is described below. The packet capture process of the operation management server 100b remains unchanged from the packet capture process of the second embodiment described with reference to FIG. 13, and the discussion thereof is omitted here.

Figure 35:
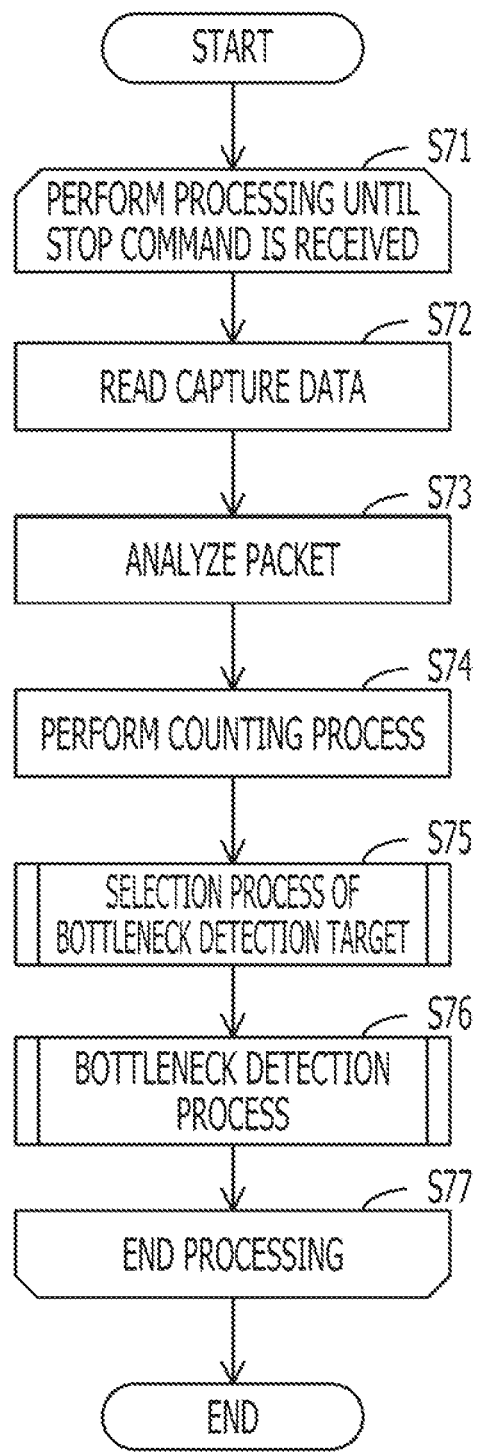
FIG. 35 illustrates a monitoring process of the fourth embodiment.

FIG. 35 illustrates a monitoring process of the fourth embodiment. The monitoring process is described below with reference to operation numbers of FIG. 35.

(Operation S71) The counting unit 140a starts monitoring whether the packet receiver 130 has output a file to the packet memory 110. The timing at which a start command and a stop command received by the counting unit 140a is substantially identical to the timing at operation S21 of FIG. 14.

(Operation S72) The counting unit 140a reads a new file if the new file is output to the packet memory 110.

(Operation S73) The counting unit 140a restores a message exchanged among the servers in response to the red file.

(Operation S74) The counting unit 140a generates the message management tables 121a, 121b, 121c, . . . on a per transaction model basis in response to the restored message, and then stores the message management tables 121a, 121b, 121c, . . . onto the count information memory 120b. In response to the message management tables 121a, 121b, 121c, . . . , the counting unit 140a generates the counter tables 122a, 122b, 122c, . . . and then stores the counter tables 122a, 122b, 122c, . . . onto the count information memory 120b. In response to the counter tables 122a, 122b, 122c, . . . , the counting unit 140a generates the retention job request count tables 123a, 123b, and 123c and then stores the retention job request count tables 123a, 123b, and 123c onto the count information memory 120b.

(Operation S75) The test model selector 180 selects a selection of transaction models to be processed by the bottleneck detector 150b, in accordance with the retention job request count tables 123a, 123b, and 123c stored on the count information memory 120b. The test model selector 180 then outputs, as selection results, the combination of transaction models to the bottleneck detector 150b.

(Operation S76) The bottleneck detector 150b determines the frequency distribution of the retention job request counts on a per transaction model combination basis on each server, based on the retention job request count tables 123a, 123b, and 123c and the selection results of the combination of transaction models by the test model selector 180. The bottleneck detector 150b determines whether the distribution determined on a per transaction model basis on each server satisfies the specific condition, and detects as a bottleneck candidate of the transaction model a server satisfying the condition. The bottleneck detector 150b identifies from the bottleneck candidates a server eligible for a bottleneck, and outputs the identification results to the notifier 160. The notifier 160 notifies the user of the information indicating the server obtained from the bottleneck detector 150b.

(Operation S77) Upon receiving the stop command, the counting unit 140a stops monitoring the file outputting. The monitoring process of monitoring the occurrence of a bottleneck is thus complete.

The counting unit 140a performs the counting process if the new file is output to the packet memory 110 in response to the packet capturing of the packet receiver 130. The bottleneck detector 150b performs the bottleneck detection process, based on the retention job request count tables 123a, 123b, and 123c output to the count information memory 120b by the counting unit 140a and the selection results of the combination of transaction models by the test model selector 180.

A bottleneck detection target selection process in operation S75 is described in detail below.

Figure 36:
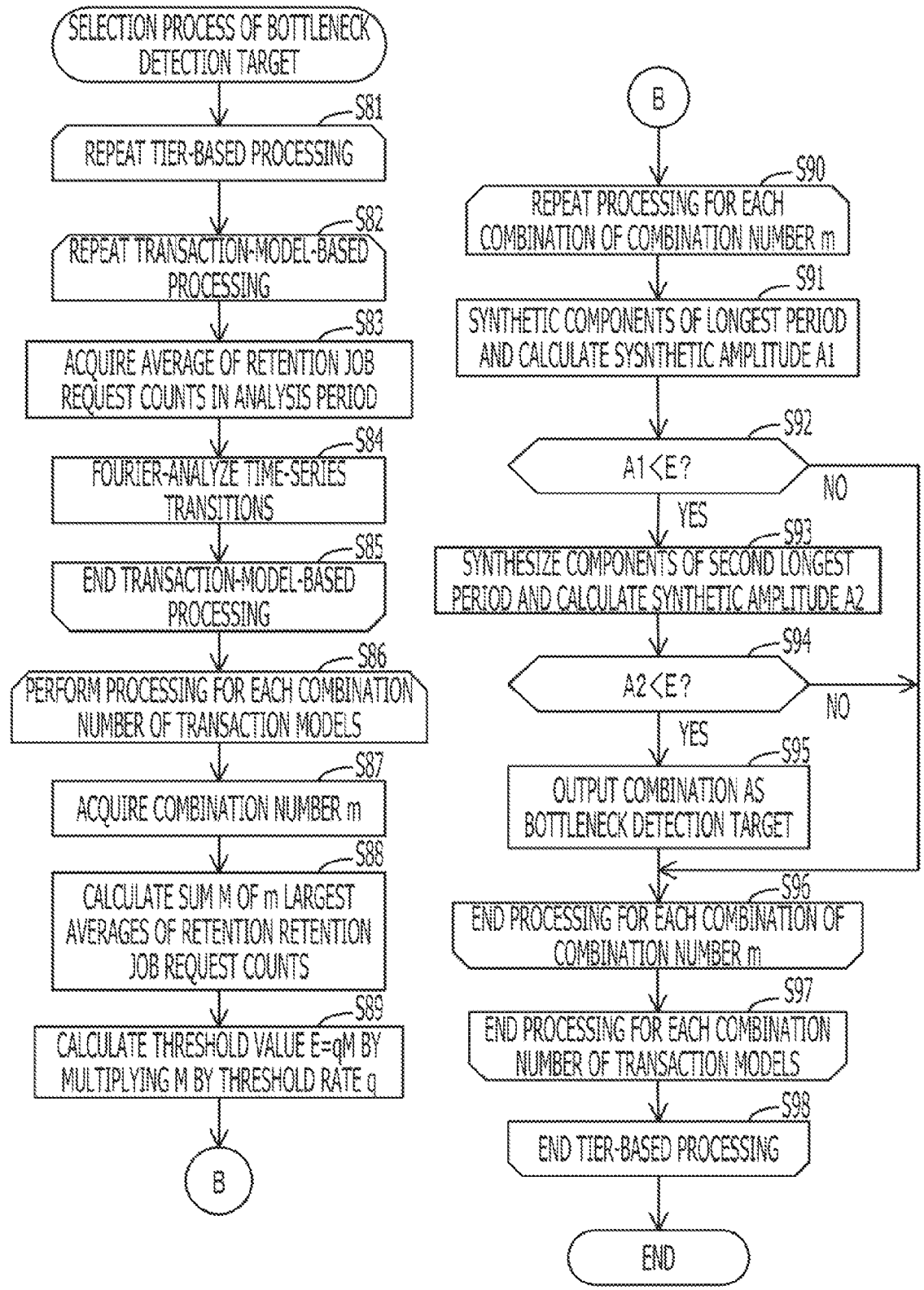
FIG. 36 illustrates a bottleneck detection target selection process of the fourth embodiment.

FIG. 36 illustrates the bottleneck detection target selection process of the fourth embodiment. The bottleneck detection target selection process is described below with reference to operation numbers of FIG. 36.

(Operation S81) The test model selector 180 repeats processings to operation S98 on a per tier basis of the transaction system. Since one server is arranged at each tier in the embodiment, the bottleneck detection target selection process may be performed on a per server basis.

(Operation S82) The test model selector 180 repeats processing to operation S85 on a per transaction model basis.

(Operation S83) The test model selector 180 acquires an average value of the retention job request counts during a bottleneck analysis period of a target server on a target transaction model. For example, the test model selector 180 references the retention job request count tables 123a, 123b, and 123c to acquire the average value.

(Operation S84) The test model selector 180 Fourier-analyzes the time-series transition of the retention job request counts of the target server on the target transaction model. As a result, the test model selector 180 generates the Fourier analysis result tables 125a, 125b, and 125c indicating a plurality of period components included in the time-series transition, and then stores the Fourier analysis result tables 125a, 125b, and 125c onto the count information memory 120b.

(Operation S85) The test model selector 180 proceeds to operation S86 if all the transaction models are processed. If an unprocessed transaction model remains, the test model selector 180 returns to operation S82.

(Operation S86) The test model selector 180 repeats processing to operation S97 on a per combination number basis of a combination of transaction models. The combination number of the transaction models is preset on the test model selector 180. For example, if a bottleneck caused by a combination of two transaction models is to be detected, the combination number "2" is preset. If a bottleneck caused by a combination of three transaction models is to be detected, the combination number "3" is preset.

(Operation S87) The test model selector 180 acquires a combination number m of the transaction models. If a plurality of combination numbers to be processed is present, the test model selector 180 may perform the process starting with the smallest number of the plurality of combination numbers or with the largest number of the plurality of combination numbers.

(Operation S88) The test model selector 180 calculates sums M of m from the largest average values of the retention job request counts. For example, m=2. In this case, the test model selector 180 obtains, as the sum of averages, M=13.88+20.00=33.88 for the transaction models "Model-5" and "Model-6" on the retention job request count table 123a.

(Operation S89) The test model selector 180 calculates a threshold value E=qM by multiplying M by a threshold rate q (q<1). The threshold rate q is determined in response to a process of the transaction system. For example, 0.1 is set for the threshold rate q. If M=33.88 is obtained, the test model selector 180 calculates E=0.1×33.88=3.89.

(Operation S90) The test model selector 180 repeats processings to operation S96 for each of the combination number m on a plurality of transaction models.

(Operation S91) The test model selector 180 calculates a synthetic amplitude A1 by synthesizing the components of the longest period of a combination as a process target. For example, a combination of "Model-1" and "Model-2" may be a process target with m=2 on the web server 200. The test model selector 180 then references the Fourier analysis result table 125*a* stored on the count information memory 120*b* and determines the synthetic amplitude A1=1.556 of period 16 of "Model-1" and "Model-2".

(Operation S92) The test model selector 180 determines whether the synthetic amplitude A1 is smaller than the threshold value E. If the synthetic amplitude A1 is smaller than the threshold value E, processing proceeds to operation S93. If the synthetic amplitude A1 is equal to or larger than the threshold value E, processing proceeds to operation S96.

(Operation S93) The test model selector 180 synthesizes the components of the second longest period of the combination as the process target, thereby calculating a synthetic amplitude A2. For example, a combination of "Model-1" and "Model-2" may be a process target with m=2 on the web server 200. The test model selector 180 then references the Fourier analysis result table 125*a* stored on the count information memory 120*b* and determines the synthetic amplitude A2=2.084 of period 8 of "Model-1" and "Model-2".

(Operation S94) The test model selector 180 determines whether the synthetic amplitude A2 is smaller than the threshold value E. If the synthetic amplitude A2 is smaller than the threshold value E, processing proceeds to operation S95. If the synthetic amplitude A2 is equal to or larger than the threshold value E, processing proceeds to operation S96.

(Operation S95) The test model selector 180 outputs to the bottleneck detector 150*b* the combination of transaction models as a process target.

(Operation S96) If all the combinations of transaction models are processed, the test model selector 180 proceeds to operation S97. If an unprocessed combination remains, processing returns to operation S90.

(Operation S97) If all the combinations are processed, the test model selector 180 proceeds to operation S98. If an unprocessed combination remains, processing returns to operation S86.

(Operation S98) The test model selector 180 ends the process if all the tiers (servers) are processed. If an unprocessed tier (server) remains, processing returns to operation S81.

The test model selector 180 selects combinations of transaction models as a process target of the bottleneck detector 150*b*. The bottleneck detector 150 simply performs the bottleneck detection process on the combinations selected beforehand. Processing costs are lower than those when the bottleneck detection process that is performed on all the combinations.

The test model selector 180 Fourier-analyzes the time-series transition of the retention job request counts on a per transaction model basis, and then selects a combination of transaction models eligible for a bottleneck in accordance with the synthetic amplitude of the period component. A combination of transaction models in which the retention job request counts are expected to concentrate in the vicinity of a constant value is acquired at low costs.

The threshold value E is determined from the sum of the largest m averages of the retention job request counts in operations S88 and S89 because the sum of retention job request counts of any m transaction models, if at maximum, is typically approximately equal to the sum of top m averages of retention job request counts.

The test model selector 180 sets as a threshold value of the synthetic amplitude a percentage (threshold rate q=0.1 or so) of the sum. In a combination having a synthetic amplitude equal to or higher than the threshold value, the time-series transition of the sum of retention job request counts is considered to be out of a variation width of the threshold rate (10%, for example). It is less likely that the concentration of the retention job request count immediately preceding the maximum value becomes large in the process of the bottleneck detector 150*b*. Since the combination is less likely to be detected as a bottleneck candidate by the bottleneck detector 150*b*, the combination is excluded as a target of the bottleneck detection process.

In a combination having a synthetic amplitude lower than the threshold value, the time-series transition of the sum of retention job request counts falls within the variation width of the threshold rate. It is likely that the concentration of the retention job request count immediately preceding the maximum value becomes large in the process of the bottleneck detector 150*b*. The combination is more likely to be detected as a bottleneck candidate by the bottleneck detector 150*b*. The combination is thus selected as a target of the bottleneck detection process.

Figure 37:
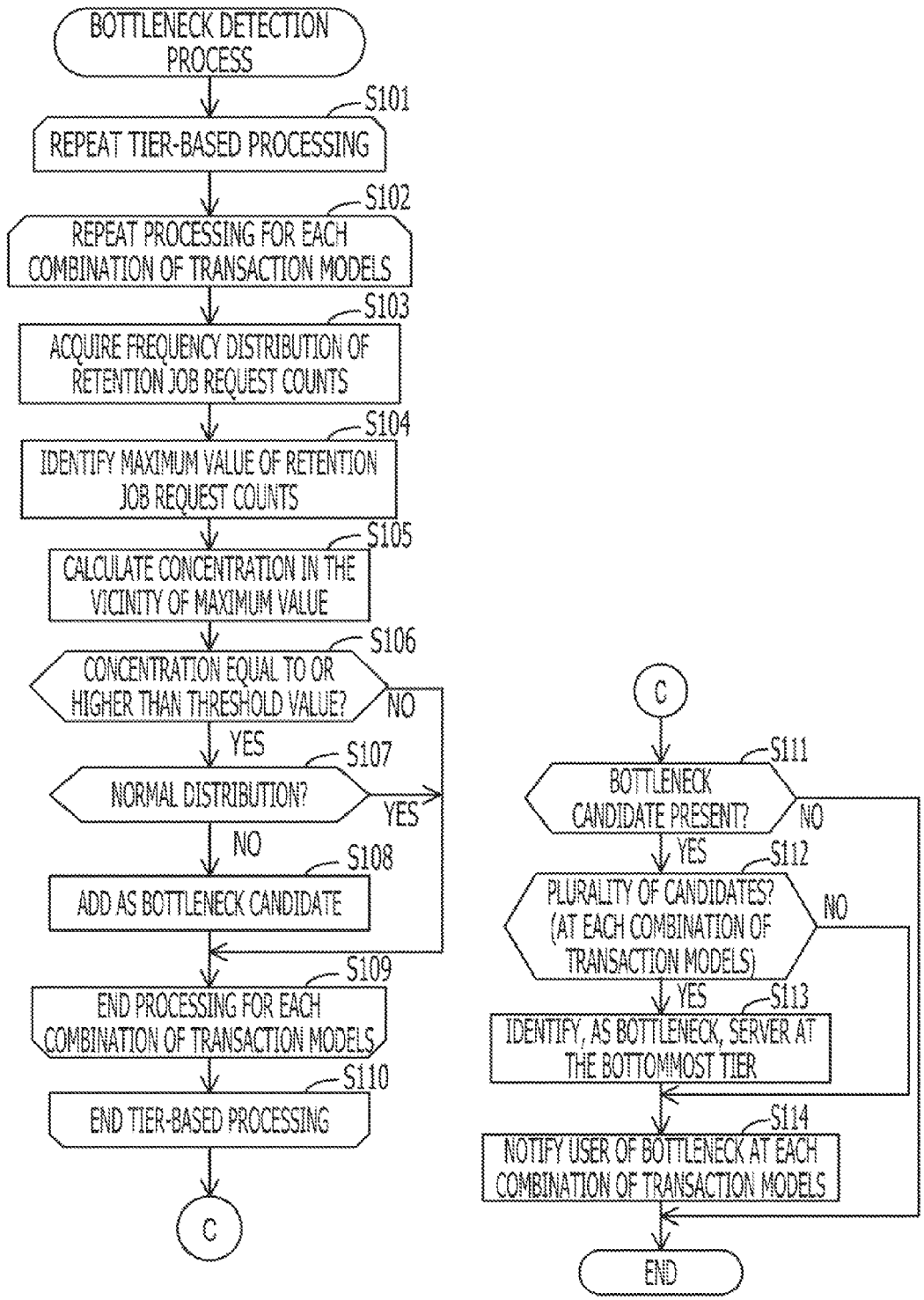
FIG. 37 illustrates a bottleneck detection process of the fourth embodiment.

FIG. 37 illustrates the bottleneck detection process of the fourth embodiment. The bottleneck detection process is described below with reference to operation numbers of FIG. 37.

(Operation S101) The bottleneck detector 150*b* repeats processing to operation S110 on a per tier basis of the transaction system. In accordance with the embodiment, one server is arranged at each tier, and the bottleneck detection process is successively performed on the servers.

(Operation S102) The bottleneck detector 150*b* repeats processing to operation S109 on a per transaction model combination basis of a process target acquired from the test model selector 180.

(Operation S103) The bottleneck detector 150*b* acquires the frequency distribution of the synthesis retention job request count (hereinafter simply referred to as retention job request count) by summing the retention job request counts at the same sampling time on a target server with respect to a target combination of transaction models, based on the retention job request count tables 123*a*, 123*b*, and 123*c* stored on the count information memory 120*b*.

(Operation S104) The bottleneck detector 150*b* identifies a maximum value of the retention job request counts in the acquired frequency distribution.

(Operation S105) The bottleneck detector 150*b* calculates a concentration in the vicinity of the maximum value of the retention job request counts in the frequency distribution.

(Operation S106) The bottleneck detector 150*b* determines whether the concentration is equal to or higher than the threshold value. If the concentration is equal to or higher than the threshold value, the bottleneck detector 150*b* proceeds to operation S107. If the concentration is lower than the threshold value, the bottleneck detector 150*b* proceeds to operation S109.

(Operation S107) The bottleneck detector 150*b* determines whether the frequency distribution is a normal distribution. If the frequency distribution is not a normal distribution, the bottleneck detector 150b proceeds to operation S108. If the frequency distribution is a normal distribution, the bottleneck detector 150b proceeds to operation S109.

(Operation S108) The bottleneck detector 150b adds as a bottleneck candidate the target server of the combination of transaction models as a process target.

(Operation S109) The bottleneck detector 150b proceeds to operation S110 if all the combinations of transaction models from the test model selector 180 are processed. If an unprocessed transaction model combination remains, the bottleneck detector 150b returns to operation S102.

(Operation S110) The bottleneck detector 150b proceeds to operation S111 if all the tiers (servers) are processed. If an unprocessed tier (server) remains, the bottleneck detector 150b returns to operation S101.

(Operation S111) The bottleneck detector 150b determines whether a bottleneck candidate has been detected in operations S101-S110. If a bottleneck candidate has been detected, the bottleneck detector 150b proceeds to operation S112. If no bottleneck candidate has been detected, the bottleneck detector 150b ends the process.

(Operation S112) The bottleneck detector 150b determines on a per transaction model combination basis whether a plurality of bottleneck candidates has been detected. If a transaction model combination having a plurality of bottleneck candidates is present, the bottleneck detector 150b proceeds to operation S113. If no transaction model combination having a plurality of bottleneck candidates is present, the bottleneck detector 150b proceeds to operation S114.

(Operation S113) The bottleneck detector 150b determines on a per transaction model combination basis that the server at the bottommost tier is a bottleneck from among the plurality of bottleneck candidate. For example, the APP server 300 and the DB server 400 may now be detected as bottleneck candidates from the combination of the transaction models "Model-1" and "Model-2". The bottleneck detector 150b then identifies the server at the bottommost tier, in this case, the DB server 400, as the bottleneck of the combination of the transaction models "Model-1" and "Model-2". The bottleneck detector 150b outputs to the notifier 160 information indicating the identified bottleneck server with the combination of the transaction models mapped to the information.

(Operation S114) The notifier 160 notifies the user of the information indicating the bottleneck server acquired from the bottleneck detector 150b on a per transaction model combination basis.

The bottleneck detector 150b thus detects the bottleneck server on a per transaction model combination basis.

The user is thus notified of the bottleneck occurring in response to a combination of requests of a plurality of transaction models. For example, a program shared by a plurality of transaction models may be present on the APP server 300. If the program has a design that does not allow the program to respond appropriately to the plurality of requests, the APP server 300 may be a bottleneck. A bottleneck may occur if a problem lies in queries issued by a plurality of transaction models to the DB server 400. If a plurality of transaction models and a bottleneck are detected in a mapped state, the plurality of transaction models considered to have a shared or a closely related problem are identified at a time. The user may efficiently learn these problems. As a result, the user may efficiently cope with the problems.

If a plurality of servers is arranged at each tier, a tier as a bottleneck may be detected on a per tier basis in substantially the same manner as in the second and third embodiments.

Fifth Embodiment

A fifth embodiment is described below. A difference between the fifth embodiment and the second through fourth embodiments is mainly discussed, and the discussion of similarities therebetween is omitted here.

According to the second through fourth embodiments, the sampling period with which the counting unit 140 generates the retention job request count table 123 and the retention job request count tables 123a, 123b, and 123c affects the accuracy of the retention job request counts set in these tables. If the sampling period is long, information relating to the process of reception of a request/response within the sampling period is difficult to receive. Such information missing becomes pronounced as the number of processes increases. If the sampling period is short, process workload is large as an amount of data to be analyzed increases. In one embodiment, the sampling period is appropriately adjusted, and acquisition accuracy of the retention job request count is balanced with the workload involved in analysis process.

According to the fifth embodiment, a function of modifying the sampling period dynamically is provided. The structure of a transaction system having such a function is described in detail.

The entire structure of the transaction system of the fifth embodiment remains unchanged from the structure of the transaction system of the second embodiment illustrated in FIG. 2, except that the operation management server 100c is substituted for the operation management server 100. The discussion of the general structure of the transaction system of the fifth embodiment is omitted here.

The hardware structure of each apparatus in the transaction model of the fifth embodiment remains unchanged from the hardware structure of the operation management server 100 of the second embodiment illustrated in FIG. 3, and the discussion thereof is omitted here.

Figure 38:
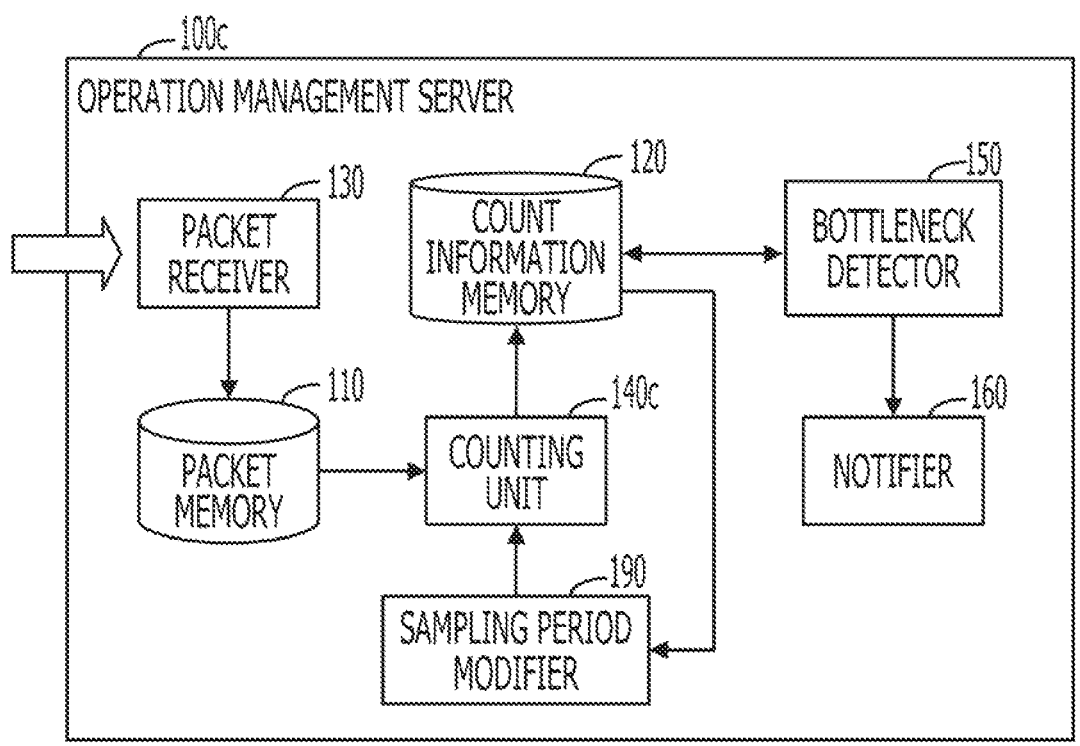
FIG. 38 illustrates a functional structure of an operation management server of a fifth embodiment.

FIG. 38 illustrates a function structure of the operation management server 100c of the fifth embodiment. The operation management server 100c includes packet memory 110, count information memory 120, packet receiver 130, counting unit 140c, bottleneck detector 150, notifier 160, and sampling period modifier 190. The functions of these element are performed by the CPU 101 that executes a specific program. These functions may be partly or wholly performed using a dedicated hardware structure.

The packet memory 110, the count information memory 120, the packet receiver 130, the bottleneck detector 150 and the notifier 160 are substantially identical in structure to the counterparts having the same reference numerals in the operation management server 100 of the second embodiment discussed with reference to FIG. 4, and the discussion thereof is omitted here.

The counting unit 140c restores a message exchanged between the servers in accordance with the packet information stored on the packet memory 110. In response to the restored message, the counting unit 140c counts the retention job request counts of each server, and generates the count information. The counting unit 140c stores the generated count information onto the count information memory 120. The counting unit 140c determines the retention job request count with the sampling period instructed by the sampling period modifier 190.

The sampling period modifier 190 references the retention job request count table 123 stored on the count information memory 120. The sampling period modifier 190 modifies to a shorter sampling period the sampling period of the counting unit 140c on a server if the server has a maximum value of the retention job request counts smaller than a period modification threshold value.

If the sampling period is modified, the sampling period modifier 190 notifies the counting unit 140c of the modified sampling period.

The process of the operation management server 100c thus constructed is described in detail. The packet capture process of the operation management server 100c remains unchanged from the packet capture process of the second embodiment discussed with reference to FIG. 13, and the discussion thereof is omitted here.

Figure 39:
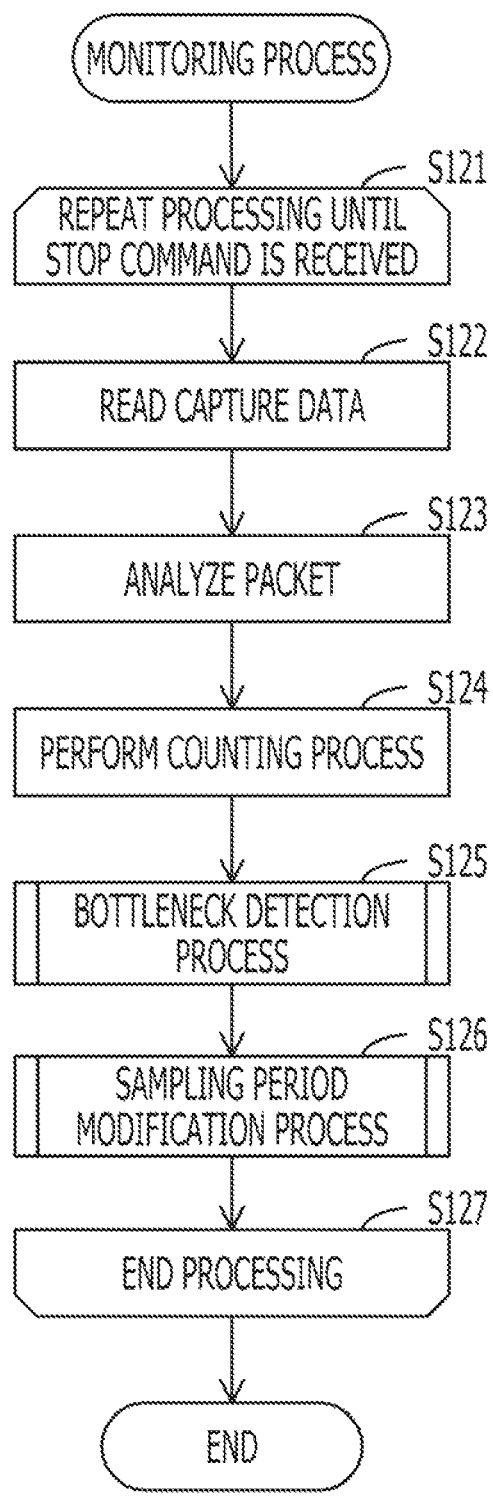
FIG. 39 illustrates a monitoring process of the fifth embodiment.

FIG. 39 illustrates a monitoring process of the fifth embodiment. The monitoring process is described below with reference to operation numbers of FIG. 39.

(Operation S121) The counting unit 140C starts monitoring whether the packet receiver 130 outputs a file to the packet memory 110. The timing at which a start command and a stop command are received by the counting unit 140c may be the same as that in operation S21 of FIG. 14.

(Operation S122) The counting unit 140c reads a new file if the new file is output to the packet memory 110.

(Operation S123) The counting unit 140c restores a message exchanged among the servers in accordance with the read file.

(Operation S124) The counting unit 140c generates a message management table in accordance with the restored message, and then stores the message management table onto the count information memory 120. The counting unit 140c generates a counter table in accordance with the message management table, and then stores the counter table on the count information memory 120. The counting unit 140c generates the retention job request count table 123 in accordance with the counter table and then stores the retention job request count table 123 on the count information memory 120.

(Operation S125) The bottleneck detector 150 determines a frequency distribution of the retention job request count on each server in accordance with the retention job request count table 123. The bottleneck detector 150 determines whether the distribution determined on each server satisfies a specific condition, and detects a server satisfying the specific condition as a bottleneck candidate. The bottleneck detector 150 identifies a server serving as a bottleneck from among the bottleneck candidates, and outputs the identification results to the notifier 160. The notifier 160 notifies the user of the transaction system of information indicating the server acquired from the bottleneck detector 150.

(Operation S126) Based on the retention job request count table 123, the sampling period modifier 190 modifies the sampling period the counting unit 140c uses to analyze the frequency distribution of the retention job request counts. The sampling period is thus modified when the counting unit 140c generates the retention job request count table 123.

(Operation S127) Upon receiving the stop command, the counting unit 140 stops monitoring the file output. The monitoring process of the generation of the bottleneck is thus completed.

If a new file is output to the packet memory 110 in response to the packet capturing of the packet receiver 130, the counting unit 140 performs the counting process. The bottleneck detector 150 performs the bottleneck detection process, based on the retention job request count table 123 output from the counting unit 140c to the count information memory 120.

Upon receiving an instruction to modify the sampling period from the sampling period modifier 190, the counting unit 140c generates a next retention job request count table 123 with a modified sampling period.

Operation S126 may be performed immediately subsequent to operation S124. Subsequent to operation S126, operation S125 may be performed again with the same bottleneck analysis period to increase an accuracy level of analysis results.

The sampling period modification process in operation S126 is described below.

Figure 40:
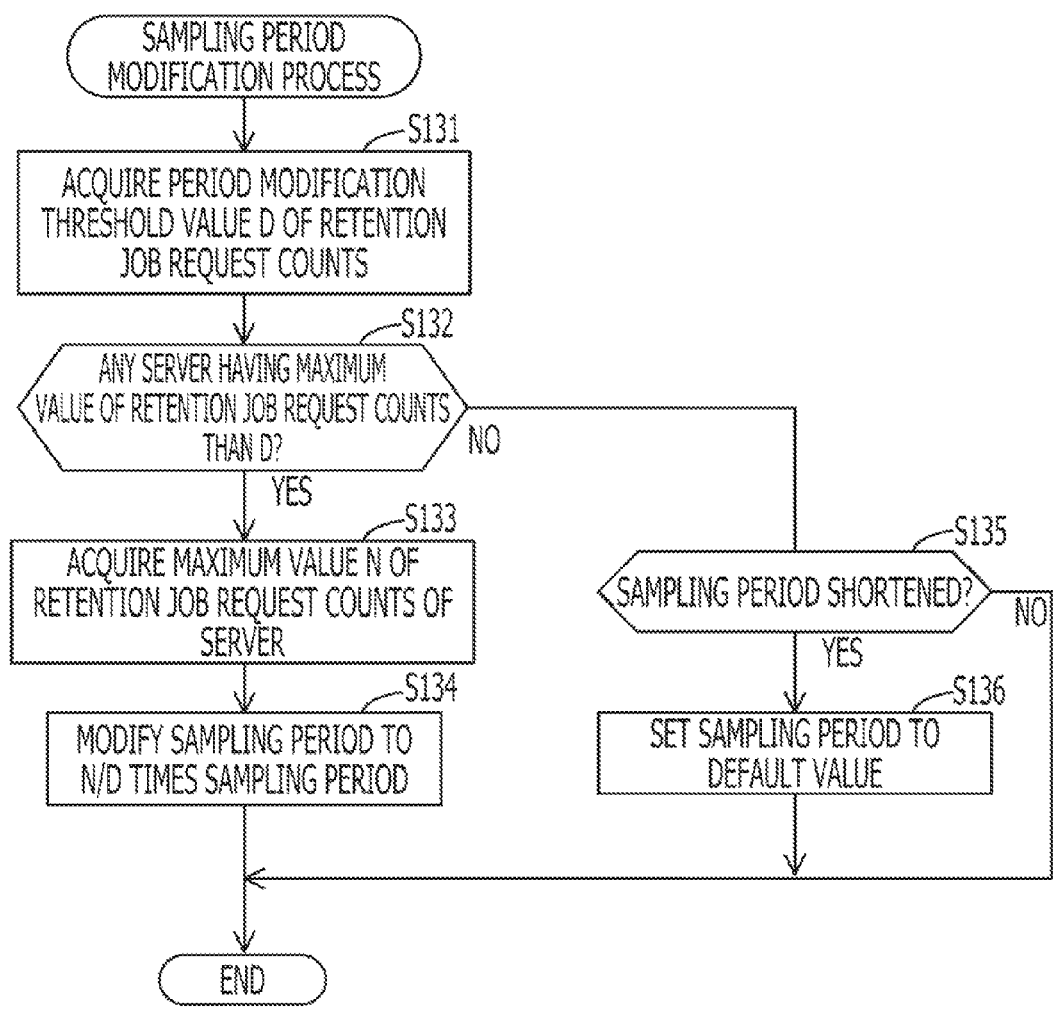
FIG. 40 illustrates a sampling period modification process of the fifth embodiment.

FIG. 40 illustrates the sampling period modification process of the fifth embodiment. The sampling period modification process is described below with reference to operation numbers of FIG. 40.

(Operation S131) The sampling period modifier 190 acquires a period modification threshold value D of the retention job request counts. The period modification threshold value D may be set beforehand on the sampling period modifier 190.

(Operation S132) The sampling period modifier 190 references the retention job request count table 123 stored on the count information memory 120, and determines whether a server (a tier if a process request maximum number is acquired on a per tier basis, and this is applicable hereinafter) having a retention job request count smaller than the period modification threshold value D is present or not. If a server having a retention job request count smaller than the period modification threshold value D is present, processing proceeds to operation S133. If a server having a retention job request count smaller than the period modification threshold value D is not present, processing proceeds to operation S135.

(Operation S133) The sampling period modifier 190 acquires a maximum value N of the retention job request counts of the server with the maximum value of retention job request counts smaller than D. If a plurality of servers, each having a maximum value of retention job request counts smaller than D, is present, the sampling period modifier 190 acquires the maximum value N of the server having a smaller maximum value.

(Operation S134) The sampling period modifier 190 modifies the sampling period to N/D. The sampling period modifier 190 notifies the bottleneck detector 150 of the modified sampling period. The process thus ends.

(Operation S135) The sampling period modifier 190 determines whether the sampling period has been modified from a default value thereof. The default value is preset on the sampling period modifier 190. If the sampling period has been modified, processing proceeds to operation S136. If the sampling period has not been modified, processing ends.

(Operation S136) The sampling period modifier 190 modifies the sampling period to the default value, and notifies the counting unit 140c of the default setting. Processing thus ends.

The sampling period modifier 190 modifies the sampling period with which the counting unit 140c is to determine the retention job request count table.

The sampling periods of all the servers are modified in the above discussion. Alternatively, on servers having a maximum value of the retention job request counts smaller than D, the sampling period may be modified in response to the maximum value of the retention job request counts.

The bottleneck detection process (operation S125 of FIG. 39) executed subsequent to the sampling period modification process is substantially identical to the bottleneck detection process of the second embodiment illustrated in FIG. 15, and the discussion thereof is omitted here.

The modification of the sampling period allows an accurate frequency distribution to be acquired on a server having a smaller maximum value of the retention job request counts. This process is described more in detail below.

FIG. 41 illustrates a change in the frequency distribution caused in response to a sampling period modification. A frequency distribution 640 includes distributions 641, 642, and 643. The distributions 641, 642, and 643 are the frequency distributions acquired with a sampling period T. The distributions 641, 642, and 643 indicate three patterns of the frequency distribution with a maximum value of the retention job request count being "1". Here, the period modification threshold value D is D>1.

The distribution 641 indicates that the frequency of a retention job request count "0" is approximately "0", and that the frequency of a retention job request count "1" is approximately "1.0". The distribution 642 indicates that the frequencies of retention job request count "0" and "1" are approximately "0.5". The distribution 643 indicates that the frequency of a retention job request count "0" is approximately "1.0", and that the frequency of a retention job request count "1" is approximately "0".

With the sampling period T1, the frequencies of the retention job request counts "0" and "1" of process requests about which request/response is exchanged by a plurality of times within the sampling period are largely deviated to "0" or "1", and analysis accuracy may be decreased.

In such a case, the sampling period modifier 190 modifies the sampling period to a shorter sampling period T2 (<T1). More specifically, T2=(N/D)×T1=T1/D. Here, N is a maximum value of the retention job request counts, and N=1. As a result, the counting unit 140c acquires the retention job request count table with a shorter sampling period. The bottleneck detector 150 thus obtains a frequency distribution 650.

The frequency distribution 650 includes the distribution 651, 652, and 653. The distributions 651, 652, and 653 are the frequency distributions of the retention job request counts with the sampling period T2, acquired from the count information of the same time period identical to the bottleneck analysis period during which the distributions 641, 642, and 643 are acquired. The distributions 651, 652, and 653 has three patterns with a maximum value of the retention job request counts being "1".

The distribution 651 corresponds to the distribution 641. The distribution 652 corresponds to the distribution 642. The distribution 653 corresponds to the distribution 643.

The distribution 651 indicates that the frequency of a retention job request count "0" is "0.3", and that the frequency of a retention job request count "1" is "0.7". The distribution 652 indicates that the frequency of a retention job request count "0" is "0.4", and that the frequency of a retention job request count "1" is "0.6". The distribution 653 indicates that the frequency of a retention job request count "0" is "0.7", and that the frequency of a retention job request count "1" is approximately "0.3".

With the sampling period T2 (<T1), the retention of a process difficult to detect with the sampling period T1 may be detected. The frequency distribution is accurately acquired. As a result, the analysis accuracy of the bottleneck detector 150 is increased.

In the above-described method, the maximum value of the retention job request counts determines whether to modify the sampling period. Another method may be employed. For example, in operation S122, the sampling period modifier 190 may calculate the average of the retention job request counts during the bottleneck analysis period, and determines whether the average is higher than the period modification threshold value. If the average is lower than the period modification threshold value, processing proceeds to operation S123. If the average is equal to or higher than the period modification threshold value, processing proceeds to operation S125.

This method provides substantially the same advantage as when the sample period is modified depending on the maximum value of the retention job request counts.

Sixth Embodiment

A sixth embodiment is described below. The following discussion focuses on a difference of the sixth embodiment from the second through fifth embodiments, and the discussion of similarities therebetween is omitted here.

According to the fifth embodiment, the sampling period for the analysis of the frequency distribution is modified if the retention job request count is smaller than the period modification threshold value D on each server. In contrast, the sixth embodiment as a modification of the fifth embodiment provides a function of modifying the sampling period depending on the presence or absence of a bottleneck candidate.

The entire structure of the transaction system of the sixth embodiment remains unchanged from the entire structure of the transaction system of the second embodiment illustrated in FIG. 2 except that an operation management server 100d is substituted for the operation management server 100. The discussion of the entire structure of the transaction system of the sixth embodiment is omitted here.

The hardware structure of each apparatus in the transaction system of the sixth embodiment remains unchanged from the hardware structure of the operation management server 100 of the second embodiment illustrated in FIG. 3, and the discussion thereof is omitted here.

Figure 42:
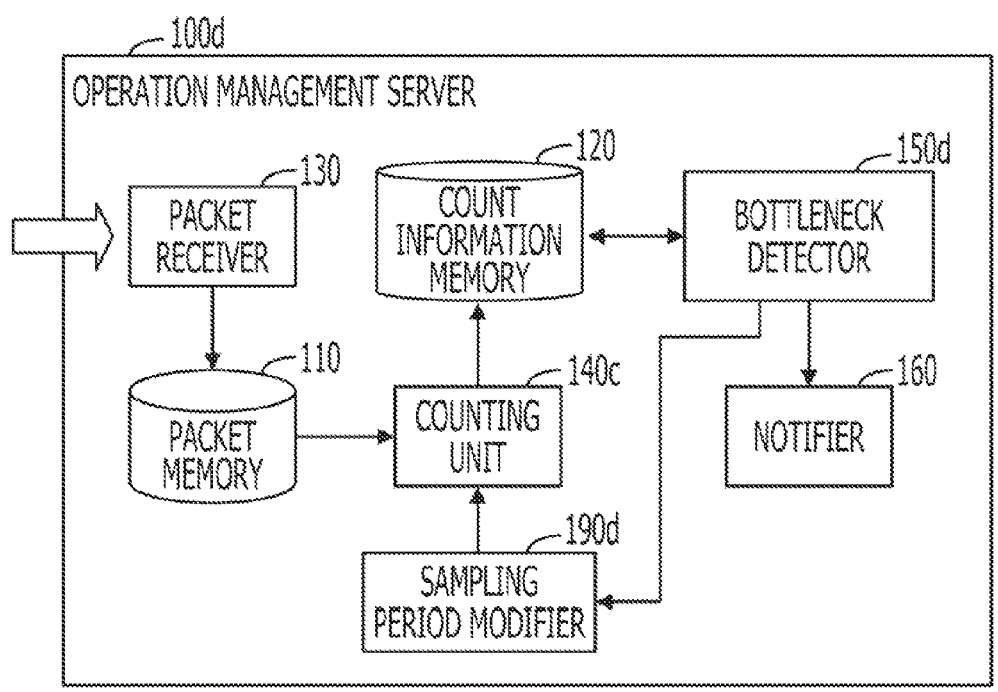
FIG. 42 illustrates a functional structure of an operation management server of a sixth embodiment.

FIG. 42 illustrates a functional structure of the operation management server 100d of the sixth embodiment. The operation management server 100d includes packet memory 110, count information memory 120, packet receiver 130, counting unit 140c, bottleneck detector 150d, notifier 160, and sampling period modifier 190d. The functions of these element are performed by the CPU 101 that executes a specific program. These functions may be partly or wholly performed using a dedicated hardware structure.

The packet memory 110, the count information memory 120, the packet receiver 130, and the notifier 160 are substantially identical in structure to the counterparts having the same reference numerals in the operation management server 100 of the second embodiment discussed with reference to FIG. 4, and the discussion thereof is omitted here. The counting unit 140c is substantially identical in structure to the counting unit 140c in the operation management server 100c of the fifth embodiment of FIG. 38, and the discussion thereof is omitted here.

In response to the count information stored on the count information memory 120, the bottleneck detector 150d analyzes the frequency distribution of the retention job request count of each server, and detects as a bottleneck candidate a server having the frequency distribution satisfying a specific condition. The specific conditions are identical to the conditions 1 and 2 used by the bottleneck detector 150.

The bottleneck detector 150d outputs the detection results of the bottleneck candidate to the sampling period modifier 190d. The bottleneck detector 150d also identifies a server eligible for a bottleneck from among the detected bottleneck candidates and outputs the identification results to the notifier 160.

The sampling period modifier 190d modifies the sampling period to be used by the counting unit 140c in the acquisition of the retention job request count, based on the detection results of the bottleneck candidate by the bottleneck detector 150d.

The process of the operation management server 100d thus constructed is described in detail. The packet capture process of the operation management server 100d remains unchanged from the packet capture process of the second embodiment of FIG. 13, and the discussion thereof is omitted here. The monitoring process of the operation management server 100d remains unchanged from the monitoring process of the second embodiment of FIG. 14 except the bottleneck detection process in operation S25, and the discussion thereof is omitted here.

Figure 43:
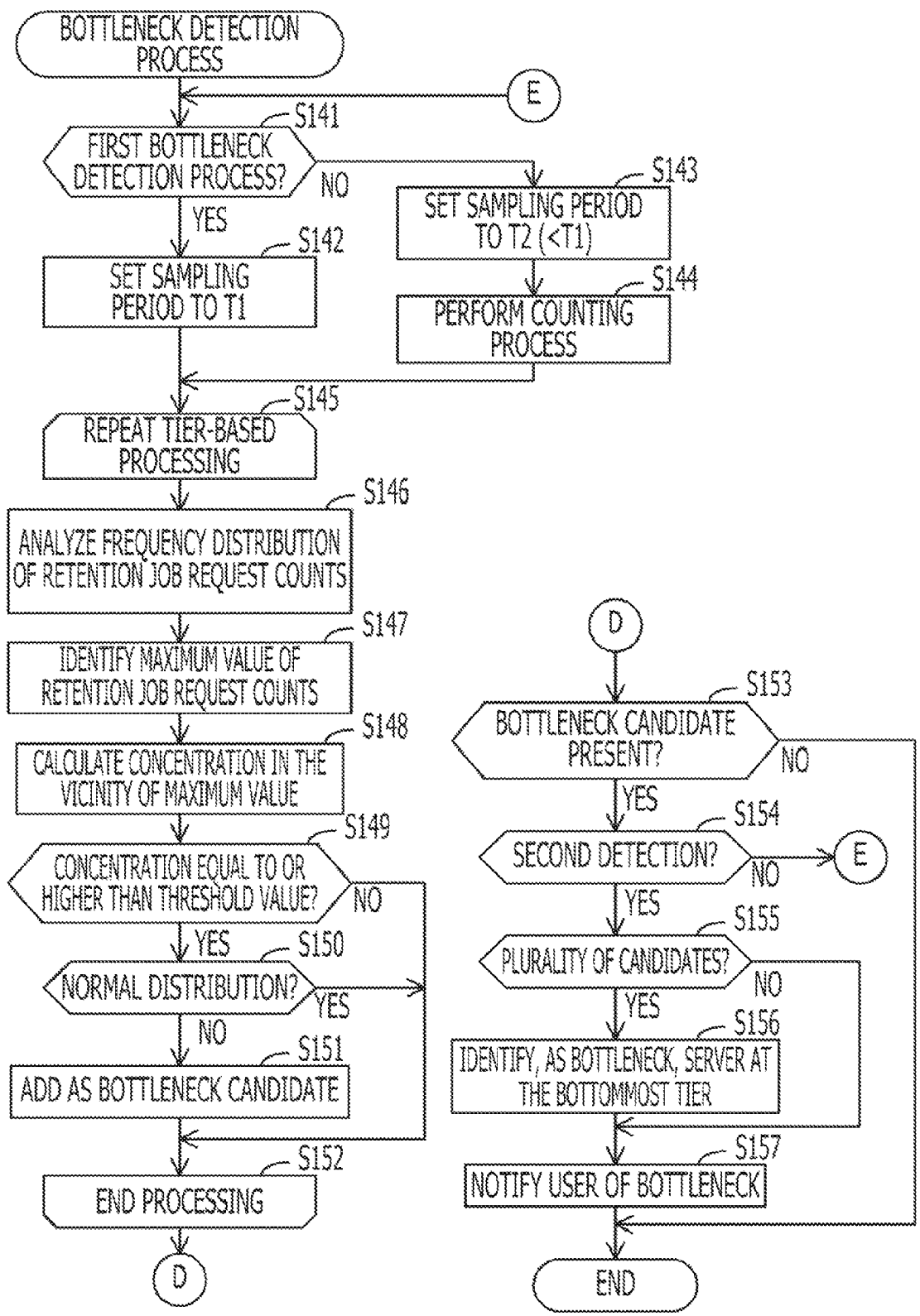
FIG. 43 illustrates a bottleneck detection process of the sixth embodiment.

FIG. 43 illustrates the bottleneck detection process of the sixth embodiment. The bottleneck detection process is described below with reference to operation numbers of FIG. 43.

(Operation S141) The sampling period modifier 190d determines whether the bottleneck detection process of the bottleneck detector 150d is a first process. If the bottleneck detection process is a first process, processing proceeds to operation S142. If the bottleneck detection process is not a first process, e.g., a second process, processing proceeds to operation S143. the sampling period modifier 190d may determine whether the bottleneck detection process is a first process or a second process, depending on a specific flag stored on a specific memory. More specifically, the bottleneck detector 150d may set, in a flag in operation S143, information indicating that the next bottleneck detection process is a second process. The operation management server 100d may include the memory storing the flag.

(Operation S142) The sampling period modifier 190d modifies the sampling period to T1, and notifies the counting unit 140c of the setting of the sampling period of T1. Processing proceeds to operation S145.

(Operation S143) The sampling period modifier 190d modifies the sampling period to T2, and notifies the counting unit 140c of the setting of the sampling period of T2.

(Operation S144) The counting unit 140c regenerates the retention job request count table 123, based on the sampling period received from the sampling period modifier 190d and the counter table stored on the count information memory 120. The counting unit 140c then stores the retention job request count table 123 onto the count information memory 120. Processing proceeds to operation S145.

(Operation S145) The bottleneck detector 150d repeats processing to operation S152 on a per tier basis of the transaction system. According to the present embodiment, one server is arranged at each tier, and the bottleneck detection process is successively repeated on the servers.

(Operation S146) The bottleneck detector 150d acquires the frequency distribution of the retention job request counts of a target server in accordance with the retention job request count table 123 stored on the count information memory 120.

(Operation S147) The bottleneck detector 150d identifies a maximum value of the retention job request counts in the acquired frequency distribution.

(Operation S148) The bottleneck detector 150c calculates a concentration in the vicinity of the maximum value of the retention job request counts in the frequency distribution.

(Operation S149) The bottleneck detector 150d determines whether the concentration is equal to or higher than the threshold value. If the concentration is equal to or higher than the threshold value, the bottleneck detector 150d proceeds to operation S150. If the concentration is lower than the threshold value, the bottleneck detector 150d proceeds to operation S152.

(Operation S150) The bottleneck detector 150d determines whether the frequency distribution is a normal distribution. If the frequency distribution is not a normal distribution, the bottleneck detector 150d proceeds to operation S151. If the frequency distribution is a normal distribution, the bottleneck detector 150d proceeds to operation S152.

(Operation S151) The bottleneck detector 150d adds as a bottleneck candidate the target server of the combination of transaction models as a process target.

(Operation S152) The bottleneck detector 150d proceeds to operation S153 if all the tiers (servers) have been processed. If an unprocessed tier (server) remains, the bottleneck detector 150d returns to operation S145.

(Operation S153) The bottleneck detector 150d determines whether a bottleneck candidate has been detected in operations S145-S152. If a bottleneck candidate has been detected, the bottleneck detector 150d proceeds to operation S154. If no bottleneck candidate has been detected, the bottleneck detector 150d ends the process.

(Operation S154) The bottleneck detector 150d determines whether a bottleneck candidate is detected for the second time. If a bottleneck candidate is detected for the second time, processing proceeds to operation S155. If a bottleneck candidate is not detected for the second time, e.g., is detected for the first time, processing returns to operation S141. The bottleneck detector 150d sets information, indicating that a next process is a second process, in the specific flag stored on the specific memory of the operation management server 100d. The flag is used in operation S141 of the sampling period modifier 190d.

(Operation S155) The bottleneck detector 150d determines whether a plurality of bottleneck candidates has been detected. If a plurality of bottleneck candidates has been detected, processing proceeds to operation S156. If no plurality of bottleneck candidates, e.g., a single bottleneck candidate has been detected, processing proceeds to operation S157.

(Operation S156) The bottleneck detector 150d determines that the server at the bottommost tier is a bottleneck from among the plurality of bottleneck candidate. For example, the APP server 300 and the DB server 400 may now be detected as bottleneck candidates. The bottleneck detector 150d then identifies the DB server 400, e.g., the server at the bottommost tier, as the bottleneck. The bottleneck detector 150d outputs to the notifier 160 information indicating the identified bottleneck server.

(Operation S157) The notifier 160 notifies the user of the information indicating the bottleneck server acquired from the bottleneck detector 150d.

The sampling period modifier 190d modifies the sampling period the counting unit 140c uses to the retention job request count table.

The sixth embodiment thus provides the same advantages as those of the fifth embodiment. The sixth embodiment modifies the sampling period more efficiently than the fifth embodiment. This is further described as below.

A shorter sampling period may increase analysis data, thereby possibly leading to an increase in calculation costs. On the other hand, if the sampling period is not shortened, the bottleneck detection accuracy may be reduced. In one embodiment, the sampling period may be well-balanced between short and long values in view of these characteristics.

If no bottleneck occurs in a real operational environment, the values of the retention job request counts are distributed in the vicinity of a peak. The concentration is typically lower than the threshold value. In such a case, the effect of avoiding shortening of the sampling period is small on the analysis accuracy.

According to the sixth embodiment, the bottleneck detection process is performed at a first process with a specific sampling period. If a bottleneck candidate is detected, the bottleneck detection process is performed at a second process with a sampling period shorter than the first sampling period. If the detection of a bottleneck candidate is likely, the sampling period is shortened.

In this way, the process costs for the analysis process is reduced while the analysis accuracy is increased.

In the above example, the same value is used as the threshold value of the concentration for the first and second bottleneck detection processes. Optionally, the threshold value of the concentration may be changed between the first and second processes. More specifically, the bottleneck detector $150d$ sets a threshold value of the concentration used in the first process smaller than a threshold value used in the second process. A server, which has been tentatively detected as a bottleneck candidate at the first process, is again subjected to a bottleneck detection process with a threshold value larger than the threshold value at the first process.

Even if the accuracy of calculation of the concentration is reduced by the use of a long sampling period at the first process, a bottleneck candidate is reliably detected in a tentative fashion. A bottleneck candidate detection failure is thus controlled.

If a plurality of servers is arranged at each tier, a tier as a bottleneck is detected on a per tier basis in substantially the same manner as the second through fifth embodiments.

According to the second through sixth embodiments, the web three-tier is discussed. The embodiments are not limited to the web three-tier. For example, a web server and an APP server may be on the same server, and a two-tier system of web/APP tier and a DB tier may be arranged. Alternatively, an APP server and a DB server are arranged on the same server, and a two-tier system of a web tier and an APP/DB tier may be arranged. The embodiments may be applied to an information processing system having four or more tiers.

The frequency distribution of the retention job request counts is determined based on the message exchanged among the servers. The embodiments are not limited to this arrangement. For example, each server may acquire an operating system (OS) having a record of an execution history of an application and a log of the application, and the retention job request count may be determined by analyzing the acquired log. In such a case, the servers are accurately time-synchronized with each other in one embodiment. Through network time protocol (NTP), time synchronization may be established with time of a network time protocol (NTP) server connected to each of the switch device $10$ and the network $20$. Time-synchronizing the servers accurately (for example, to within the order of microseconds) through NTP is difficult. If acquiring a retention job request count within a short period of time (within the order of microseconds) is desired, a method of acquiring a message obtained from a communication packet as described with reference to the second through sixth embodiments is more appropriate. This is because the transmission timing of each message is acquired at timing of the operation management servers $100$, $100a$, $100b$, $100c$, and $100d$ that have captured the communication packet. If the function of acquisition and notification of a log is assigned to each server, the server is forced to perform a separate process for this purpose. In one embodiment, the method of using the communication packet is used from the standpoint of preventing an additional process from being added, and of reducing of the effect of the additional process on the intended process of each server.

As described with reference to the second through sixth embodiments, the operation management servers $100$, $100a$, $100b$, $100c$, and $100d$ appropriately detect a bottleneck that has occurred as a result of a saturation of the retention job request counts responsive to an operational limit of an application in the multi-tier system. The detection unit of bottleneck may be a computer, or a tier in the multi-tier system.

The embodiments are not limited to those described above, and each element in each structure may be replaced with any element having a similar function. Any element or any operation may be added to the embodiments. Any two or more elements (features) in the embodiments may be combined.

What is claimed is:

1. A computer-readable, non-transitory medium storing therein an operation management program that causes a computer to execute a procedure, the procedure comprising:
   obtaining a plurality of values Xi indicating a number of process requests currently being processed by each of a plurality of information processing apparatus during a sampling operation, from N samples acquired over a specific time period from each information processing apparatus, wherein N is an integer satisfying a condition of $1 \leq N$, and i is an integer satisfying a condition of $1 \leq i \leq N$;
   determining, for each of the plurality of information processing apparatuses, a ratio of:
   a) a sum of a subset of the plurality of values Xi, including only those Xi which falls within a specific range from a maximum value of the plurality of values Xi, to
   b) the total sum of the plurality of values Xi; and
   detecting an information processing apparatus having the ratio equal to or higher than a specific value as a potential bottleneck candidate.

2. The computer-readable, non-transitory medium according to claim 1, wherein the detecting comprises generating for each information processing apparatus a frequency distribution indicating the number of samples on a per retention job request count basis, determining whether a peak corresponding to a maximum retention job request count from among the peaks of the frequency distribution agrees with a normal distribution, and detecting an information processing apparatus that is determined to fail to agree with a normal distribution.

3. The computer-readable, non-transitory medium according to claim 2, wherein the detecting further comprises determining in the normal distribution determination whether the frequency distribution decreases monotonically within a range from the peak value of the frequency of occurrences of the retention job request counts to the maximum value of the retention job request counts in the frequency distribution, determining that the peak agrees with a normal distribution when the frequency distribution decreases monotonically, and determining that the peak does not agree with a normal distribution when the frequency distribution does not decrease monotonically.

4. The computer-readable, non-transitory medium according to claim 2, wherein the detecting further comprises calculating a first area enclosed by a distribution function of the frequency distribution and a straight line represented by a frequency zero, and a second area enclosed by the distribution function, the straight line represented by the frequency zero, and a straight line represented by border values of the specific range of the retention job request counts, whichever is smaller than the maximum value of the retention job request counts, and outputting as the ratio a quotient of the second area and the first area.

5. The computer-readable, non-transitory medium according to claim 1, wherein the obtaining comprises referencing history information recording the process request and information indicating a session used by the information processing apparatuses with process request mapped to the information indicating the session when the process request is exchanged among the plurality of information processing apparatuses, and counts the retention job request counts in response to a first process request as a request and a last process request as a response to the request, from among a plurality of process requests exchanged during the same session.

6. The computer-readable, non-transitory medium according to claim 1, wherein the obtaining comprises obtaining the retention job request count of each information processing apparatus on each transaction model that maps a transaction process to the content of a plurality of process requests exchanged among the plurality of information processing apparatuses, and
wherein the detecting comprises detecting an information processing apparatus on a per transaction model basis in response to the obtained retention job request count.

7. The computer-readable, non-transitory medium according to claim 6, further comprising: selecting as a combination a plurality of related transaction models, based on the retention job request count of each information processing apparatus on a per counted transaction model basis;
wherein the detecting comprises detecting an information processing apparatus based on a synthesis retention job request count, the synthesis retention job request count being the sum of retention job request counts of each information processing apparatus on each transaction model included in the selected combination.

8. The computer-readable, non-transitory medium according to claim 7, wherein the selecting comprises Fourier-analyzing a time-series transition of the retention job request count, and selecting the combination based on Fourier-analysis results.

9. The computer-readable, non-transitory medium according to claim 1, wherein the obtaining comprises acquiring a retention job request count during a first sampling period, and acquiring a retention job request count during a second sampling period shorter than the first sampling period when none of the retention job request counts acquired during the first sampling period are equal to or higher than a specific period modification threshold value.

10. The computer-readable, non-transitory medium according to claim 1, wherein the obtaining comprises acquiring a retention job request count during a second sampling period shorter than a first sampling period when an information processing apparatus is detected based on the retention job request count acquired during the first sampling period, and
wherein the detecting comprises re-detecting an information processing apparatus based on the retention job request count acquired during the second sampling period.

11. The computer-readable, non-transitory medium according to claim 1, wherein the detecting comprises detecting an information processing apparatus arranged at the bottommost tier, based on a tier relationship defined among the plurality of information processing apparatuses when a plurality of information processing apparatuses are detected.

12. The computer-readable, non-transitory medium according to claim 1, further comprising: notifying of information indicating the detected information processing apparatus.

13. The computer-readable, non-transitory medium according to claim 1, wherein the obtaining comprises calculating a tier-based retention job request count on each tier for each specific period by summing the retention job request counts at the same sampling determined for the information processing apparatuses mapped to the same tier when the information processing apparatuses are mapped to any tier of a multi-tier system, and
wherein the detecting procedure comprises detecting a tier having a concentration equal to or higher than a specific value, the concentration being a ratio of the number of samplings as the tier-based retention job request counts falling within a specific range from a maximum value of the tier-based retention job request counts to the total sum of sampling as a counting target at each tier.

14. An operation management apparatus comprising:
a counting means for obtaining a plurality of values $X_i$ indicating a number of process requests currently being processed by each of a plurality of information processing apparatus during a sampling operation, from N samples acquired over a specific time period from each information processing apparatus, wherein N is an integer satisfying a condition of $1 \leq N$, and i is an integer satisfying a condition of $1 \leq i \leq N$; and
a processing means for determining, for each of the plurality of information processing apparatuses, a ratio of:
a) a sum of a subset of the plurality of values $X_i$, including only those $X_i$ which falls within a specific range, from a maximum value of the plurality of values $X_i$, to
b) the total sum of the plurality of values $X_i$, and for detecting an information processing apparatus having the ratio equal to or higher than a specific value as a potential bottleneck candidate.

15. An operation management apparatus comprising:
a processor configured to execute a procedure, the procedure comprising:
obtaining a plurality of values $X_i$ indicating a number of process requests currently being processed by each of a plurality of information processing apparatus during a sampling operation, from N samples acquired over a specific time period from each information processing apparatus, wherein N is an integer satisfying a condition of $1 \leq N$, and i is an integer satisfying a condition of $1 \leq i \leq N$;
determining, for each of the plurality of information processing apparatuses, a ratio of:
a) a sum of a subset of the plurality of values $X_i$, including only those $X_i$ which falls within a specific range from a maximum value of the plurality of values $X_i$, to
b) the total sum of the plurality of values $X_i$; and
detecting an information processing apparatus having the ratio equal to or higher than a specific value as a potential bottleneck candidate.

16. An operation management method of an operation management apparatus, the operation method comprising:
obtaining a plurality of values $X_i$ indicating a number of process requests currently being processed by each of a plurality of information processing apparatus during a sampling operation, from N samples acquired over a specific time period from each information processing apparatus, wherein N is an integer satisfying a condition of $1 \leq N$, and i is an integer satisfying a condition of $1 \leq i \leq N$;

determining, for each of the plurality of information processing apparatuses, a ratio of:
a) a sum of a subset of the plurality of values Xi, including only those Xi which falls within a specific range from a maximum value of the plurality of values Xi, to
b) the total sum of the plurality of values Xi; and
detecting an information processing apparatus having the ratio equal to or higher than a specific value as a potential bottleneck candidate.

* * * * *